US008803456B2

(12) United States Patent
Zushi et al.

(10) Patent No.: US 8,803,456 B2
(45) Date of Patent: Aug. 12, 2014

(54) MOTOR DRIVE CONTROL DEVICE

(75) Inventors: Yuji Zushi, Chiyoda-ku (JP); Yusuke Matsuda, Chiyoda-ku (JP); Mitsuyasu Kunihiro, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 139 days.

(21) Appl. No.: 13/611,308

(22) Filed: Sep. 12, 2012

(65) Prior Publication Data

US 2013/0278191 A1 Oct. 24, 2013

(30) Foreign Application Priority Data

Apr. 18, 2012 (JP) .................................. 2012-094374

(51) Int. Cl.
*H02H 7/09* (2006.01)
*G06F 19/00* (2011.01)

(52) U.S. Cl.
USPC ..................... 318/400.22; 701/114

(58) Field of Classification Search
USPC ............. 318/400.22, 696; 361/93.9; 713/300; 711/E12.04; 363/98
See application file for complete search history.

(56) References Cited

U.S. PATENT DOCUMENTS

| 6,845,315 | B2 | 1/2005 | Hashimoto et al. |
| 2003/0158649 | A1* | 8/2003 | Hashimoto et al. ........... 701/114 |
| 2003/0187569 | A1* | 10/2003 | Iwagami et al. .............. 701/114 |

FOREIGN PATENT DOCUMENTS

| JP | 2004-285856 A | 10/2004 |
| JP | 2010-104187 A | 5/2010 |

* cited by examiner

*Primary Examiner* — Bentsu Ro
*Assistant Examiner* — Zemenay Truneh
(74) *Attorney, Agent, or Firm* — Sughrue Mion, PLLC

(57) ABSTRACT

A motor drive control device is provided in which if any abnormality occurs in a drive control circuit, drive command signals the drive control circuit generates are interrupted at once, so that an AC motor can be stopped in safety. A monitor control circuit and drive command signal interruption circuit are provided to the drive control circuit that takes variable-speed control of the AC motor supplied with power from a DC drive power source via a semiconductor bridge circuit. If any abnormality occurs in the drive control circuit, the drive command signals the drive control circuit generates are interrupted at once. When starting operation, the drive control circuit and monitor control circuit cooperate with each other to conduct preliminary check as to whether or not the drive command signal interruption circuit operates normally, base on a predetermined time schedule, and stop the AC motor without fail if any abnormality occurs during operation.

10 Claims, 16 Drawing Sheets

MOTOR DRIVE CONTROL DEVICE

BACKGROUND OF THE INVENTION

1. Field of the Invention

The present invention relates to an improvement in a motor drive control device for an AC motor that is variable-speed-controlled with power supplied from a DC drive power source via a semiconductor bridge circuit, and in particular to a motor drive control device equipped with monitoring and preliminary check functions to stop the AC motor without fail, if any abnormality occurs in a drive control circuit for taking variable-speed control.

2. Description of the Related Art

A motor drive control device (hereinafter also referred to as a motor control device) is already well-known that is equipped with an additional safety stop circuit, and in which an abnormality of the safety stop circuit itself can be detected before activating the motor drive control device.

For example, "Motor controller equipped with safety shutdown circuit" described in Patent document 1 below includes a gate drive circuit that drives an inverter for inverting DC to AC in response to motor drive command from an external upper-level device; a PWM generation circuit that generates a PWM signal supplied to the gate drive circuit; and a safety stop circuit that is interposed between the gate drive circuit and PWM generation circuit; wherein the safety stop circuit includes an external motor stop switch, a plurality of three-state buffers that interrupt the PWM signal in cooperation with the motor stop switch and a monitor circuit configured such that the upper-level device can determine an abnormality of such a safety device itself.

The monitor circuit includes a logic circuit to which at least one of the output signals from the three-state buffers is input and semiconductor elements that are supplied with an output signal from the logic circuit and turned on/off based on the output signal, and the upper-level device is enabled to determine an abnormality occurring in the safety device itself based on combination of on/off states of the motor stop switch and on/off states of the output signal from the monitor circuit.

Moreover, according to "Engine air-intake control device and engine air-intake control method" described in Patent Document 2 below, the device is configured including a drive control circuit and monitor control circuit, in such a way that the drive control circuit generates conduction drive output DR2 in response to detected output from an acceleration pedal press-down sensor and air-intake valve opening degree sensor, and thereby controls a drive switching element connected to a motor for controlling the air-intake valve opening degree. The monitor control circuit stops the control operation of the drive switching element based on conduction inhibit output SP2, as well as drives a power supply interruption element provided in a motor power supply circuit based on power supply drive output DR1, and the drive control circuit is enabled to stop the operation of the power supply interruption element based on power supply inhibit output SP1.

Furthermore, when starting operation, the device can determine effectiveness of the power supply inhibit output SP1 and conduction inhibit output SP2 based on status signals ST1 and ST2, and can clear the inhibit output after normal operation is confirmed. In particular, the drive control circuit or monitor control circuit to which the foregoing status signals are supplied is configured in such a way that the circuit compares the logical states of the status signals memorized in advance for each time step with actual logical states of the status signals for each time step, and includes an operation-start-permit means that memorizes the disagreement and continues to generate the conduction inhibit output or the power supply inhibit output when the comparison results disagree with each other; when starting operation, the circuit confirms that the power supply inhibit output circuit and conduction inhibit output circuit are effectively functioning, and following that, clears each inhibit output, so that the power supply drive output and conduction drive output are made effective.

Patent Document 1: Japanese laid-open Patent Publication No. 2010-104187 (FIG. 1, Abstract)

Patent Document 2: Japanese Laid-open Patent Publication No. 2004-285856 (FIG. 6, Paragraphs [0060]-[0063], FIG. 9, Paragraph [0134])

"Motor controller equipped with safety shutdown circuit" according to Patent Document 1 as described above includes a plurality of three-state buffers connected in series between the PWM signal generator that controls conduction of switching elements for the motor and the gate circuit that controls conduction of the switching elements, and stops the motor in a safe manner by means of the three-state buffers that respond to command from a motor stop switch. The control device not only provides a stop means that does not utilize a contactor control means that interrupts power supply to the motor if any abnormality occurs, but also determines whether or not the plurality of three-state buffers are operating normally, and reports the result to the upper-level device.

However, if any abnormality occurs in the PWM signal generator itself, the problem has been that the motor control device cannot shut down the three-state buffers by detecting the abnormality. In addition, another problem has been that preliminary check cannot be conducted as to whether or not the three-state buffers properly transmit and interrupt drive command signals to six switching elements constituting a three-phase full-wave semiconductor bridge circuit.

Moreover, in the "Engine air-intake control device and engine air-intake control method" according to Patent Document 2 as described above, the switching element for interrupting power supply and the drive switching element are provided in a power supply drive circuit for the motor; the drive control circuit generates the conduction control output DR2 to the drive switching element and the power supply inhibit output SP1 to the switching element for interrupting power supply; the monitor control circuit generates the conduction inhibit output SP2 to the drive switching element and the supply drive output DR1 to the switching element for interrupting power supply; and when starting operation, the control device checks and confirms that the switching element for interrupting power supply and drive switching element are turned off without fail by the power supply inhibit output SP1 and conduction inhibit output SP2.

Therefore, the drive control circuit and monitor control circuit cooperate to detect an abnormal state of each switching element, and if any abnormality occurs, the circuits are enabled to stop the motor by turning off either one of the switching elements; however if any abnormality occurs in either the drive control circuit or monitor control circuit, there has been a problem in that all of the six switching elements constituting, for example, the three-phase full-wave semiconductor bridge circuit cannot be turned off at once.

SUMMARY OF THE INVENTION

A first objective of the present invention is to provide a motor drive control device in which the drive control circuit takes variable-speed control of an AC motor supplied with power from a DC drive power supply via a bridge circuit, and if any abnormality occurs in the circuit, drive command signals the drive control circuit generates can be interrupted at once, thereby stopping the AC motor in safety.

A second objective of the present invention is to provide a motor drive control device in which preliminary check can be conducted as to whether or not a drive command signal interruption circuit operates normally when starting operation, and the AC motor can be stopped without fail if any abnormality occurs during operation.

A third objective of the present invention is to provide a motor drive control device that is preferably configured enabling switching operation of the switching elements constituting the semiconductor bridge circuit to be also checked in the preliminary check.

A motor drive control device according to the present invention comprises a semiconductor bridge circuit in which positive side switching elements connected to the positive side terminal of a DC drive power source are connected in series with their respective negative side switching elements connected to the negative side terminal thereof, and series-connection points of a plurality of switching elements connected in series are connected with their respective drive terminals of an AC motor; and a drive control circuit that sequentially generates positive side and negative side drive command signals to the positive side switching elements and negative side switching elements, and takes variable-speed control of the AC motor. The motor drive control device further comprises a monitor control circuit that transmits mutually-monitoring signals to and from the drive control circuit, monitors an operation state of the drive control circuit at all times, and if any abnormality is detected, generates a first abnormality detection signal to initialize and restart the drive control circuit; and a drive command signal interruption circuit that is placed in transmission paths for the positive side and negative side drive command signals, and interrupts at once all of the positive side and negative side drive command signals by a first inhibit command signal the drive control circuit generates or by a second inhibit command signal the monitor control circuit generates.

Moreover, command state monitoring signals are input in at least either one of the drive control circuit and the monitor control circuit; the command state monitoring signals are either positive side and negative side command output signals the drive command signal interruption circuit generates, or switching operation monitoring signals of the switching elements in response to the operation status of the positive side switching elements and negative side switching elements. The drive control circuit, immediately after powered on or during an operation pause period of at least the AC motor stopping, generates sequentially the positive side and negative side drive command signals and the first inhibit command signal based on a predetermined time schedule, after transmitting to the monitor control circuit a check-start command signal. In addition, the monitor control circuit, after receiving the check-start command signal, generates the second inhibit command signal in a predetermined time slot based on the predetermined time schedule.

Furthermore, the drive control circuit or monitor control circuit to which the command state monitoring signals are input determines whether or not logical change of the command state monitoring signals is taking place in the predetermined time slot based on the predetermined time schedule. If the drive control circuit determines that logical change is not properly taking place, the drive control circuit stops generation of the drive command signals, and also continues to generate the first inhibit command signal; if the monitor control circuit determines that logical change is not properly taking place, the monitor control circuit continues to generate the second inhibit command signal. The drive control circuit and monitor control circuit cooperate with each other to conduct operation check of the drive command signal interruption circuit. When the interruption function is normal, the control circuits start rotational drive of the AC motor; meanwhile if any abnormality of the drive control circuit occurs during operation, rotational drive of the AC motor is set to be stopped by the first or second inhibit command signal.

As described above, a motor drive control device according to the present invention comprises the drive control circuit that is supplied with power from the DC drive power source via the semiconductor bridge circuit and takes variable-speed control of the AC motor, the monitor control circuit that monitors the operation state of the drive control circuit at all times, and the drive command signal interruption circuit that interrupts at once the drive command signals the drive control circuit generates, wherein the drive control circuit and monitor control circuit cooperate with each other to conduct operation check of the drive command signal interruption circuit. When the interruption function is operating normally, the circuits start rotational drive of the AC motor; meanwhile if any abnormality of the drive control circuit occurs during operation, the circuits stop rotational drive of the AC motor by the first or second inhibit command signal. Therefore, if any abnormality occurs in the drive control circuit during operation, even if the drive control circuit does not have a function of interrupting the drive command signals, the monitor control circuit and drive command signal interruption circuit interrupt the drive command signals at once, so that the AC motor can be stopped, thereby producing an effect of enhancing safety.

Moreover, whether or not the drive command signal interruption circuit operates normally is checked based on the predetermined time schedule when starting operation; even if the drive control circuit and monitor control circuit do not know each other what command signals the other party is generating, any abnormality occurrence can be determined by the drive control circuit or monitor control circuit whichever the command state monitoring signals are input to.

Therefore, since the operation of the drive command signal interruption circuit can be checked without depending on serial communication, an effect is produced that the operation of the drive command signal interruption circuit can be checked quickly even before the serial communication has been established between the drive control circuit and monitor control circuit, immediately after powered on.

The foregoing and other object, features, aspects and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
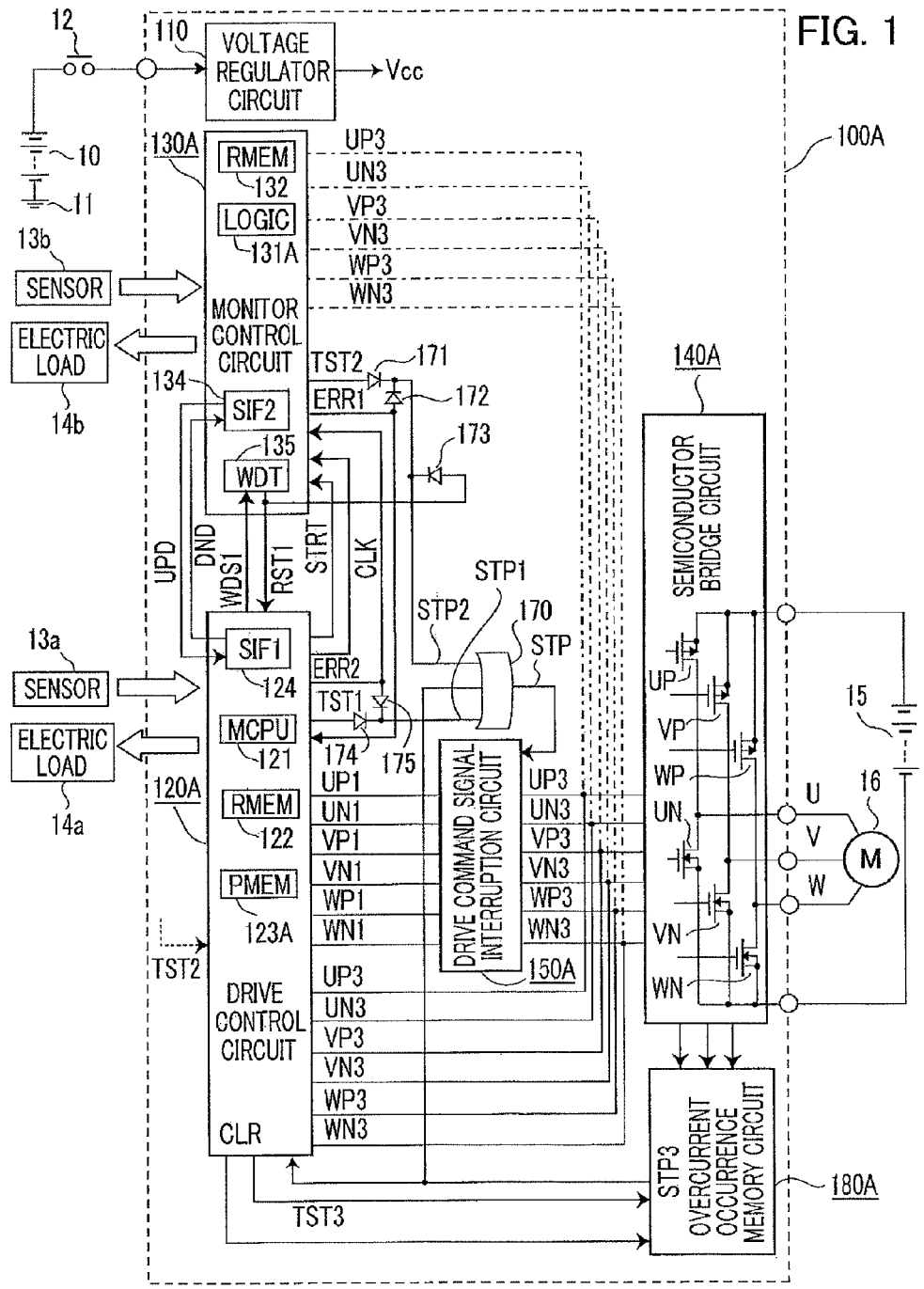
FIG. 1 is an entire configuration diagram showing Embodiment 1 of the present invention.

Hereinafter, FIG. 1, which is an entire configuration diagram showing Embodiment 1 of the present invention, will be explained. In FIG. 1, a motor drive control device 100A controls a vehicle engine and takes drive control of a traction motor in a hybrid car, for example, and which essentially includes a drive control circuit 120A that takes rotational control of the engine and traction motor, a monitor control circuit 130A that cooperates with the drive control circuit and monitors each other, a semiconductor bridge circuit 140A that supplies power to the traction motor, a drive command signal interruption circuit 150A, and an overcurrent occurrence memory circuit 180A.

A vehicle battery that serves as a low voltage power source 10 of, for example, 12 V DC, is mounted outside the motor drive control device 100A, the negative side terminal of the battery is connected to a vehicle body ground 11, and the positive side terminal thereof is connected to the motor drive control device 100A via an output contact of a power supply relay 12 that operates in response to a not-shown manual power switch, so that the motor drive control device 100A can be supplied with power.

A first group of input sensors 13a include, for example, analog sensors such as an accelerator pedal position sensor and a throttle position sensor, or open/close sensors such as an engine rotation sensor, and those are connected to input ports of the drive control circuit 120A via a not-shown first input interface circuit.

A second group of input sensors 13b include, for example, analog sensors such as an engine water temperature sensor and fuel sensor for measuring the amount of fuel, or open/close sensors such as a transmission gear shift sensor and air conditioner switch, and those are connected to input ports of the monitor control circuit 130A via a not-shown second input interface circuit.

A first group of electric loads 14a include, for example, electric loads for controlling the engine, such as an electric valve for fuel injection, an ignition coil (only for gasoline engine) and a motor for controlling the opening degree of an air-intake valve, and those are connected to output ports of the drive control circuit 120A via a not-shown first output interface circuit.

A second group of electric loads 14b include, for example, an electro-magnetic clutch for an air conditioner and power relays for supplying power to various electric loads, and those are connected to output ports of the monitor control circuit 130A via a not-shown second output interface circuit.

A DC drive power source 15 is a high voltage vehicle battery with a voltage of, for example, 400 V DC, and connected, via the semiconductor bridge circuit 140A, to drive terminals U, V and W of a three-phase AC motor 16, which is the traction motor.

A voltage regulator circuit 110 that is supplied with power from the low voltage power source 10 and generates a regulated control voltage Vcc of, for example, 5 V DC is provided inside the motor drive control device 100A, and supplies power to various parts including the drive control circuit 120A, the monitor control circuit 130A and not-shown interface circuits.

The drive control circuit 120A includes a main CPU 121, which is a microprocessor, a RAM memory 122 for operational processing, a non-volatile program memory 123A, which is a flash memory, for example, and a key-station series-parallel converter 124 with those connected with each other through a bus.

The monitor control circuit 130A includes a control logic circuit 131A that is a replacement of a microprocessor, an auxiliary RAM memory 132 for temporary memory, and a slave-station series-parallel converter 134 with those connected with each other through a bus. The control logic circuit 131A does not include a program memory, but is configured including hardware so as to generate a predetermined output signal in response to a predetermined input signal.

A watchdog timer 135 monitors the pulse width of a first watchdog signal WDS1 the main CPU 121 generates, and when a logically unchanging period has passed exceeding a predetermined time, the timer is set to generate a first reset command signal RST1 to initialize and restart the main CPU 121.

Downlink communication data DND and uplink communication data UPD, which serve as mutually-monitoring signals made up of multiple bits, are transmitted in series between the key-station series-parallel converter 124 and slave-station series-parallel converter 134, and a communication synchronizing signal CLK is transmitted from the drive control circuit 120A to the monitor control circuit 130A as a communication control signal for serial transmission.

Moreover, a check-start command signal STRT is transmitted from the drive control circuit 120A to the monitor control circuit 130A, as a timing signal for starting startup check described later. Additionally, the monitor control circuit 130A detects the presence/absence of code error in the communication data and abnormal delay of the data with respect to the downlink communication data DND transmitted from the drive control circuit 120A, thereby determines the presence/absence of an abnormality of the downlink communication, transmits on a regular basis question information to the drive control circuit 120A, and also determines the presence/absence of an abnormality of question and answer as to whether or not the answer information corresponding to the question information agrees with predetermined correct information. If any abnormality of the downlink communication or of the question and answer occurs, the monitor control circuit is enabled to generate a first abnormality detection signal ERR1, to initialize and restart the main CPU 121.

Furthermore, the drive control circuit 120A detects the presence/absence of code error in the communication data and abnormal delay of the data with respect to the uplink communication data UPD transmitted from the monitor control circuit 130A, and thereby determines the presence/absence of an abnormality of the uplink communication. If any abnormality of the uplink communication occurs, the control circuit is enabled to generate a second abnormality detection signal ERR2, and initialize and restart the monitor control circuit 130A.

In the semiconductor bridge circuit 140A, positive side switching elements UP, VP and WP connected to the positive terminal of the DC drive power source 15 are connected in series with their respective negative side switching elements UN, VN and WN connected to the negative side terminal thereof, and series-connection points of a plurality of switching elements connected in series are connected with the respective drive terminals U, V and W of the AC motor 16.

Figure 2:
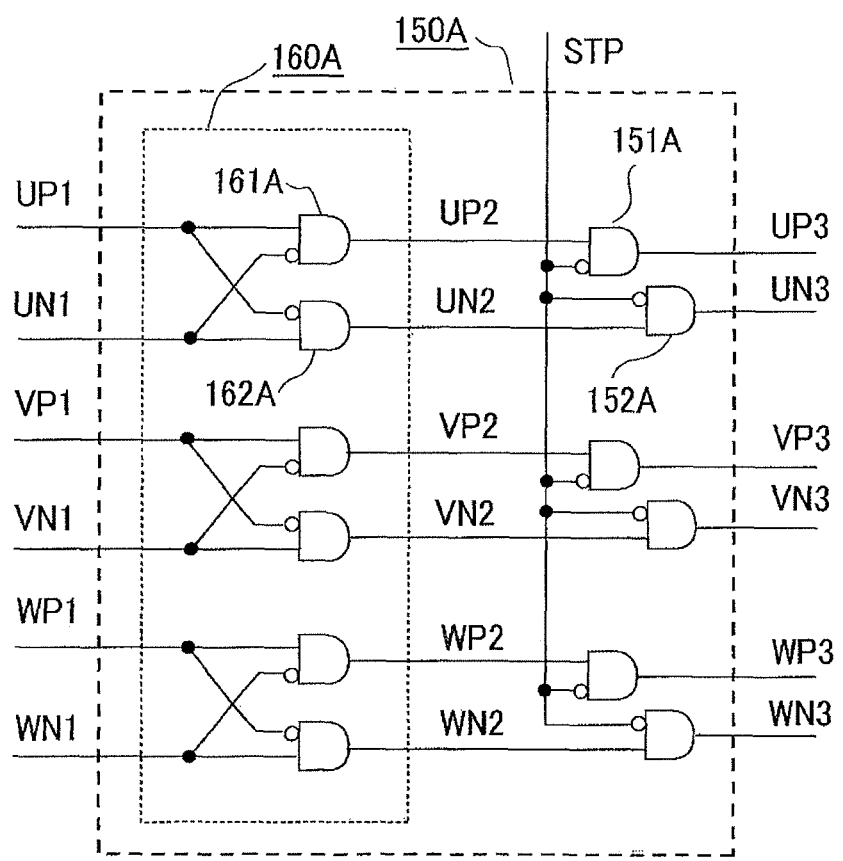
FIG. 2 is a detailed circuit diagram of the drive command signal interruption circuit in FIG. 1.

The drive command signal interruption circuit 150A described later in FIG. 2 is supplied with positive side and negative side drive command signals UP1, VP1 and WP1, and UN1, VN1 and WN1 the drive control circuit 120A generates, and generates positive side command output signals UP3, VP3 and WP3 and negative side command output signals UN3, VN3 and WN3, which are close-circuit command signals to the positive side switching elements UP, VP and WP and negative side switching elements UN, VN and WN, respectively.

However, when the logical value of a composite inhibit command signal STP input to the drive command signal interruption circuit 150A is "1," the logical values of all of the command output signals UP3, VP3 and WP3, and UN3, VN3 and WN3 become "0," regardless of logical states of the drive command signals UP1, VP1 and WP1, and UN1, VN1 and WN1, so that open-circuit command is given to all of the switching elements UP, VP and WP, and UN, VN and WN.

Additionally, the positive side and negative side command output signals UP3, VP3 and WP3, and UN3, VN3 and WN3 are fed back to the drive control circuit 120A as command state monitoring signals; however these command state monitoring signals may be input to the monitor control circuit 130A as shown by the dotted lines and monitored by the monitor control circuit.

A first inhibit command signal STP1, second inhibit command signal STP2 and third inhibit command signal STP3 are input to a logical sum element 170 that creates the composite inhibit command signal STP. When any one of the inhibit command signals becomes logical "1," all of the output signals from the drive command signal interruption circuit 150A become logical "0," so that the open-circuit command is given to all of the switching elements UP, VP and WP, and UN, VN and WN.

The first inhibit command signal STP1 the drive control circuit 120A generates is the logical sum of a first trial inhibit command signal TST1 that is generated following generation of the check-start command signal STRT and the second abnormality detection signal ERR2; however, those signals are connected in logical OR configuration by diodes 174 and 175 so that the monitor control circuit 130A is not initialized nor restarted even if the first trial inhibit command signal TST1 is generated.

The second inhibit command signal STP2 the monitor control circuit 130A generates is the logical sum of a second trial inhibit command signal TST2 generated following generation of the check-start command signal STRT, the first abnormality detection signal ERR1 and the reset command signal RST1 to the main CPU 121; however, those signals are connected in logical OR configuration by diodes 171, 172 and 173 so that the drive control circuit 120A is not initialized nor restarted even if the second trial inhibit command signal TST2 is generated.

The overcurrent occurrence memory circuit 180A described later in FIG. 3 includes memory elements for each phase that memorize overcurrent once overcurrent detection elements provided for each phase are put into operation. If any one of the memory elements for each phase memorizes an overcurrent, the overcurrent occurrence memory circuit generates the third inhibit command signal STP3, and the drive command signals UP1, VP1 and WP1, and UN1, VN1 and WN1 are interrupted at once by the drive command signal interruption circuit 150A.

The third inhibit command signal STP3 is also input to the drive control circuit 120A; the main CPU 121, if sensing any overcurrent, interrupts the drive command signals UP1, VP1 and WP1, and UN1, VN1 and WN1, and also generates an overcurrent occurrence memory clear command signal CLR, so as to reset memory held in the memory elements inside the overcurrent occurrence memory circuit 180A.

The drive control circuit 120A also generates a third trial inhibit command signal TST3 in a time slot following the generation of the check-start command signal STRT, forces the memory elements inside the overcurrent occurrence memory circuit 180A to memorize an overcurrent occurrence state, and then confirms interruption operation of the drive command signals UP1, VP1 and WP1, and UN1, VN1 and WN1 by the drive command signal interruption circuit 150A.

Additionally, if the second inhibit command signal TST2 the monitor control circuit 130A generates is not only input to the logical sum element 170 but also input in the drive control circuit 120A, the drive control circuit 120A can monitor part of an operation state of the monitor control circuit 130A.

FIG. 2, which is a detailed circuit diagram of the drive command signal interruption circuit in FIG. 1, will be explained next. In FIG. 2, the drive command signal interruption circuit 150A is configured by connecting positive side gate elements 151A and negative side gate elements 152A with the respective U-, V- and W-phases. When the composite inhibit command signal STP is made logical "1," the output logical values of the positive side gate elements 151A and negative side gate elements 152A of each phase all become "0," which is output as the command output signals UP3, VP3 and WP3, and UN3, VN3 and WN3.

The composite inhibit command signal STP is input, as a gate signal, to one of the input terminals of each of the positive side gate elements 151A and each of the negative side gate elements 152A, and also intermediate drive command signals UP2, VP2 and WP22, and UN2, VN2 and WN2 a short-circuit command prevention circuit 160A generates are input to the other input terminals of each gate element.

The short-circuit command prevention circuit 160A includes positive side logical elements 161A and negative side logical elements 162A provided for each phase; one of the positive side logical elements 161A makes an intermediate drive command signal UP2 out of the logical product of the positive side drive command signal UP1 and the reversed logical signal of the negative side drive command signal UN1; one of the negative side logical elements 162A makes an intermediate drive command signal UN2 out of the logical product of the reversed logical signal of the positive side drive command signal UP1 and the negative side drive command signal UN1; and the positive side intermediate drive command signal UP2 and negative side intermediate drive command signal UN2 are made not to become logical "1" at the same time.

The same can be said for the drive command signals VP1 and VN1, and WP1 and WN1, and intermediate drive command signals VP2 and VN2, and WP2 and WN2; even if drive command signals UP1 and UN1, VP1 and VN1, and WP1 and WN1 of the same phase become erroneously logical "1" at the same time, the intermediate drive command signals UP2 and UN2, VP2 and VN2, and WP2 and WN2 of the same phase are made not to become logical "1" at the same time.

Next, FIG. 3, which is a detailed circuit diagram of the overcurrent occurrence memory circuit in FIG. 1, will be explained. In the semiconductor bridge circuit 140A in FIG. 3 in which the positive side switching elements UP, VP and WP are connected in series with the negative side switching elements UN, VN and WN, respectively, the negative side switching elements UN, VN and WN, which are field-effect power transistors, are provided with mirror circuits in which part of a drain current branches, and the current of one-hundredth of the drain current is allowed to flow through current detection resisters 141 connected to the respective current mirror circuits.

Light-emitting diodes 142 connected in series with dropper diodes 144 are connected in parallel to the respective current detection resisters 141, and moreover photo transistors 143, which are overcurrent detection elements for each phase, are integrated with the light-emitting diodes 142 to form photo couplers.

Additionally, a drive gate circuit 149 takes in as input signals the command output signals UP3, VP3 and WP3, and UN3, VN3 and WN3 the drive command signal interruption circuit 150A generates, and supplies a close-circuit signal to the positive side and negative side switching elements UP, VP and WP, and UN, VN and WN; the circuit is insulated by a not-shown light-insulating circuit.

The overcurrent occurrence memory circuit 180A includes memory elements 184A for each phase that operate with the control voltage Vcc supplied, and is set to memorize an overcurrent occurrence when the transistors 181 are turned on by base resistors 182 connected in series with the photo transistors 143.

Additionally, open-circuit ballast resisters 183 are connected between the emitter and base of the respective transistors 181. When currents flowing through the photo transistors 143 are small, the transistors 181 are turned off; therefore, generation of memory commands to the memory elements 184A for each phase can be prevented. A logical sum circuit 185 is enabled to logically sum the memorized signals by the memory elements 184A for each phase provided in their respective U-, V- and W-phases, and then output the result as the third inhibit command signal STP3.

Moreover, the trial inhibit command signal TST3 the drive control circuit 120A generates is input to set-input terminals of the memory elements 184A for each phase, which serves as a signal that helps the memory elements 184A for each phase generate a memory signal in a simulated manner when the photo transistors 143 are not conductive. An overcurrent occurrence memory clear command signal CLR the drive control circuit 120A generates is input to reset-input terminals of the memory elements 184A for each phase, which serves as a signal that forcibly reset memory states of the memory elements 184A for each phase by memory command from the trial inhibit command signal TST3 or by conduction of the photo transistors 143.

Hereinafter, the operation of Embodiment 1 of the present invention configured as shown in FIG. 1 will be explained in detail using time charts shown in FIG. 4 to FIG. 6.

First of all, when a not-shown manual switch is closed in FIG. 1, the output contact of the power supply relay 12 is closed, power is supplied to the motor drive control device 100A, then the voltage regulator circuit 110 generates a predetermined control voltage Vcc, and the main CPU 121 and control logic circuit 131A thereby begin their operation.

When the main CPU 121 begins its operation, initial check of the drive command signal interruption circuit 150A is conducted following the procedure described later in FIG. 5 and FIG. 6. When the check result is normal, the first and second groups of electric loads 14a and 14b and the AC motor 16 are driven and controlled in response to the operation status of the first and second groups of sensors 13a and 13b and the contents of program written in advance in the program memory 123A.

Moreover, input signals obtained from the second group of sensors 13b are transmitted as the uplink communication data UPD to the key-station series-parallel converter 124 from the slave-station series-parallel converter 134; drive control signals to the second group of electric loads 14b are transmitted as the downlink communication data DND to the slave-station series-parallel converter 134 from the key-station series-parallel converter 124. Signal transmission between the key-station series-parallel converter 124 and slave-station series-parallel converter 134 are synchronized with each other by the communication synchronizing signal CLK.

During operation of the motor drive control device 100A, the monitor control circuit 130A monitors an operation state of the drive control circuit 120A. If any abnormality occurs in the drive control circuit 120A, the monitor control circuit generates the first abnormality detection signal ERR1 or the first reset signal RST1, to initialize and restart the drive control circuit 120A. In addition, when the first abnormality detection signal ERR1 or the first reset signal RST1 is being generated, the drive command signals to the AC motor 16 are interrupted at once by the second inhibit command signal STP2 to the drive command signal interruption circuit 150A.

During operation of the motor drive control device 100A, the drive control circuit 120A monitors an operation state of the monitor control circuit 130A in a reverse way. If any abnormality occurs in the monitor control circuit 130A, the drive control circuit 120A generates the second abnormality detection signal ERR2, to initialize and restart the monitor control circuit 130A. In addition, when the second abnormality detection signal ERR2 is being generated, the drive command signals to the AC motor 16 are interrupted at once by the first inhibit command signal STP1 to the drive command signal interruption circuit 150A.

Next, FIG. 4, which is the time chart for explaining the operation of the drive command signal interruption circuit 150A shown in FIG. 2, will be explained.

FIG. 4(A) is a waveform of the positive side drive command signal UP1 the drive control circuit 120A generates, which shows an example in which the logical level of the signal is "H" in the first time slot t1, "L" in the second time slot t2, and "H" in the third time slot t3.

FIG. 4(B) is a waveform of the negative side drive command signal UN1 of the same phase the drive control circuit 120A generates, which shows an example in which the logical level of the signal is "L" in the first time slot t1, "H" in the second time slot t2, and "H" in the third time slot t3.

However, it is an abnormal state never happening normally that the positive side drive command signal UP1 and negative side drive command signal UN1 of the same phase become logically "H" at the same time; the switching elements of the same phase are turned on at the same time in the third time slot t3, causing a dangerous state of the power source being short-circuited.

Figure 4:
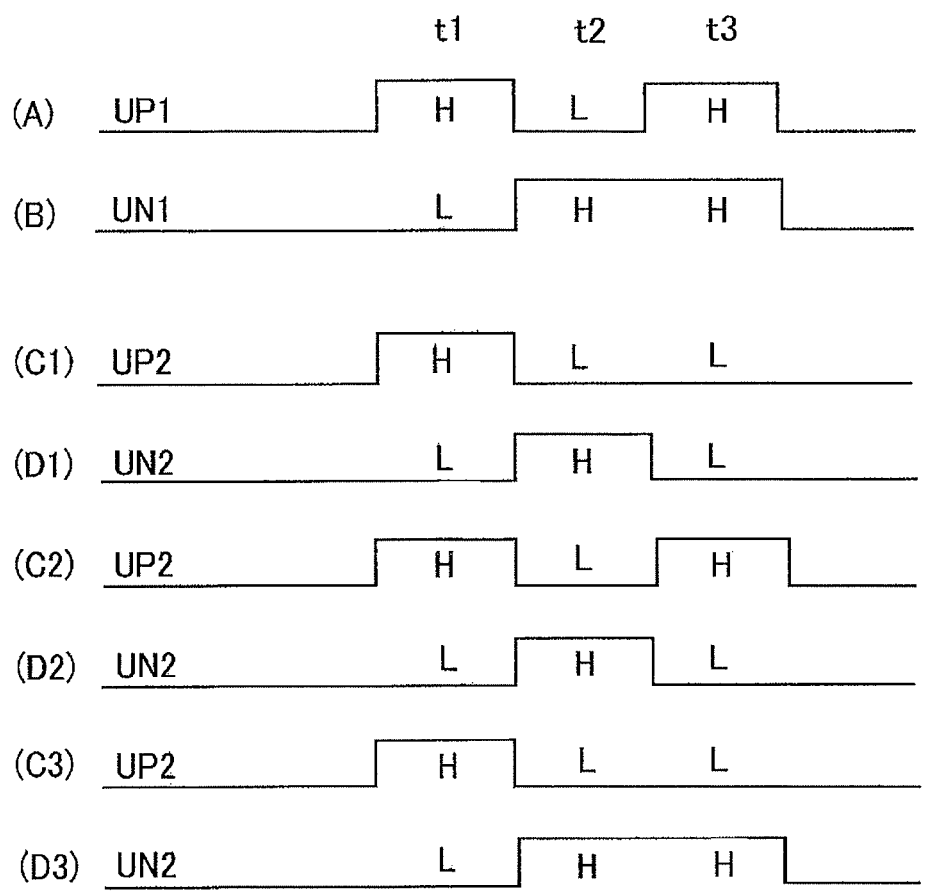
FIG. 4 is a time chart for explaining the operation of the circuit shown in FIG. 2.

FIG. 4(C1) is a waveform of a positive side intermediate drive command signal UP2 when both positive side logical elements 161A and negative side logical elements 162A in FIG. 2 are connected, the logical level of which in the third time slot t3 becomes "L" by the operation of the positive side logical elements 161A.

FIG. 4(D1) is a waveform of a negative side intermediate drive command signal UN2 when both positive side logical elements 161A and negative side logical elements 162A in FIG. 2 are connected, the logical level of which in the third time slot t3 becomes "L" by the operation of the negative side logical elements 162A. Therefore, if the positive side drive command signal UP1 and negative side drive command signal UN1 of the same phase become logically "H" at the same time, both corresponding intermediate drive command signals UP2 and UN2 become logically "L."

FIG. 4(C2) is a waveform of the positive side intermediate drive command signal UP2 when the positive side logical elements 161A in FIG. 2 are removed and only the negative side logical elements 162A are connected. Since the positive side logical elements 161A are removed, the logical level thereof in the third time slot t3 remains "H."

FIG. 4(D2) is a waveform of the negative side intermediate drive command signal UN2 when the positive side logical elements 161A in FIG. 2 are removed and only the negative side logical elements 162A are connected. The logical level in the third time slot t3 becomes "L" by the operation of the negative side logical elements 162A.

Therefore, when the positive side drive command signal UP1 and negative side drive command signal UN1 of the same phase become logical "H" at the same time, if only the negative side logical elements 162A are connected, the corresponding intermediate drive command signal UP2 becomes logical "H," and the intermediate drive command signal UN2 becomes logical "L"; therefore, the intermediate drive command signals UP2 and UN2 are prevented from becoming logical "H" at the same time.

FIG. 4(C3) is a waveform of the positive side intermediate drive command signal UP2 when the negative side logical elements 162A in FIG. 2 are removed and only the positive side logical elements 161A are connected, the logical level of which in the third time slot t3 becomes "L" by the operation of the positive side logical elements 161A. FIG. 4 (D3) is a waveform of the negative side intermediate drive command signal UN2 when the negative side logical elements 162A are removed and only the positive side logical elements 161A are connected. Since the negative side logical elements 162A are removed, the logical level thereof in the third time slot t3 remains "H."

Therefore, when the positive side drive command signal UP1 and negative side drive command signal UN1 of the same phase become logical "H" at the same time, if only the positive side logical elements 161A are connected, the corresponding intermediate drive command signal UP2 becomes logical "L," and the intermediate drive command signal UN2 becomes logical "H"; therefore, the intermediate drive command signals UP2 and UN2 are prevented from becoming logical "H" at the same time.

As is obvious from the above, in the short-circuit command prevention circuit 160A in FIG. 2, the intermediate drive command signals UP2 and UN2 can be prevented from becoming logical "H" at the same time by providing either the positive side logical elements 161A or negative side logical elements 162A; however, it is preferable that both positive side logical elements 161A and negative side logical elements 162A are connected.

Figure 3:
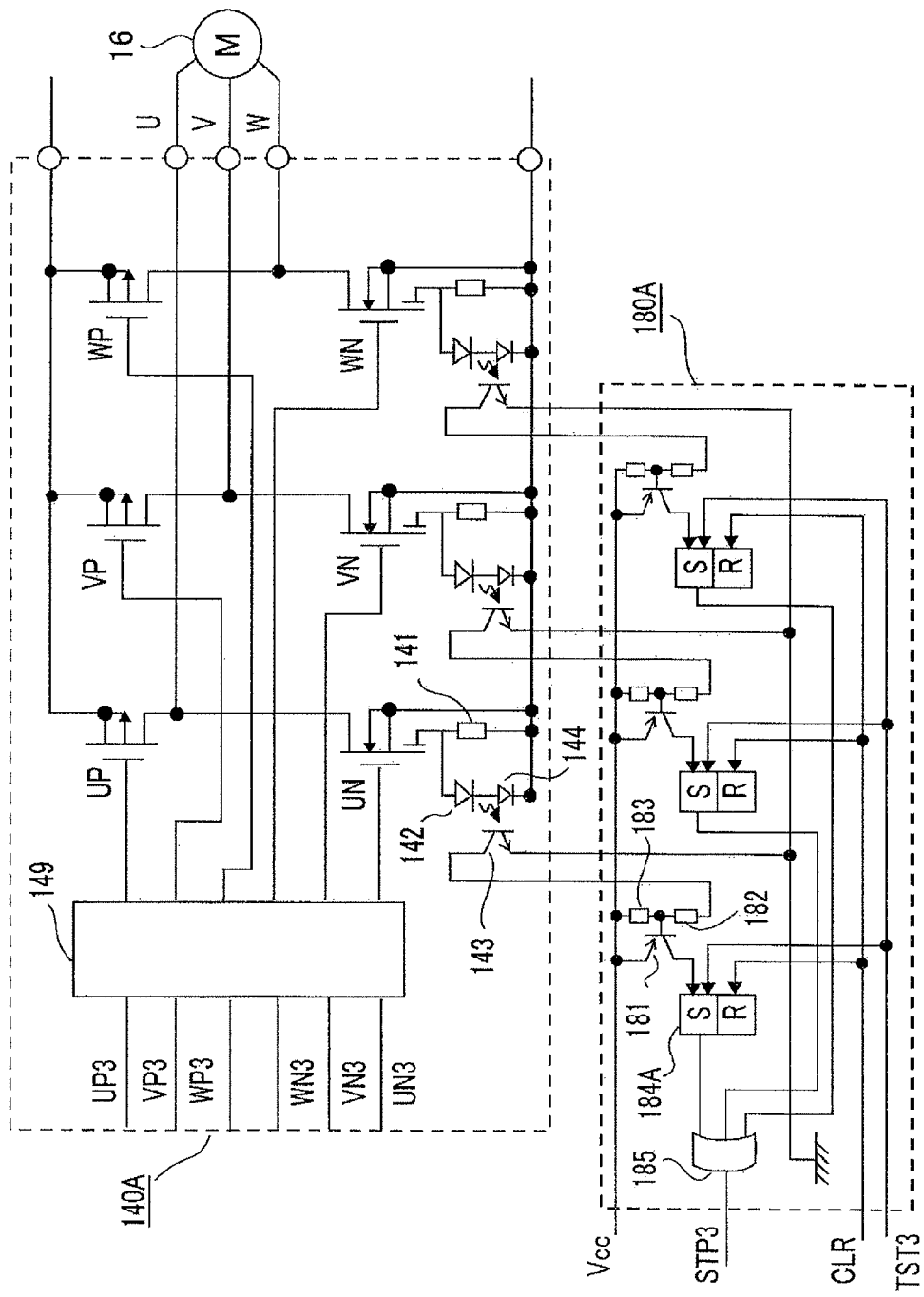
FIG. 3 is a detailed circuit diagram of the overcurrent occurrence memory circuit in FIG. 1.

In the overcurrent occurrence memory circuit 180A shown in FIG. 3, if one of the overcurrent detection elements 143 of any phase turned on during operation of the motor drive control device 100A, the one of the memory elements 184A for the phase memorizes an overcurrent occurrence, and the logical sum circuit 185 generates the third inhibit command signal STP3 to the drive command signal interruption circuit 150A, so as to interrupt at once the drive command signals to the AC motor 16.

Additionally, the drive control circuit 120A senses an overcurrent occurrence by the third inhibit command signal STP3, stops generation of the drive command signals UP1, VP1 and WP1, and UN1, VN1 and WN1, and also generates the overcurrent occurrence memory clear command signal CLR, so as to reset the memorized signal in the overcurrent occurrence memory circuit 180A, thereby enabling a new overcurrent occurrence to be memorized.

Next, FIG. 5, which is the first half of a time chart for explaining the operation of the entire configuration diagram in FIG. 1, will be explained.

Figure 5:
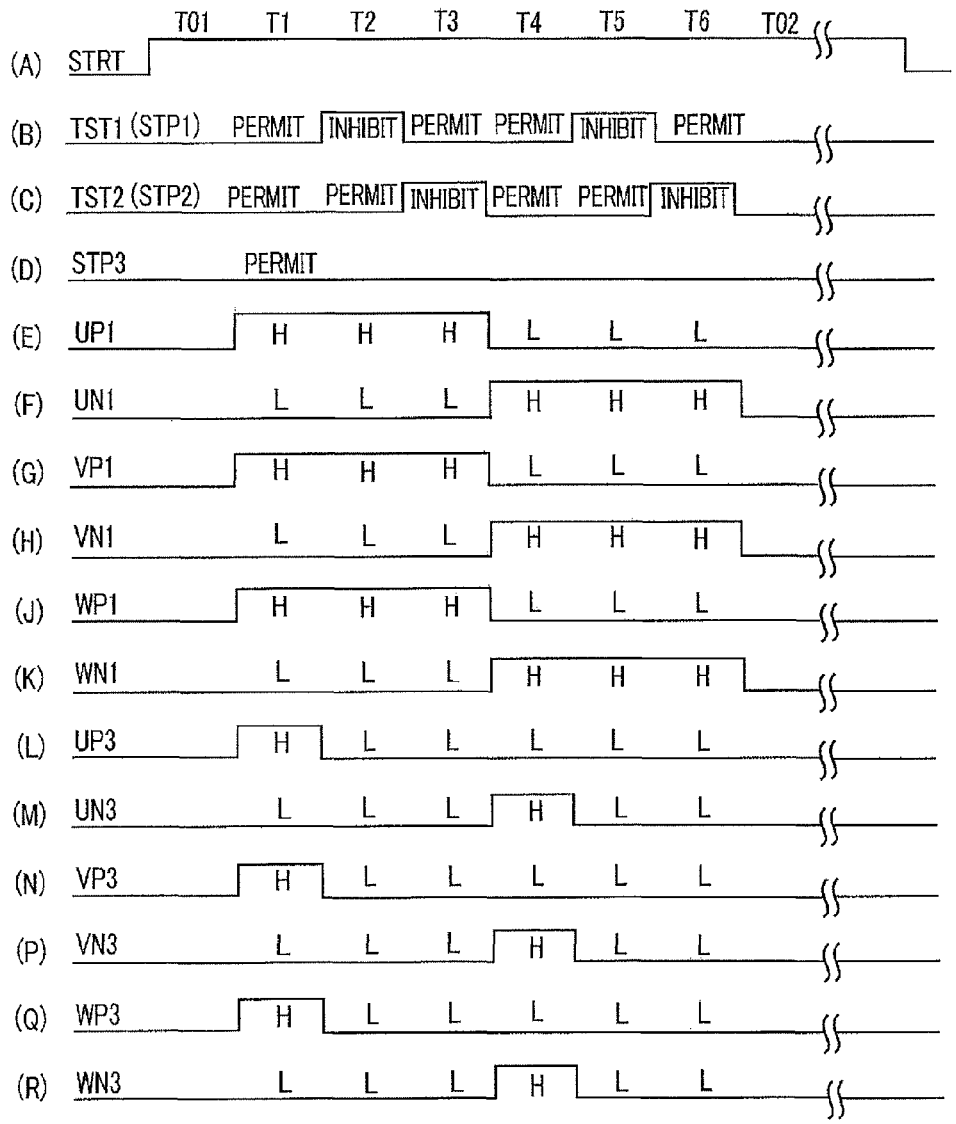
FIG. 5 is the first half of a time chart for explaining the operation of the entire configuration diagram in FIG. 1.
Figure 6:
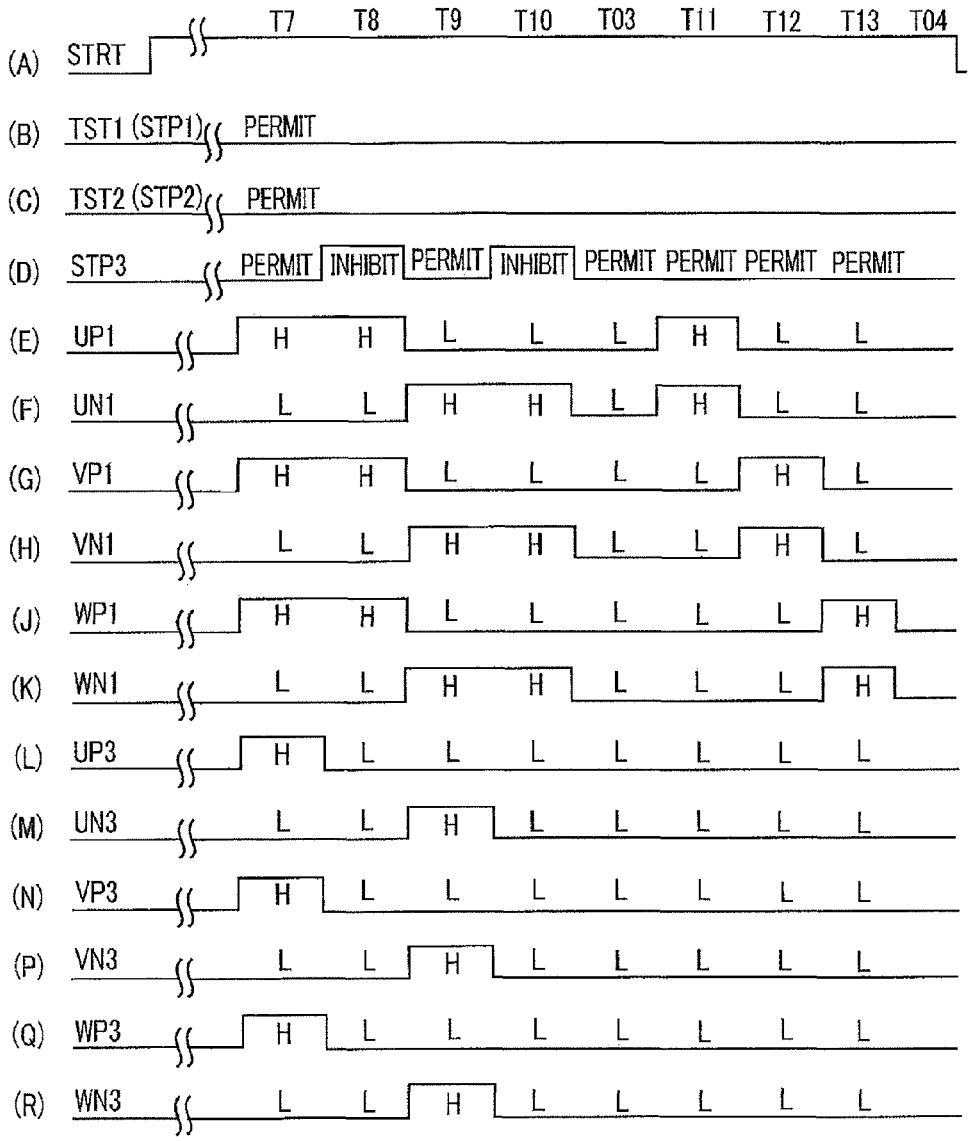
FIG. 6 is the second half of the time chart for explaining the operation of the entire configuration diagram in FIG. 1.

FIG. 5(A) shows a waveform of the check-start command signal STRT the drive control circuit 120A generates, the logical level of which is "H" in time slots T1 to T6 that are the time slots following a dummy slot T01, which is a standby period, and after a dummy slot T02, which is a standby slot leading to FIG. 6.

Additionally, the drive control circuit 120A and monitor control circuit 130A take other control except for the initial check in the standby slots T01 and T02; for example, the main CPU 121 generates the first watchdog signal WDS1.

FIG. 5(B) and FIG. 5(C) show waveforms of the first trial inhibit command signal TST1 the drive control circuit 120A generates and the second trial inhibit command signal TST2 the monitor control circuit 130A generates, respectively; in the time slots T1 to T6, both command output signals are "permit" (logical level "L"), or one of the output signals is "permit" and the other is "inhibit" (logical level "H"). FIG. 5(D) shows a waveform of the third inhibit command signal STP3 the overcurrent occurrence memory circuit 180A generates; this command signal is "permit" (logical level "L") over the whole period in FIG. 5.

FIG. 5 (E), FIG. 5 (G) and FIG. 5 (J) show waveforms of the positive side drive command signals UP1, VP1 and WP1, respectively; the signals are close-circuit drive command (logical level "H") in the time slots T1 to T3, and open-circuit drive command (logical level "L") in the time slots T4 to T6.

FIG. 5 (F), FIG. 5 (H) and FIG. 5 (K) show waveforms of the negative side drive command signals UN1, VN1 and WN1, respectively; the signals are the open-circuit drive command (logical level "L") in the time slots T1 to T3, and the close-circuit drive command (logical level "H") in the time slots T4 to T6.

Additionally, the time slots T1 to T3 are in a first mode in which only the positive side switching elements UP, VP and WP are given the close-circuit drive command, and the time slots T4 to T6 are in a second mode in which only the negative side switching elements UN, VN and WN are given the close-circuit drive command; however, the positive side and negative side switching elements are not turned on at the same time in both modes, so that the AC motor 16 will not be driven to rotate, nor the power source will be short-circuited.

FIG. 5(L), FIG. 5(N) and FIG. 5 (Q) show waveforms of the positive side command output signals UP3, VP3 and WP3, respectively; those waveforms are the close-circuit drive command (logical level "H") in the time slot T1 in which both first and second trial inhibit command signals TST1 and TST2 are "permit," whereas those are the open-circuit drive command (logical level "L") in the time slots T2 and T3 in which either the first trial inhibit command signal TST1 or the second trial inhibit command signal TST2 is "inhibit."

FIG. 5(M), 5(P) and 5(R) show waveforms of the negative side command output signals UN3, VN3 and WN3, respectively; those waveforms are the close-circuit drive command (logical level "H") in the time slot T4 in which both first and second trial inhibit command signals TST1 and TST2 are "permit," whereas those are the open-circuit drive command (logical level "L") in the time slots T5 and T6 in which either the first trial inhibit command signal TST1 or the second trial inhibit command signal TST2 is "inhibit."

The drive control circuit 120A (or monitor control circuit 130A) to which the positive side and negative side command output signals UP3, VP3 and WP3, and UN3, VN3 and WN3 are input as the command state monitoring signals can determine that the drive command signal interruption circuit 150A is operating normally, if the positive side and negative side command output signals UP3, VP3 and WP3, and UN3, VN3 and WN3 change as shown in FIG. 5 (L) to FIG. 5 (R) in the time slots T1 to T6.

Additionally, the correct-answer logical states in each time slot shown in FIG. 5 (L) to FIG. 5 (R) are written and stored in advance in a memory inside the drive control circuit 120A (or monitor control circuit 130A).

However, if the second trial inhibit command signal TST2 input in the logical sum element 170 is also allowed to be input to the drive control circuit 120A (see dotted line in FIG. 1), and all of the positive side and negative side command output signals UP3, VP3 and WP3, and UN3, VN3 and WN3 are allowed to be input in the drive control circuit 120A, the drive control circuit 120A can compare the drive command signals UP1, VP1 and WP1, and UN1, VN1 and WN1 and the first trial inhibit command signal TST1 that the drive control circuit generates by itself with the command state monitoring signals UP3, VP3 and WP3, and UN3, VN3 and WN3 and the second trial inhibit command signal TST2 that are input to the circuit, and can thereby determine directly whether or not the drive command signal interruption circuit 150A is normal.

Next, FIG. 6, which is the second half of the time chart for explaining the operation of the configuration diagram in FIG. 1, will be explained. FIG. 6(A) shows a waveform of the check-start command signal STRT following FIG. 5(A), the logical level of which becomes "H" in a period including time slots T7 to T10, a dummy slot T03, which is an intermediate standby period, time slots T11 to T13, and a dummy slot T04 just before ending, and the logical level thereof becomes "L" after the dummy slot T04, which is a standby end period, so that the check-start command signal STRT can be cleared.

Moreover, the drive control circuit 120A and monitor control circuit 130A take other control except for the initial check in the standby slots T03 and T04; for example, the main CPU 121 generates the first watchdog signal WDS1.

FIG. 6(B) and FIG. 6(C) show waveforms of the first trial inhibit command signal TST1 the drive control circuit 120A generates and the second trial inhibit command signal TST2 the monitor control circuit 130A generates, respectively; in FIG. 6, both command output signals are "permit" (logical level "L") over all of the time slots.

FIG. 6(D) shows a waveform of the third inhibit command output STP3 the overcurrent occurrence memory circuit 180A generates; the drive control circuit generates the third trial inhibit command signal TST3 in the time slots T8 and T10, and thereby makes the inhibit command signal STP3 "inhibit" (logical level "H"); meanwhile the drive control circuit generates the overcurrent occurrence memory clear command signal CLR in other time slots, and thereby makes the third inhibit command output STP3 "permit" (logical level "L").

Hereinafter, the time slots T7 to T10 will be explained, which relate to the third inhibit command output STP3 upon an overcurrent occurrence.

FIG. 6(E), FIG. 6(G) and FIG. 6(J) show waveforms of the positive side drive command signals UP1, VP1 and WP1, respectively; those signals are the close-circuit drive command (logical level "H") in the time slots T7 and T8, and the open-circuit drive command (logical level "L") in the time slots T9 and T10. FIG. 6(F), FIG. 6(H) and FIG. 6(K) show waveforms of the negative side drive command signals UN1, VN1 and WN1; those signals are the open-circuit drive command (logical level "L") in the time slots T7 and T8, and the close-circuit drive command (logical level "H") in the time slots T9 and T10.

Additionally, the time slots T7 and T8 are in the first mode in which only the positive side switching elements UP, VP and WP are given the close-circuit drive command, and the time slots T9 and T10 are in the second mode in which only the negative side switching elements UN, VN and WN are given the close-circuit drive command; however, the positive side and negative side switching elements are not turned on at the same time in both modes, so that the AC motor 16 will not be driven to rotate, nor the power source will be short-circuited.

FIG. 6(L), FIG. 6(N) and FIG. 6(Q) show waveforms of the positive side command output signals UP3, VP3 and WP3, respectively; those signals are the close-circuit drive command (logical level "H") in the time slot T7 in which the third inhibit command signal STP3 is "permit," whereas the signals are the open-circuit drive command (logical level "L") in the time slot T8 in which the third trial inhibit command signal TST3 is "inhibit."

FIG. 6(M), FIG. 6(P) and FIG. 6(R) show waveforms of the negative side command output signals UN3, VN3 and WN3, respectively; those signals are the close-circuit drive command (logical level "H") in the time slot T9 in which the third inhibit command signal STP3 is "permit," whereas the signals are the open-circuit drive command (logical level "L") in the time slot T10 in which the third trial inhibit command signal TST3 is "inhibit." The drive control circuit 120A (or monitor control circuit 130A) to which the positive side and negative side command output signals UP3, VP3 and WP3, and UN3, VN3 and WN3 are input as the command state monitoring signals can determine that the drive command signal interruption circuit 150A is operating normally, if the positive side and negative side command output signals UP3, VP3 and WP3, and UN3, VN3 and WN3 change as shown in FIG. 6 (L) to FIG. 5 (R) in the time slots T7 to T10.

Additionally, the correct-answer logical states in each time slot shown in FIG. 5 (L) to FIG. 5 (R) are written and stored in advance in the memory inside the drive control circuit 120A (or monitor control circuit 130A).

Next, the time slots T11 to T13 related to the short-circuit command prevention circuit 160A will be explained.

FIG. 6(E) and FIG. 6(F) show waveforms of the positive side and negative side drive command signals of the U-phase UP1 and UN1, respectively; both of the signals are the close-circuit drive command (logical level "H") in the time slot T11, and the open-circuit drive command (logical level "L") in the time slots T12 and T13.

FIG. 6(G) and FIG. 6(H) show waveforms of the positive side and negative side drive command signals of the V-phase VP1 and VN1, respectively; both of the signals are the close-circuit drive command (logical level "H") in the time slot T12, and the open-circuit drive command (logical level "L") in the time slots T11 and T13.

FIG. 6(J) and FIG. 6(K) show waveforms of the positive side and negative side drive command signals of the W-phase WP1 and WN1, respectively; both of the signals are the close-circuit drive command (logical level "H") in the time slot T13, and the open-circuit drive command (logical level "L") in the time slots T11 and T12.

FIG. 6 (L), FIG. 6(N) and FIG. 6(Q) show waveforms of the positive side command output signals UP3, VP3 and WP3; meanwhile FIG. 6 (M), FIG. 6(P) and FIG. 6(R) show waveforms of the negative side command output signal UN3, VN3 and WN3, respectively; however, when both positive side and negative side command output signals of the same phase are the close-circuit drive command, the actual command output signals are found to be the open-circuit drive command.

The drive control circuit 120A (or monitor control circuit 130A) to which the positive side and negative side command output signals UP3, VP3 and WP3, and UN3, VN3 and WN3 are input as the command state monitoring signals can determine that the drive command signal interruption circuit 150A is operating normally, if the positive side and negative side command output signals UP3, VP3 and WP3, and UN3, VN3 and WN3 all are logically "L" in the time slots T11 to T13 as shown in FIG. 6(L) to FIG. 6(R).

Additionally, the correct logical states in each time slot shown in FIG. 5 (L) to FIG. 5 (R) are written and stored in advance in the memory inside the drive control circuit 120A (or monitor control circuit 130A).

Moreover, in a sequence of the initial check from a time when the check-start command signal STRT is generated to a time when the check is conducted based on the predetermined time schedule, if the drive control circuit 120A or monitor control circuit 130A detects an abnormality in the initial check, the first trial inhibit command signal TST1 or the second trial inhibit command signal TST2 continues to be generated, to report the abnormality until the output contact of the power supply relay 12 is opened so that power supply to the drive control circuit 120A is interrupted. In addition, when the monitor control circuit 130A continues to generate the trial inhibit command signal TST2, the first abnormality detection signal ERR1 is generated, or the abnormality occurrence is reported to the drive control circuit 120A, and the drive control circuit is enabled to memorize the reported result as abnormality occurrence information.

If the second trial inhibit command signal TST2 is also allowed to be input to the drive control circuit 120A, the drive control circuit 120A can sense the abnormal state of the second trial inhibit command signal TST2 being continuously generated.

Furthermore, during a period in which the drive control circuit 120A or monitor control circuit 130A continues to generate the first trial inhibit command signal TST1 or second trial inhibit command signal TST2, the AC motor 16 cannot be driven to rotate. When the vehicle is a hybrid car, the drive control circuit 120A and monitor control circuit 130A cooperate to drive and control the vehicle engine, so that escape mode operation can be performed by the vehicle engine.

In the foregoing explanation, it has been described that the motor drive control device 100A drives and controls the engine of the hybrid car as well as variable-speed-drives the AC motor 16.

However, the motor drive control device 100A not only variable-speed-drives the AC motor 16, but also has other important functions such as regenerative charging control of the DC drive power source 15 from the AC motor 16, and rotational drive control of another main motor; those other control functions can be performed even in a state of the AC motor 16 being stopped, and this is applied to other uses such as the AC motor 16 is required to stop in safety in an emergency operation.

As is clear from the foregoing explanation, the motor drive control device 100A according to Embodiment 1 of the present invention includes the semiconductor bridge circuit 140A in which the positive side switching elements UP, VP and WP connected to the positive terminal of the DC drive power source 15 are connected in series with their respective negative side switching elements UN, VN and WN connected to the negative side terminal thereof, and series-connection points of a plurality of switching elements connected in series are connected with the respective drive terminals U, V and W of the AC motor; and the drive control circuit 120A that sequentially generates the positive side and negative side drive command signals UP1, VP1 and WP1, and UN1, VN1 and WN1 to the positive side switching elements UP, VP and WP and negative side switching elements UN, VN and WN, and takes variable-speed control of the AC motor 16. The motor drive control device 100A further includes the monitor control circuit 130A that transmits the mutually-monitoring signals UPD and DND to and from the drive control circuit 120A so as to monitor the operation state of the drive control circuit at all times, and if any abnormality is detected, generates the abnormality detection signal ERR1 to initialize and restart the drive control circuit; and the drive command signal interruption circuit 150A that is placed in the transmission paths for the positive side and negative side drive command signals UP1, VP1 and WP1, and UN1, VN1 and WN1, and interrupts all of the positive side and negative side drive command signals at once by the first inhibit command signal STP1 the drive control circuit 120A generates or by the second inhibit command signal STP2 the monitor control circuit 130A generates.

The command state monitoring signals are input in at least either one of the drive control circuit 120A and monitor control circuit 130A; the command state monitoring signals are the positive side and negative side command output signals UP3, VP3 and WP3, and UN3, VN3 and WN3 the drive command signal interruption circuit 150A generates.

The drive control circuit 120A also transmits to the monitor control circuit 130A the check-start command signal STRT immediately after powered on or at least during an operation pause period of the AC motor 16 stopping, and following that, sequentially generates the positive side and negative side drive command signals UP1, VP1 and WP1, and UN1, VN1 and WN1 and the first inhibit command signal STP1, based on the predetermined time schedule. After receiving the check-start command signal STRT, the monitor control circuit 130A also generates the second inhibit command signal STP2 in a predetermined time slot based on the predetermined time schedule.

The drive control circuit 120A or monitor control circuit 130A to which the command state monitoring signals UP3, VP3 and WP3, and UN3, VN3 and WN3 are input determines whether or not logical change of the command state monitoring signals UP3, VP3 and WP3, and UN3, VN3 and WN3 is taking place in the predetermined time slot based on the predetermined time schedule. If the drive control circuit 120A determines that the logical change is not properly taking place, the drive control circuit 120A stops the generation of drive command signals UP1, VP1 and WP1, and UN1, VN1 and WN1, and also continues to generates the first inhibit command signal STP1. If the monitor control circuit 130A determines that proper logical change is not taking place, the monitor control circuit continues to generate the second inhibit command signal STP2. The drive control circuit 120A and monitor control circuit 130A cooperate with each other to check the operation of the drive command signal interruption circuit 150A. When the interruption function is normal, the circuits start driving the AC motor 16 to rotate, whereas if any abnormality occurs in the drive control circuit 120A during operation, rotational drive of the AC motor 16 is set to be stopped by the first inhibit command signal STP1 or second inhibit command signal STP2.

As described above, according to the motor drive control device of the present invention, if any abnormality occurs in the drive control circuit during operation, even if the drive control circuit is not able to stop the drive command signals, the monitor control circuit and drive command signal interruption circuit interrupt the drive command signals at once, so that the AC motor can be driven to stop, thereby enhancing safety.

Moreover, whether or not the drive command signal interruption circuit operates normally is checked based on the predetermined time schedule when starting operation. Even if the drive control circuit and monitor control circuit do not know each other what command signals the other party is generating, any abnormality occurrence can be determined by the drive control circuit or monitor control circuit whichever the command state monitoring signals are input to.

Therefore, since operation of the drive command signal interruption circuit can be checked without depending on the serial communication, the operation of the drive command signal interruption circuit can be checked quickly even before the serial communication has been established between the drive control circuit and monitor control circuit, immediately after powered on.

The drive control circuit 120A essentially includes the main CPU that is a microprocessor and cooperates with the RAM memory 122 and program memory 123A, and to which is connected the key-station series-parallel converter 124 that transmits the mutually-monitoring signals UPD and DND to and from the monitor control circuit 130A. The monitor control circuit 130A essentially includes the control logic circuit 131A that cooperates with the auxiliary RAM memory 132, and to which are connected the slave-station series-parallel converter 134 connected in series to the key-station series-parallel converter 124, and the watchdog timer 135 that monitors the pulse width of the first watchdog signal WDS1 the main CPU 121 generates, and generates the first reset command signal RST1 to initialize and restart the main CPU 121 when a logically unchanging period of the pulse has passed exceeding the predetermined time.

The monitor control circuit 130A also detects the presence/absence of code error in the communication data and abnormal delay of the data with respect to the downlink communication signal DND that the drive control circuit 120A transmits thereto, thereby determines the presence/absence of an abnormality in the downlink, also transmits on a regular basis question information to the drive control circuit 120A, and determines the presence/absence of an abnormality in question and answer as to whether or not the answer information corresponding to the question information agrees with the predetermined correct-answer information. If any abnormality occurs in the downlink communication or in the question and answer, the monitor control circuit generates the first abnormality detection signal ERR 1. The drive control circuit 120A also detects the presence/absence of code error in the communication data and abnormal delay of the data with respect to the uplink communication signal UPD transmitted at least from the monitor control circuit 130A, and determines whether or not an abnormality occurs in the uplink communication. If any abnormality occurs in the uplink, the drive control circuit generates the second abnormality detection signal ERR2, to initialize and restart the monitor control circuit 130A.

The first inhibit command signal STP1 is the logical sum of the first trial inhibit command signal TST1 generated in connection with generation of the check-start command signal STRT and the second abnormality detection signal ERR2; however even if the first trial inhibit command signal TST1 is generated, the monitor control circuit 130A is not initialized nor restarted. The second inhibit command signal STP2 is the logical sum of the second trial inhibit command signal TST2 generated in connection with the generation of the check-start command signal STRT, the first abnormality detection signal ERR 1 and the first rest signal RST1 to the main CPU 121; however even if the second trial inhibit command signal TST2 is generated, the drive control circuit 120A is not initialized nor restarted.

As described above, the monitor control circuit is configured using a hard logic circuit without including a microprocessor. The first inhibit command signal is the logical sum of the first trial inhibit command signal the drive control circuit generates following the check-start command signal and the second abnormality detection signal to initialize and restart the monitor control circuit; however, even if the first trial inhibit command signal is generated, the monitor control circuit is not initialized nor restarted. The second inhibit command signal is the logical sum of the second trial inhibit command signal the monitor control circuit generates following the check-start command signal, the first abnormality detection signal and the first reset signal to the main CPU; however even if the second trial inhibit command signal is generated, the drive control circuit is not initialized nor restarted.

Therefore, this has a feature in that the drive control circuit and monitor control circuit are not unnecessarily initialized nor restarted, and the operation of the drive command signal interruption circuit can be checked by the first and second trial inhibit command signals in a state in which the drive control circuit can generate the drive command signals.

Moreover, when monitor control specification is fixed, the monitor control circuit can be made up of inexpensive logic circuits without a microprocessor.

In a sequence of the initial check conducted based on the predetermined time schedule after the check-start command signal STRT is generated, if the drive control circuit 120A or the monitor control circuit 130A detects any abnormality in the initial check, the first trial inhibit command signal TST1 or the second trial inhibit command signal TST2 continues to be generated, to report the abnormality until power supply to at least the drive control circuit 120A is interrupted. Moreover when the monitor control circuit 130A continues to generate the second trial inhibit command signal TST2, the first abnormality detection signal ERR1 is generated, or the abnormality occurrence is reported to the drive control circuit 120A, so that the drive control circuit can memorize the reported result as abnormality occurrence information.

As described above, if any abnormality is detected in the initial check, the first and second trial inhibit command signals continue to be generated until power supply to the drive control circuit is interrupted, so as to inhibit the AC motor operation and report the abnormality. The continuous generation of the second trial inhibit command signal is reported to the drive control circuit and memorized there.

Therefore, this has a feature in that if the abnormality is a single abnormality due to noise malfunction and the like, the operation of the circuit can be restarted by restoring power, and in addition, any abnormality occurrence in the initial check can be memorized as abnormality occurrence information by the drive control circuit.

The command state monitoring signals input to at least either one of the drive control circuit 120A and the monitor control circuit 130A are the positive side and negative side command output signals UP3, VP3 and WP3, and UN3, VN3 and WN3 the drive command signal interruption circuit 150A generates. After generating check-start command signal STRT, the drive control circuit 120A changes modes in such a way that the negative side drive command signals UN1, VN1 and WN1 are brought at once into a logical state of no drive command being present, as well as the positive side drive command signals UP1, VP1 and WP1 are brought into a logical state of drive command being present, which is the first mode, or the negative side drive command signals UN1, VN1 and WN1 are brought into the logical state of drive command being present, as well as the positive side drive command signals UP1, VP1 and WP1 are brought at once into the logical state of no drive command signals being present, which is the second mode, and executes the first mode and second mode in a predetermined sequence. The drive control circuit 120A or the monitor control circuit 130A changes both first trial inhibit command signal TST1 and second trial inhibit command signal TST2 into a state of the inhibit command signal clearing, or changes only either of the trial inhibit command signals into a state of the inhibit command being present, monitors the logical states of the positive side command output signals UP3, VP3 and WP3 input in the first mode and logical states of the negative side command output signals UN3, VN3 and WN3 input in the second mode, and compares those states with the logical states of the positive side and negative side drive command signals UP1, VP1 and WP1, and UN1, VN1 and WN1, or determines whether or not the logical states of those command output signals agree with the correct logical states memorized in advance. If any abnormality is found in the determination result, the drive control circuit 120A or the monitor control circuit 130A is enabled to continue to generate the first trial inhibit command signal TST1 or the second trial inhibit command signal TST2.

As described above, the command state monitoring signals input to at least either one of the drive control circuit and monitor control circuit are the positive side and negative side command output signals the drive command signal interruption circuit generates. The drive control circuit brings either the positive side drive command signals or the negative side drive command signals into the state of drive command being present at once, and monitors logical states of the command state monitoring signals that correspond to whether or not the first and second trial inhibit command signals each are in an inhibit state, whereby the drive control circuit is enabled to determine that the drive command signal interruption circuit is operating normally.

Therefore, this has a feature in that in order for the AC motor not to be unnecessarily driven to rotate, the drive control circuit can determine that drive command signal interruption circuit is operating normally, by combining all the states of the drive command signals and the first and second trial inhibit command signals, without bringing the positive side and negative side drive command signals into the state of drive command being present at the same time.

The command state monitoring signals UP3, VP3 and WP3, and UN3, VN3 and WN3 are input to the drive control circuit 120A, and the second trial inhibit command signal TST2 that is generated by the monitor control circuit 130A and input in the drive command signal interruption circuit 150A is also input in the drive control circuit 120A. The drive control circuit 120A is enabled to determine whether or not the drive command signal interruption circuit 150A is operating normally by combination of the logical states of the positive side and negative side drive command output signals UP1, VP1 and WP1, and UN1, VN1 and WN1 and the first trial inhibit command signal TST1 the drive control circuit 120A generates, and the logical states of the command state monitoring signals UP3, VP3 and WP3, and UN3, VN3 and WN3, and the second trial inhibit command signal TST2 that are input to the drive control circuit.

As described above, the command state monitoring signals and second trial inhibit command signal are input in the drive control circuit that generates the drive command signals and the first trial inhibit command signal. Therefore, this has a feature in that even if the drive control circuit and monitor control circuit do not memorize in advance the correct-answer information based on the predetermined time schedule, the drive control circuit can determine whether or not the drive command signal interruption circuit is operating normally by directly comparing input and output signals in each time slot.

The drive command signal interruption circuit 150A includes the positive side gate elements 151A provided in the transmission paths for the positive side drive command signals UP1, VP1 and WP1, and the negative side gate elements 152A provided in the transmission paths for the negative side drive command signals UN1, VN1 and WN1. The composite inhibit command signal STP that is the logical sum of the first inhibit command signal STP1 and second inhibit command signal STP2 is input to the positive side gate elements 151A and negative side gate elements 152A as a gate signal. In the front stage of the positive side gate elements 151A and negative side gate elements 152A is provided the short-circuit command prevention circuit 160A that prevents close-circuit drive command signals from being supplied at the same time to the positive side switching elements UP, VP and WP and negative side switching elements UN, VN and WN connected with each other in the same phase. Even if the drive control circuit 120A, after generating the check-start command signal STRT, generates the close-circuit drive command signals at the same time to the positive side switching elements UP, VP and WP and the respective negative side switching elements UN, VN and WN connected in the same phase, the drive control circuit is enabled to sequentially check and confirm that the command output signals UP3, VP3 and WP3, and UN3, VN3 and WN3 the drive command signal interruption circuit 150A generates are not the close-circuit drive command signal at the same time.

As described above, the drive command signal interruption circuit is provided with the short-circuit command prevention circuit so that the drive command signals to the positive side and negative side switching elements of the same phase are not brought into the state of the drive command being present at the same time, and operation check can be conducted when starting operation.

Therefore, this has a feature in that short-circuit and burn-out troubles can be prevented from occurring, even if the drive command signals are generated at the same time during operation startup due to noise malfunction and the like. Moreover, this has another feature in that operation check of the short-circuit command prevention circuit is conducted together with the check of the drive command signal interruption circuit when starting operation, so that logical operation such as never occurring normally can be checked in advance.

The overcurrent occurrence memory circuit 180A is connected to the semiconductor bridge circuit 140A, and includes memory elements that memorize operation record once the overcurrent detection elements 143 provided at the negative side switching elements UN, VN and WN or positive side switching elements UP, VP and WP are put into operation. The memory elements are the memory elements 184A for each phase whose output signals are put together by the logical sum circuit 185 to make the third inhibit command signal STP3. The third inhibit command signal STP3 is directly logically summed with the first inhibit command signal STP1 and second inhibit command signal STP2, without passing through the drive control circuit 120A, to become the composite inhibit command signal STP to the drive command signal interruption circuit 150A. The drive control circuit 120A generates the overcurrent occurrence memory clear command signal CLR to the overcurrent occurrence memory circuit 180A and an overcurrent generation force memory command signal that becomes the third trial inhibit command signal TST3, and the third inhibit command signal STP3 is input in the drive control circuit 120A. Furthermore, the drive control circuit 120A is enabled to generate the third trial inhibit command signal TST3 in the predetermined time slot following the generation of the check-start command signal STRT, and confirm interruption operation of the drive command output signals UP1, VP1 and WP1, and UN1, VN1 and WN1 by the drive command signal interruption circuit 150A. In addition, the drive control circuit is enabled to receive the third inhibit command signals STP3 during operation, so as to sense an overcurrent occurrence, stop the generation of the drive command signals UP1, VP1, WP1 and UN1, and VN1 and WN1, and then clear the memory state of the memory elements 184A for each phase by the overcurrent occurrence memory clear command signal CLR.

As described above, the drive command signal interruption circuit directly interrupts the drive command signals by the third inhibit command signal the overcurrent occurrence memory circuit generates, and this interruption function is checked and confirmed when starting operation.

Moreover, the drive control circuit is enabled to sense an overcurrent by the third inhibit command signal, and then clear the memory state of the overcurrent occurrence memory circuit. Therefore, this has a feature in that if any overcurrent occurs during operation, whether or not the overcurrent protection operation is normal can be checked in a simulated manner when starting operation, as well as the switching elements can be quickly turned off to prevent the elements from burning out.

Furthermore, by sensing the overcurrent occurrence, the drive control circuit stops the generation of the drive command signals, and then clears the memory state of the overcurrent occurrence memory circuit; therefore this has another feature in that if any new overcurrent abnormality occurs, the drive control circuit is enabled to immediately detect the abnormality.

Embodiment 2

Hereinafter, FIG. 7, which is an entire configuration diagram of Embodiment 2 of the present invention, will be explained, focusing on the difference with that in FIG. 1.

Additionally, the same reference numerals represent the same or corresponding parts in each drawing.

Figure 7:
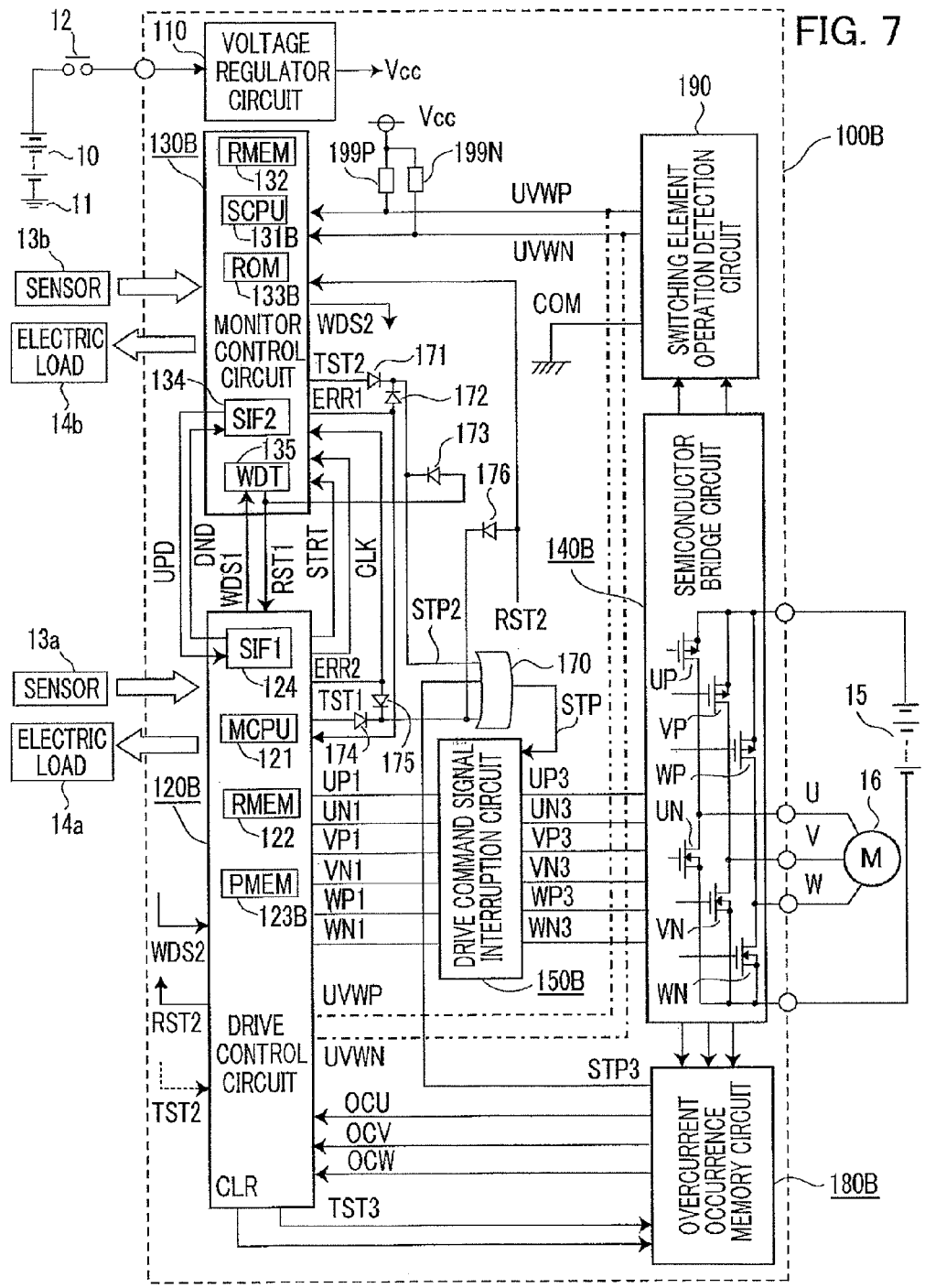
FIG. 7 is an entire configuration diagram showing Embodiment 2 of the invention.

In FIG. 7, a motor drive control device 100B essentially includes a drive control circuit 120B that takes rotational control of a not-shown vehicle engine and traction motor, the same as that in FIG. 1; a monitor control circuit 130B that cooperates with the drive control circuit and monitors each other; a semiconductor bridge circuit 140B that supplies power to the traction motor; a drive command signal interruption circuit 150B; and an overcurrent occurrence memory circuit 180B. In addition to those, the device includes anew a switching element operation detection circuit 190 described later.

A switching operation monitoring signal UVWP of the positive side switching elements and switching operation monitoring signal UVWN of the negative side switching elements are detected by the switching element operation detection circuit 190 and input to the monitor control circuit 130B (or drive control circuit 120B), and pull-up resistors 199P and 199N are connected to their respective monitoring signal lines.

The vehicle battery 10, the power supply relay 12, the first and second groups of input sensors 13a and 13b, the first and second groups of electric loads 14a and 14b, the DC drive power source 15, and the three-phase AC motor 16 are connected to the motor drive control device 100B at the exterior thereof, the same as those in FIG. 1.

The voltage regulator circuit 110 that generates the control voltage Vcc is provided, the same as FIG. 1, inside the motor drive control device 100B.

The drive control circuit 120B includes the main CPU 121, which is a microprocessor, the RAM memory 122 for operational processing, a non-volatile program memory 123B, which is a flash memory, for example, and the key-station series-parallel converter 124 with those connected with each other through a bus.

The monitor control circuit 130B includes a sub CPU 131B, which is a microprocessor, the auxiliary RAM memory 132 for operational processing, a non-volatile program memory 133B, which is a mask ROM memory, for example, and the slave-station series-parallel converter 134 with those connected with each other through a bus.

The watchdog timer 135 provided in the monitor control circuit 130B monitors the pulse width of the first watchdog signal WDS1 the main CPU 121 generates, and when a logically unchanging period of the pulse has passed exceeding a predetermined time, the timer is set to generate the first reset command signal RST1 to initialize and restart the main CPU 121.

The main CPU 121 monitors the pulse width of a second watchdog signal WDS2 the sub CPU 121 generates, and when a logically unchanging period has passed exceeding the predetermined time, the timer is set to generate a second reset command signal RST2 to initialize and restart the sub CPU 131B.

The downlink communication data DND and uplink communication data UPD are serially transmitted using the communication synchronizing signal CLK, between the key-station series-parallel converter 124 and slave-station series-parallel converter 134, the same as the case in FIG. 1.

Moreover, the check start-command signal STRT is transmitted from the drive control circuit 120B to the monitor control circuit 130B as a timing signal to start startup check described later.

Additionally, the monitor control circuit 130B determines the presence/absence of a communication abnormality of the downlink communication data DND transmitted from the drive control circuit 120B, also transmits on a regular basis question information to the drive control circuit 120B, and determines the presence/absence of an abnormality of question and answer. If any abnormality occurs in the downlink communication or question and answer, the monitor control circuit is enabled to generate the first abnormality detection signal ERR1, to initialize and restart the main CPU 121.

Furthermore, the drive control circuit 120B determines the presence/absence of a communication abnormality of the uplink communication data UPD transmitted from the monitor control circuit 130B. If any abnormality occurs in the uplink communication, the drive control circuit is enabled to generate the second abnormality detection signal ERR2, to initialize and restart the monitor control circuit 130B.

In the semiconductor bridge circuit 140B, the positive side switching elements UP, VP and WP connected to the positive terminal of the DC drive power source 15 are connected in series with their respective negative side switching elements UN, VN and WN connected to the negative side terminal thereof, and series-connection points of a plurality of switching elements connected in series are connected to the respective drive terminals U, V and W of the AC motor 16.

Figure 8:
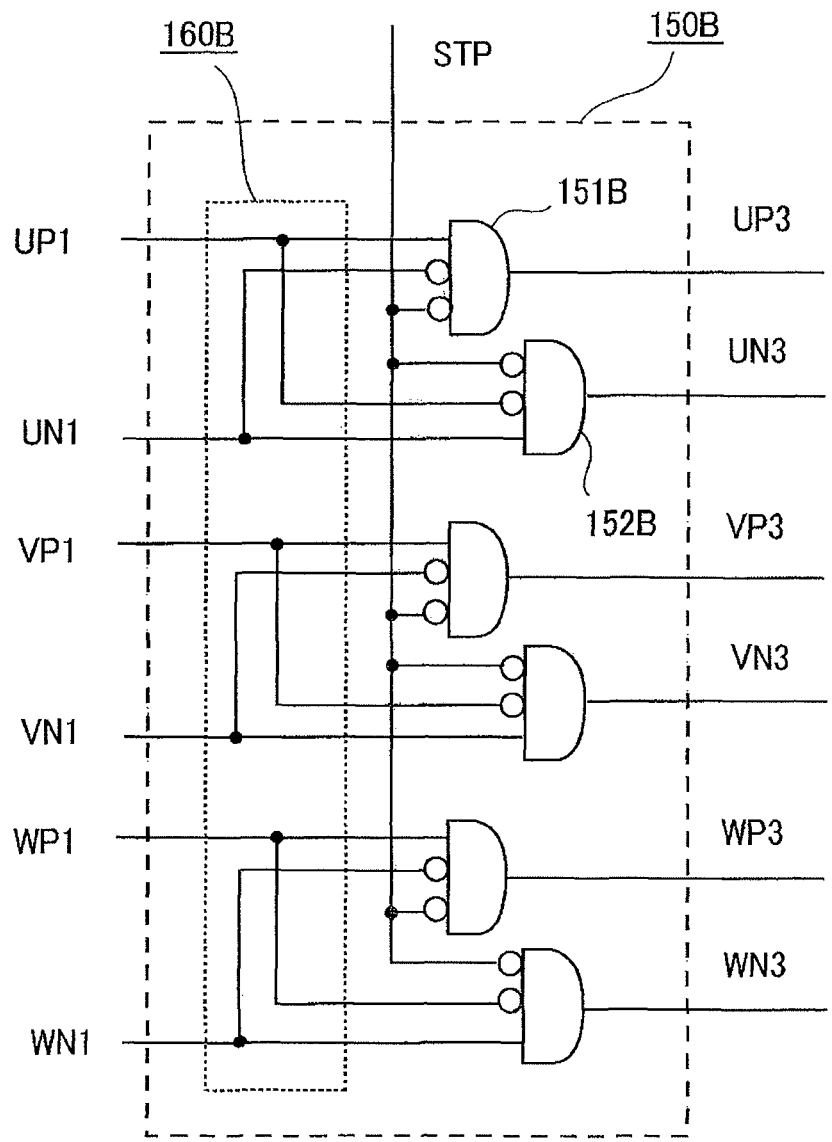
FIG. 8 is a detailed circuit diagram of the drive command signal interruption circuit in FIG. 7.

The drive command signal interruption circuit 150B described later in FIG. 8 is supplied with the positive side and negative side drive command signals UP1, VP1 and WP1, and UN1, VN1 and WN1 the drive control circuit 120B generates, and generates positive side command output signals UP3, VP3 and WP3 and negative side command output signals UN3, VN3 and WN3, which serve as close-circuit command signals to the positive side switching elements UP, VP and WP and the negative side switching elements UN, VN and WN.

However, when the logical value of the composite inhibit command signal STP input to the drive command signal interruption circuit 150B is "1," the logical values of all of the command output signals UP3, VP3 and WP3, and UN3, VN3 and WN3 become "0," regardless of the logical states of the drive command signals UP1, VP1 and WP1, and UN1, VN1 and WN1, so that open-circuit command can be given to all of the switching elements UP, VP and WP, and UN, VN and WN.

The first inhibit command signal STP1, second inhibit command signal STP2 and third inhibit command signal STP3 are input to the logical sum element 170 that produces the composite inhibit command signal STP. When any one of the inhibit command signals becomes logical "1," all of the output signals from the drive command signal interruption circuit 150B become logical "0," so that the open-circuit command is given to all of the switching elements UP, VP and WP, and UN, VN and WN.

The first inhibit command signal STP1 the drive control circuit 120B generates is the logical sum of the first trial inhibit command signal TST1 generated in connection with generation of the check-start command signal STRT, the second abnormality detection signal ERR2 and the second reset command signal RST2 to the sub CPU 131B; however, those signals are connected in logical OR configuration by diodes 174, 175 and 176 so that the monitor control circuit 130B is not initialized nor restarted even if the first trial inhibit command signal TST1 is generated.

The second inhibit command signal STP2 the monitor control circuit 130B generates is the logical sum of the second trial inhibit command signal TST2 generated in connection with generation of the check-start command signal STRT, the first abnormality detection signal ERR1 and the first reset command signal RST1 to the main CPU 121; however, those signals are connected in logical OR configuration by diodes 171, 172 and 173 so that the drive control circuit 120B is not initialized nor restarted even if the second trial inhibit command signal TST2 is generated.

The overcurrent occurrence memory circuit 180B described later in FIG. 9 includes memory elements for each phase that memorize overcurrent once overcurrent detection elements provided for each phase are put into operation. If any one of the memory elements for each phase memorizes an overcurrent occurrence, the third inhibit command signal STP3 is generated, and the drive command signal interruption circuit 150B is enabled to interrupt at once the drive command signals UP1, VP1 and WP1, and UN1, VN1 and WN1.

The overcurrent occurrence memory signals of each phase OCU, OCV and OCW by the memory elements for each phase are input in the drive control circuit 120B. The main CPU 121 interrupts the drive command signals UP1, VP1 and WP1, and UN1, VN1 and WN1 if the CPU senses the overcurrent, and also generates the overcurrent occurrence memory clear command signal CLR, so as to reset the memory in the memory elements inside the overcurrent occurrence memory circuit 180B.

The drive control circuit 120B is also enabled to generate the third trial inhibit command signal TST3 in a predetermined time slot following generation of the check-start command signal STRT, forcibly memorize an overcurrent occurrence state in the memory elements inside the overcurrent occurrence memory circuit 180B, and confirm interruption operation of the drive command signals UP1, VP1 and WP1, and UN1, VN1 and WN1 by the drive command signal interruption circuit 150B.

Additionally, if the second inhibit command signal TST2 the monitor control circuit 130B generates is not only input to the logical sum element 170, but also input in the drive control circuit 120B, part of an operation state of the monitor control circuit 130B can be monitored by the drive control circuit 120B.

FIG. 8, which is a detailed circuit diagram of the drive command signal interruption circuit in FIG. 7, will be explained next.

In FIG. 8, the drive command signal interruption circuit 150B is configured by connecting positive side three-input gate elements 151B and negative side gate elements 152B with the U-, V- and W-phases. When the composite inhibit command signal STP is made logical "1," output logical values of the positive side gate elements 151B and negative side gate elements 152B of each phase all become "0," which is output as the command output signals UP3, VP3 and WP3, and UN3, VN3 and WN3.

Therefore, the positive side and negative side drive command signals UP1, VP1 and WP1, and UN1, VN1 and WN1 are input to the second input terminals of the respective gate elements, as well as the logically-reversed signal of the composite inhibit command signal STP is input, as a gate signal, to all of the first input terminals of the positive side gate elements 151B and negative side gate elements 152B of each phase.

A short-circuit prevention circuit 160B is enabled to input to the third input terminals of the positive side gate elements 151B the logically-reversed signals of the negative side drive command signals UN1, VN1 and WN1 as well as input to the third input terminals of the negative side gate elements 152B the logically-reversed signals of the positive side drive command signals UP1, VP1 and WP1. As a result, if drive command signals of the same phase UP1 and UN1, VP1 and VN1, and WP1 and WN1 erroneously become logical "1" at the same time, the command output signals UP3 and UN3, VP3 and VN3, and WP3 and WN3 are all made logical "0."

Next, FIG. 9, which is a detailed circuit diagram of the overcurrent occurrence memory circuit in FIG. 7, will be explained, focusing on the difference with that in FIG. 3.

Figure 9:
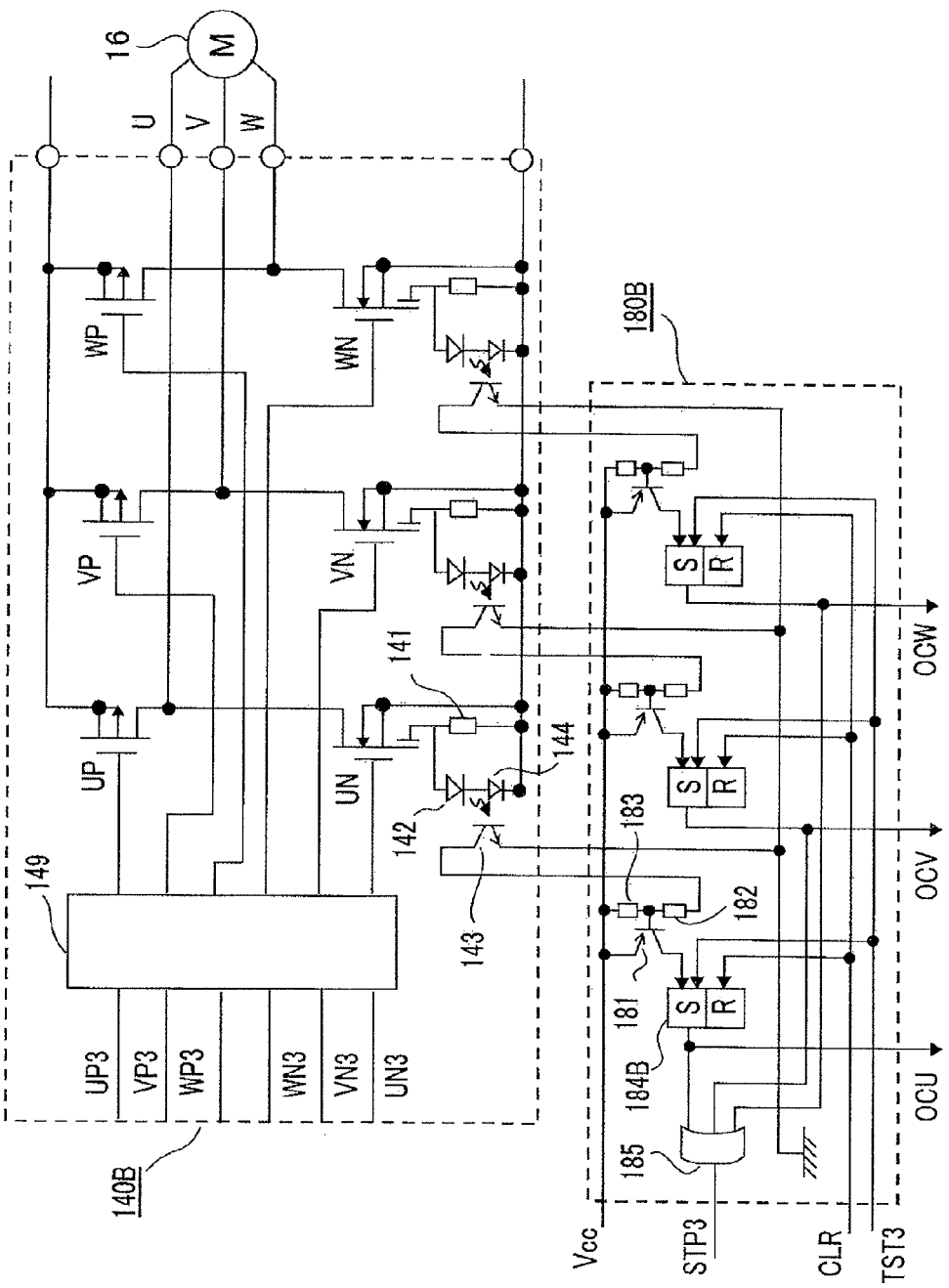
FIG. 9 is a detailed circuit diagram of the overcurrent occurrence memory circuit in FIG. 7.

In FIG. 9, the overcurrent occurrence memory signals by the memory elements 184B for each phase that respond to the overcurrent detection elements 143 are logically summed by the logical sum circuit 185, so as to make the third inhibit command signal STP3, which is input to the logical sum element 170 in FIG. 7, and in addition, the overcurrent occurrence memory signals are input in the drive control circuit 120B as the overcurrent occurrence memory signals OCU, OCV and OCW for each phase.

Moreover, the third trial inhibit command signal TST3 the drive control circuit 120B generates is input to set-input terminals of the memory elements 184B for each phase, which serves as a signal that helps the memory elements 184B for each phase generate memory signals in a simulated manner when the overcurrent detection elements 143 are not conductive. The overcurrent occurrence memory clear command signal CLR the drive control circuit 120B generates is input to reset-input terminals of the memory elements 184B for each phase, which serves as a signal that forcibly resets memory command from the third trial inhibit command signal TST3 or memory states of the memory elements 184B for each phase due to conduction of the photo transistors 143.

Figure 10:
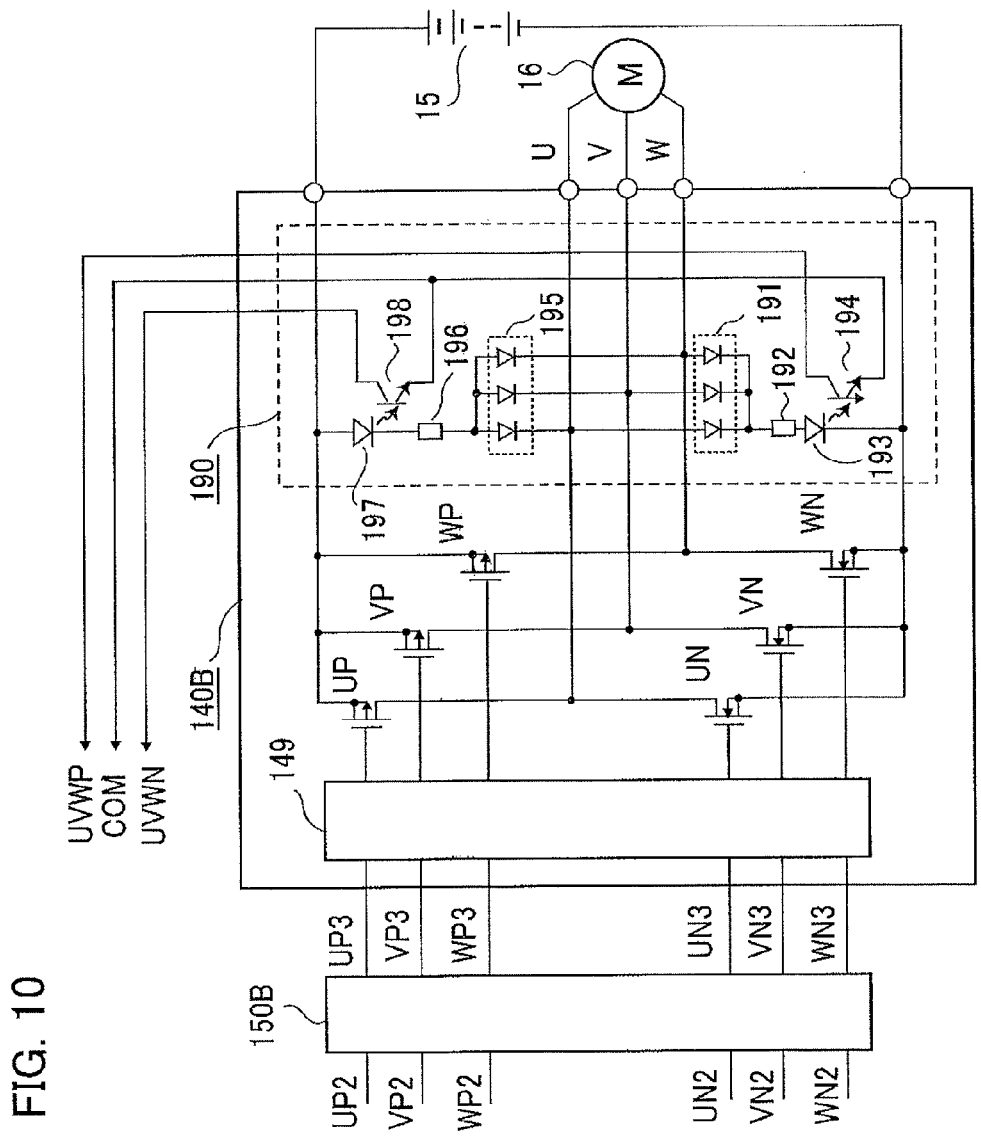
FIG. 10 is a detailed circuit diagram of the switching element operation detection circuit in FIG. 7.

Next, FIG. 10, which is a detailed circuit diagram of the drive command signal interruption circuit in FIG. 7, will be explained. In FIG. 10, the switching element operation detection circuit 190 provided to the semiconductor bridge circuit 140B includes a light emitting diode 193 that is supplied with power via a positive side composite diode 191 and a current-limiting resister 192 when any one of the positive side switching elements UP, VP, and WP is turned on, and a photo transistor 194 integrated with the light emitting diode. The photo transistor serves as the switching operation detection element 194 to generate the switching operation monitoring signal UVWP of the positive side switching elements.

Similarly, the switching element operation detection circuit includes a light emitting diode 197 that is supplied with power via a positive side composite diode 195 and a current-limiting resister 196 when any one of the negative side switching elements UN, VN and WN is turned on, and a photo transistor 198 integrated with the light emitting diode. The photo transistor serves as the switching operation detection element 198 to generate the switching operation monitoring signal UVWN of the negative side switching elements.

The emitters of the photo transistors 194 and 198 are connected to a COM terminal connected to the vehicle body ground 11, and the switching operation monitoring signals UVWP and UVWN are connected to the monitor control circuit 130B (or drive control circuit 120B).

Hereinafter, the operation of Embodiment 2 of the present invention configured as shown in FIG. 7 will be explained in detail using time charts shown in FIG. 11 and FIG. 12.

First of all, when a not-shown manual switch is closed in FIG. 7, the output contact of the power supply relay 12 is closed, power is supplied to the motor drive control device 100B, then the voltage regulator circuit 110 generates the predetermined control voltage Vcc, and the main CPU 121 and the sub CPU 131B thereby begin their operation. When the main CPU 121 begins its operation, initial operation check of the drive command signal interruption circuit 150B is conducted following the procedure described later in FIG. 11 and FIG. 12. When the check result is normal, the first and second groups of electric loads 14a and 14b and the AC motor 16 are driven and controlled in response to the status of the first and second groups of sensors 13a and 13b and the contents of program written in advance in the program memory 123B.

Moreover, output signals obtained from the second group of sensors 13b are transmitted as the uplink communication data UPD to the key-station series-parallel converter 124 from the slave-station series-parallel converter 134; drive control signals to the second group of electric loads 14b are transmitted as the downlink communication data DND to the slave-station series-parallel converter 134 from the key-station series-parallel converter 124. Signal transmission between the key-station series-parallel converter 124 and slave-station series-parallel converter 134 is synchronized with each other by the communication synchronizing signal CLK.

During operation of the motor drive control device 100B, the monitor control circuit 130B monitors an operation state of the drive control circuit 120B. If any abnormality occurs in the drive control circuit 120B, the monitor control circuit generates the first abnormality detection signal ERR1 or the first reset command signal RST1, to initialize and restart the drive control circuit 120B. When the first abnormality detection signal ERR1 or the first reset command signal RST1 is being generated, the drive command signals to the AC motor 16 are interrupted at once by the second inhibit command signal STP2 to the drive command signal interruption circuit 150B.

During operation of the motor drive control device 100B, the drive control circuit 120B monitors in a reverse way the operation state of the monitor control circuit 130B. If any abnormality occurs in the monitor control circuit 130B, the drive control circuit generates the second abnormality detection signal ERR2 or the second reset command signal RST2, to initialize and restart the monitor control circuit 130B. In addition, when the second abnormality detection signal ERR2 or the second reset command signal RST2 is being generated, the drive command signals to the AC motor 16 are set to be interrupted at once by the first inhibit command signal STP1 to the drive command signal interruption circuit 150B.

Next, the drive command signal interruption circuit 150B shown in FIG. 8 is operated, the same as that in FIG. 2. The short-circuit command prevention circuit 160A is connected to the front stage of the positive side gate elements 151A and negative side gate elements 152A in FIG. 2; however in FIG. 8, the three-input gate elements 151B and 152B are used, which constitute the short-circuit command prevention circuit 160B by themselves.

Moreover, even if the short-circuit command prevention circuit 160B is connected to either one of the positive side gate elements 151B and the negative side gate elements 152B, the command output signals of the same phase UP3 and UN3, VP3 and VN3, and WP3 and WN3 can be prevented from becoming logical "H" at the same time.

In the overcurrent occurrence memory circuit 180B shown in FIG. 9, if the overcurrent occurrence memory circuit 180B memorizes an overcurrent occurrence during operation of the motor drive control device 100B, the drive command signals to the AC motor 16 are set to be interrupted at once by the third inhibit command signal STP3 to the drive command signal interruption circuit 150B.

Furthermore, the drive control circuit 120B senses an overcurrent occurrence by the overcurrent occurrence memory signals OCU, OCV and OCW, so as to stop generation of the drive command signals UP1, VP1 and WP1, and UN1, VN1 and WN1, and also generates the overcurrent occurrence memory clear command signal CLR, whereby the drive control circuit resets the memorized signal in the overcurrent occurrence memory circuit 180B, enabling a new overcurrent occurrence to be memorized.

In the switching element operation detection circuit 190 shown in FIG. 10, if any one of the positive side switching elements UP, VP and WP is turned on, power is supplied to the light emitting diode 193 via the positive side composite diode 191 and the current-limiting resister 192, and the switching operation detection element 194, which is a photo transistor, becomes conductive, so that the switching operation monitoring signal UVWP of the positive side switching elements is generated.

Therefore, even if any one of the positive side switching elements UP, VP and WP is given the close-circuit drive command, if the switching operation detection element 194 does not become conductive, this indicates that any one of the switching elements to which the close-circuit drive command is given has a disconnecting fault; meanwhile, even if the open-circuit drive command is given to all of the positive side switching elements UP, VP and WP, if the switching operation detection element 194 becomes conductive, it is assumed that any one of the positive side switching elements UP, VP and WP might have a short-circuit fault.

Similarly, if any one of the negative side switching elements UN, VN and WN is turned on, power is supplied to the light emitting diode 197 via the negative side composite diode 195 and the current-limiting resister 196, and the switching operation detection element 198, which is a photo transistor, becomes conductive, so that the switching operation monitoring signal UVWN of the negative side switching elements is generated. Therefore, even if any one of the negative side switching elements UN, VN and WN is given the close-circuit drive command, if the switching operation detection element 198 does not become conductive, this indicates that any one of the switching elements to which the close-circuit drive command is given has a disconnecting fault; meanwhile, even if the close-circuit drive command is given to all of the negative side switching elements UN, VN and WN, if the switching operation detection element 198 becomes conductive, it is assumed that any one of the negative side switching elements UN, VN and WN might have a short-circuit fault.

Next, FIG. 11, which is the first half of a time chart for explaining the operation of the circuit in FIG. 7, will be explained.

FIG. 11(A) shows a waveform of the check-start command signal STRT the drive control circuit 120B generates, the logical level of which is "H" in time slots T1 to T10 that are the first to tenth time slots following a dummy slot T01, which is a standby period, and also before a dummy slot 102, which is a standby period leading to FIG. 12(A).

Additionally, the drive control circuit 120B and monitor control circuit 130B take other control except for the initial check in the standby slots T01 and T02; for example, the main CPU 121 generates the first watchdog signal WDS1, and the sub CPU 131B generates the second watchdog signal WDS2.

Figure 11:
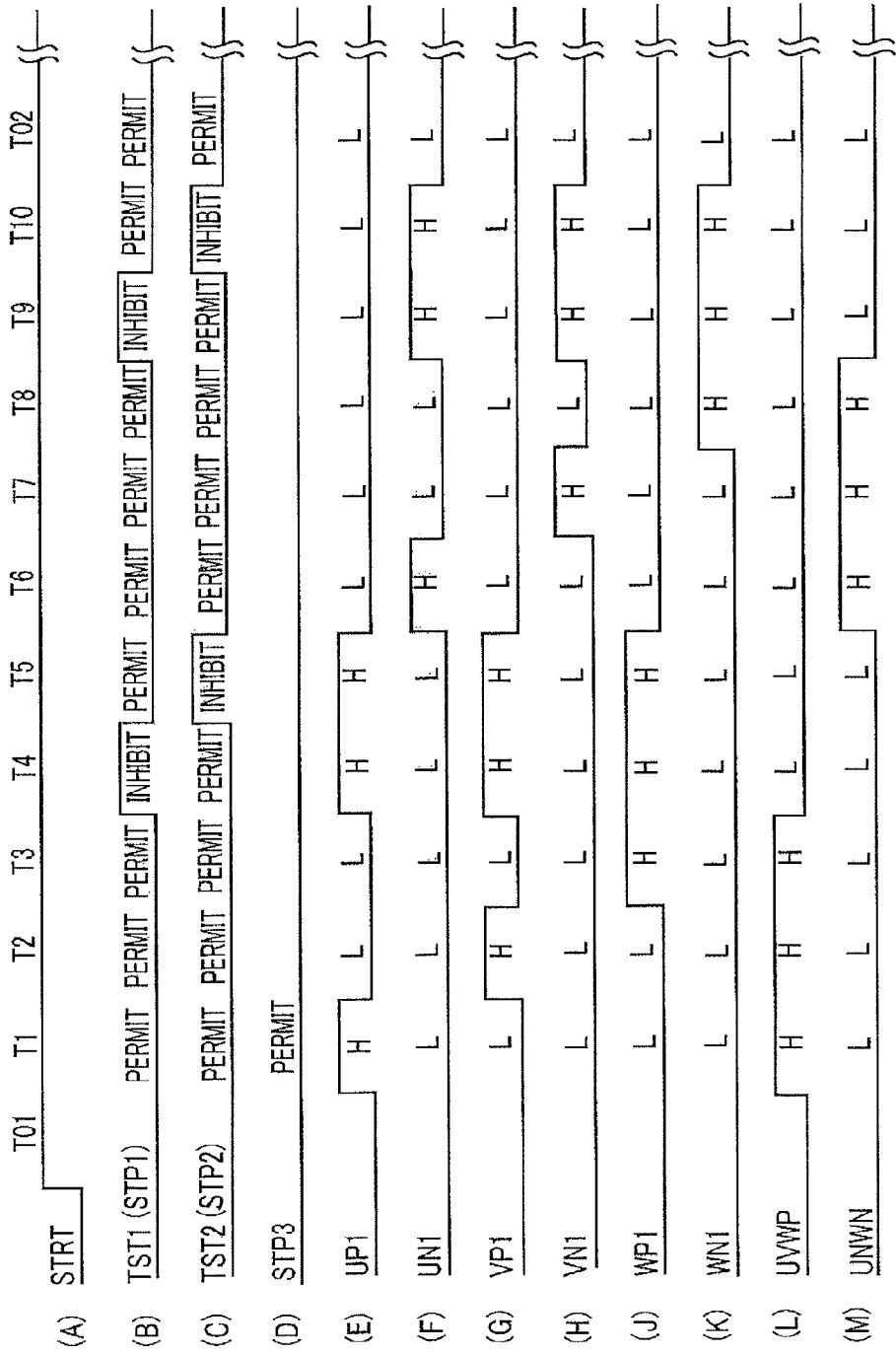
FIG. 11 is the first half of a time chart for explaining the operation of the circuit in FIG. 7.

FIG. 11 (B) and FIG. 11 (C) show waveforms of the first trial inhibit command signal TST1 the drive control circuit 120B generates and the second trial inhibit command signal TST2 the monitor control circuit 130B generates, respectively; both command signals are "permit" (logical level "L"), or either one of them is "permit" and the other "inhibit" (logical level "H") in the time slots 1 to 10.

FIG. 11(D) shows a waveform of the third inhibit command signal STP3 the overcurrent occurrence memory circuit 180B generates; this command signal is "permit" (logical level "L") over the whole period in FIG. 11.

FIG. 11 (E), FIG. 11 (G) and FIG. 11 (J) show waveforms of the positive side drive command signals UP1, VP1 and WP1, respectively, logical levels of which are "H" in time slots of the close-circuit drive command, and the logical levels thereof "L" in time slots of the open-circuit drive command.

FIG. 11 (F), FIG. 11 (H) and FIG. 11 (K) show waveforms of the negative side drive command signals UN1, VN1 and WN1, respectively, logical levels of which are "H" in time slots of the close-circuit drive command, and the logical levels thereof "L" in time slots of the open-circuit drive command.

The time slots T1 to T3 are in a third mode in which the close-circuit drive command is given to any one of the positive side switching elements UP, VP and WP, and the open-circuit drive command given to all of the negative side switching elements UN, VN and WN. In the following time slots T4 and T5, although the close-circuit drive command is given to all of the positive side switching elements UP, VP and WP, either the first trial inhibit command signal TST1 or second trial inhibit command signal TST2 is in the inhibit state.

Moreover, the time slots T6 to T8 are in a fourth mode in which the open-circuit drive command is given to all of the positive side switching elements UP, VP and WP, and the close-circuit drive command given to any one of the negative side switching elements UN, VN and WN. In the following time slots T9 and T10, although the close-circuit drive command is given to all of the negative side switching elements UN, VN and WN, either the first trial inhibit command signal TST1 or second trial inhibit command signal TST2 is in the inhibit state.

In the time slots T1 to T10, the close-circuit drive command is not given to both positive side and negative side switching elements UP, VP and WP, and UN, VN and WN; therefore, neither the AC motor 16 is driven to rotate, nor does short-circuit of the power source occur.

FIG. 11(L) shows a waveform of the switching operation monitoring signal UVWP of the positive side switching elements, and this waveform is in a close-circuit detection state (logical level "H") in the time slots T1 to T3 in which any one of the positive side drive command signals UP1, VP1 and WP1 is the close-circuit drive command (logical level "H"), and in addition, the first and second trial inhibit command signals TST1 and TST2 are both "permit."

FIG. 11(M) is a waveform of the switching operation monitoring signal UVWN of the negative side switching elements, and this waveform is in the close-circuit detection state (logical level "H") in the time slots T6 to T8 in which any one of the negative side drive command signals UN1, VN1 and WN1 is the close-circuit drive command (logical level "H"), and in addition, the first and second trial inhibit command signals TST1 and TST2 are both "permit."

The monitor control circuit 130B (or drive control circuit 120B) to which the positive side and negative side switching operation monitoring signals UVWP and UVWN are input as the command state monitoring signals can determine that the drive command signal interruption circuit 150B and the switching elements UP, VP and WP and UN, VN and WN are operating normally, if the switching operation monitoring signals UVWP and UVWN change as shown in FIG. 11 (L) and FIG. 11 (M) in the time slots T1 to T10.

Additionally, the correct-answer logical states in each time slot shown in FIG. 11(L) and FIG. 11(M) are written and stored in advance in the memory inside the monitor control circuit 130B (or drive control circuit 120B).

However, if the second trial inhibit command signal TST2 input in the logical sum element 170 is also allowed to be input to the drive control circuit 120B (see dotted lines in FIG. 7), and the positive side and negative side switching operation monitoring signals UVWP and UVWN are allowed to be input to the drive control circuit 120B, the drive control circuit 120B compares the drive command signals UP1, VP1 and WP1, and UN1, VN1 and WN1 and the first trial inhibit command signal TST1 that the drive control circuit itself generates with the switching operation monitoring signals UVWP and UVWN and the second trial inhibit command signal TST2 that are input to the circuit, and can thereby directly determine whether or not the drive command signal interruption circuit 150B and the switching elements UP, VP and WP and UN, VN and WN are normal.

Next, FIG. 12, which is the second half of the time chart for explaining the operation of the circuit in FIG. 7, will be explained, focusing on the difference with that in FIG. 6.

FIG. 12(A) to FIG. 12(K) are the same as FIG. 6(A) to FIG. 6(K) in the contents. However, the time slot numbers T7 to T13 are changed to T11 to T17, the overcurrent interruption function is initially checked in the time slots T11 to T14, and the short-circuit command prevention circuit function is checked in the time slots T15 to T17.

Hereinafter, the time slots T11 to T14 related to the third inhibit command output STP3 upon an overcurrent occurrence will be explained.

FIG. 12(L) shows a waveform of the positive side switching operation monitoring signal UVWP; this waveform becomes the close-circuit drive command (logical level "H") in the time slot T11 in which the third inhibit command signal STP3 is "permit," whereas it is the open-circuit drive command (logical level "L") in the time slots T12 to T14.

FIG. 12(M) shows a waveform of the negative side switching operation monitoring signal UVWN; this waveform becomes the close-circuit drive command (logical level "H") in the time slot T13 in which the third inhibit command signal STP3 is "permit," whereas it is the open-circuit drive command (logical level "L") in the time slots T11, T12 and T14.

Next, the time slots T15 to T17 related to the short-circuit command prevention circuit 160B will be explained.

FIG. 12(E) and FIG. 12(F) show waveforms of the positive side and negative side drive command signals of the U-phase UP1 and UN1, respectively; both of the signals are the close-circuit drive command (logical level "H") in the time slot T15, and the open-circuit drive command (logical level "L") in the time slots T16 and T17.

FIG. 12(G) and FIG. 12(H) show waveforms of the positive side and negative side drive command signals of the V-phase VP1 and VN1, respectively; both of the signals are the close-circuit drive command (logical level "H") in the time slot T16, and the open-circuit drive command (logical level "L") in the time slots T15 to T17.

FIG. 12(J) and FIG. 12(K) show waveforms of the positive side and negative side drive command signals of the W-phase WP1 and WN1, respectively; both of the signals are the close-circuit drive command (logical level "H") in the time slot T17, and the open-circuit drive command (logical level "L") in the time slots T15 and T16.

FIG. 12(L) shows a waveform of the positive side switching operation monitoring signal UVWP; FIG. 12(M) shows a waveform of the negative side switching operation monitoring signal UVWN; however, when both of the positive side and negative side drive command signals of the same phase are the close-circuit drive command, actual command output signals are found to be the open-circuit drive command.

Figure 12:
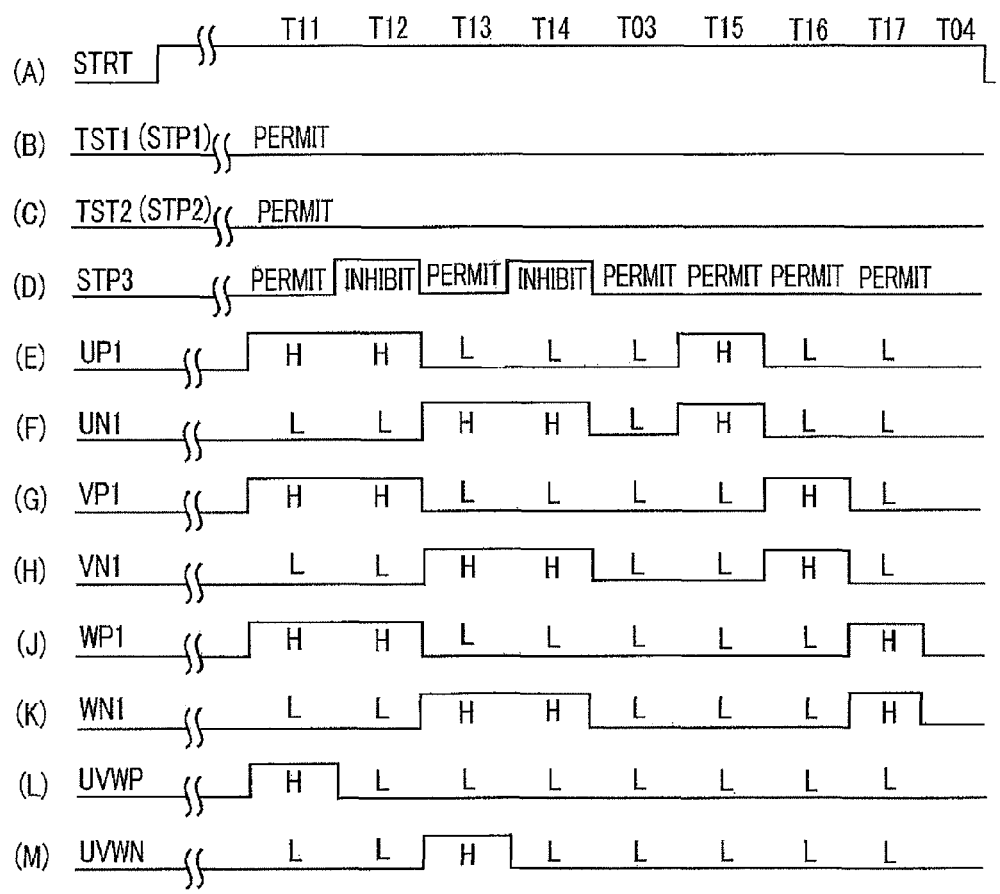
FIG. 12 is the second half of the time chart for explaining the operation of the circuit in FIG. 7.

The monitor control circuit 130B (or drive control circuit 120B) to which the positive side and negative side switching operation monitoring signals UVWP and UVWN are input as the command state monitoring signals can determine that the drive command signal interruption circuit 150B as well as the overcurrent occurrence memory circuit 180B or the short-circuit command prevention circuit 160B are operating normally, if the positive side and negative side switching operation monitoring signals UVWP and UVWN change as shown in FIG. 12 (L) and FIG. 12 (M) in the time slots T11 to T17.

Additionally, the correct-answer logical states in each time slot shown in FIG. 11(L) and FIG. 11(M) are written and stored in advance in the memory inside the monitor control circuit 130B (or drive control circuit 120B).

Moreover, in a sequence of the initial check from a time when the check-start command signal STRT is generated to a time when the check is conducted based on the predetermined time schedule, if the drive control circuit 120B or the monitor control circuit 130B detects an abnormality in the initial check, the first trial inhibit command signal TST1 or the second trial inhibit command signal TST2 continues to be generated, to report the abnormality until the output contact of the power supply relay 12 is opened, so that power supply to the drive control circuit 120B is interrupted. When the monitor control circuit 130B continues to generate the second trial inhibit command signal TST2, the first abnormality detection signal ERR1 is generated, or the abnormality occurrence is reported to the drive control circuit 120B, and the drive control circuit is enabled to memorize the reported result as abnormality occurrence information.

If the second trial inhibit command signal TST2 is also allowed to be input to the drive control circuit 120B, the drive control circuit 120B can sense the abnormal state of the second trial inhibit command signal TST2 being continuously generated.

As is clear from the foregoing explanation, the motor drive control device 100B according to Embodiment 2 of the present invention includes the semiconductor bridge circuit 140B in which the positive side switching elements UP, VP and WP connected to the positive terminal of the DC drive power source 15 are connected in series with their respective negative side switching elements UN, VN and WN connected to the negative side terminal thereof, and series-connection points of a plurality of switching elements connected in series are connected with the respective drive terminals U, V and W of the AC motor; and the drive control circuit 120B that sequentially generates the positive side and negative side drive command signals UP1, VP1 and WP1, and UN1, VN1 and WN1 to the positive side switching elements UP, VP and WP and negative side switching elements UN, VN and WN, and takes variable-speed control of the AC motor 16. The motor drive control device 100B further includes the monitor control circuit 130B that transmits the mutually-monitoring signals UPD and DND to and from the drive control circuit 120B, so as to monitor the operation state of the drive control circuit at all times, and if any abnormality is detected, generates the abnormality detection signal ERR1 to initialize and restart the drive control circuit; and the drive command signal interruption circuit 150B that is placed in the transmission path for the positive side and negative side drive command signals UP1, VP1 and WP1, and UN1, VN1 and WN1, and interrupts all of the positive side and negative side drive command signals at once by the first inhibit command signal STP1 the drive control circuit 120B generates or by the second inhibit command signal STP2 the monitor control circuit 130B generates.

The command state monitoring signals are input in at least either one of the drive control circuit 120B and the monitor control circuit 130B. The command state monitoring signals are the switching operation monitoring signals UVWP and UVWN of the switching elements, that respond to the operation status of the positive side switching elements UP, VP and WP and negative side switching elements UN, VN and WN. The drive control circuit 120B also transmits to the monitor control circuit 130B the check-start command signal STRT immediately after powered on or at least during an operation pause period of the AC motor 16 stopping, and following that, sequentially generates the positive side and negative side drive command signals UP1, VP1 and WP1, and UN1, VN1 and WN1 and the first inhibit command signal STP1, based on the predetermined time schedule. The monitor control circuit 130B, after receiving the check-start command signal STRT, generates the second inhibit command signal STP2 in the predetermined time slot based on the predetermined time schedule.

The drive control circuit 120B or monitor control circuit 130B in which the command state monitoring signals UVWP and UVWN are input determines whether or not logical change of the command state monitoring signals UVWP and UVWN is taking place in the predetermined time slot based on the predetermined time schedule. If the drive control circuit 120B determines that logical change is not properly taking place, the drive control circuit 120B stops generation of the drive command signals UP1, VP1 and WP1, and UN1, VN1 and WN1, and also continues to generate the first inhibit command signal STP1. If the monitor control circuit 130B determines that logical change is not properly taking take place, the monitor control circuit continues to generate the second inhibit command signal STP2. The drive control circuit 120B and monitor control circuit 130B cooperate with each other to conduct operation check of the drive command signal interruption circuit 150B. When the interruption function is normal, the drive control circuit starts rotational drive of the AC motor; meanwhile if any abnormality occurs in the drive control circuit 120B or monitor control circuit 130B during operation, rotational drive of the AC motor 16 is set to be stopped by the first inhibit command signal STP1 or second inhibit command signal STP2.

The drive control circuit 120B essentially includes the main CPU that is a microprocessor and cooperates with the RAM memory 122 and program memory 123B, and to which is connected the key-station series-parallel converter 124 that transmits the mutually-monitoring signals UPD and DND to and from the monitor control circuit 130B. The monitor control circuit 130B essentially includes the sub CPU 131B that is a microprocessor and cooperates with the auxiliary RAM memory 132 and the auxiliary program memory 133B, and to which are connected the slave-station series-parallel converter 134 connected in series to the key-station series-parallel converter 124, and the watchdog timer 135 that monitors the pulse width of the first watchdog signal WDS1 the main CPU 121 generates, and generates the first reset command signal RST1 to initialize and restart the main CPU 121 when a logically unchanging period of the pulse has passed exceeding the predetermined time.

The monitor control circuit 130B also detects the presence/absence of code error in the communication data and abnormal delay of the data with respect to the downlink communication signal DND the drive control circuit 120B transmits to the circuit, and thereby determines the presence/absence of an abnormality in the downlink communication, also transmits on a regular basis question information to the drive control circuit 120B, and determines the presence/absence of an abnormality of question and answer as to whether or not the answer information corresponding to the question information agrees with the predetermined correct-answer information. If any abnormality occurs in the downlink communication or in the question and answer, the monitor control circuit generates the first abnormality detection signal ERR 1. The drive control circuit 120B also detects the presence/absence of code error in the communication data and abnormal delay of the data with respect to the uplink communication signal UPD transmitted at least from the monitor control circuit 130B, and determines whether or not an abnormality occurs in the uplink communication. If any abnormality occurs in the uplink communication, the drive control circuit generates the second abnormality detection signal ERR2, to initialize and restart the monitor control circuit 130B, and also monitors the pulse width of the second watchdog signal WDS2 the sub CPU 131B generates. When a logically unchanging period of the pulse has passed exceeding the predetermined time, the drive control circuit generates the second reset command signal RST2 to initialize and restart the sub CPU 131B.

The first inhibit command signal STP1 is the logical sum of the first trial inhibit command signal TST1 generated in connection with generation of the check-start command signal STRT, the second abnormality detection signal ERR2 and the second reset command signal RST2 to the sub CPU 131B; however, even if the first trial inhibit command signal TST1 is generated, the monitor control circuit 130B is not initialized nor restarted. The second inhibit command signal STP2 is the logical sum of the second trial inhibit command signal TST2 generated in connection with generation of the check-start command signal STRT, the first abnormality detection signal ERR1 and the first reset command signal RST1 to the main CPU 121; however, even if the second trial inhibit command signal TST2 is generated, the drive control circuit 120B is enabled not to be initialized nor restarted.

As described above, the monitor control circuit essentially includes the sub CPU that cooperates with the program memory. The first inhibit command signal is the logical sum of the first trial inhibit command signal that the drive control circuit generates following the check-start command signal, the second abnormality detection signal to initialize and restart the monitor control circuit and the second reset command signal to the sub CPU; however, even if the first trial inhibit command signal is generated, the monitor control circuit is not initialized nor restarted. The second inhibit command signal is the logical sum of the second trial inhibit command signal that the monitor control circuit generates following the check-start command signal, the first abnormality detection signal and the first reset signal to the main CPU 121; however even if the second trial inhibit command signal is generated, the drive control circuit is not initialized nor restarted.

Therefore, this has a feature in that the operation of the drive command signal interruption circuit can be checked without unnecessarily initializing and restarting the drive control circuit and monitor control circuit, by the first and second trial inhibit command signals, in a state in which the drive control circuit can generate the drive command signals.

Moreover, when monitor control specification is required to alter, the control details of the monitor control circuit can be easily altered by the auxiliary program memory.

In a sequence of the initial check conducted after the check-start command signal STRT is generated, based on the predetermined time schedule, if the drive control circuit 120B or the monitor control circuit 130B detects an abnormality in the initial check, the first trial inhibit command signal TST1 or the second trial inhibit command signal TST2 continues to be generated, to report the abnormality until power supply to at least the drive control circuit 120B is interrupted. In addition, when the monitor control circuit 130B continues to generate the second trial inhibit command signal TST2, the first abnormality detection signal ERR1 is generated, or the abnormality occurrence is reported to the drive control circuit 120B, and thereby the drive control circuit is enabled to memorize the reported result as abnormality occurrence information.

As described above, if any abnormality is detected in the initial check, the first or second trial inhibit command signal continues to be generated until power supply to the drive control circuit is interrupted, the AC motor operation is inhibited, the abnormality is reported, and the continuous generation of the second trial inhibit command signal is reported to the drive control circuit and memorized there.

Therefore, this has a feature in that if the abnormality is a single abnormality due to noise malfunction and the like, the operation can be restarted by restoring power, and also the abnormality occurrence in the initial check can be memorized as abnormality occurrence information by the drive control circuit.

The command state monitoring signals input to at least either one of the drive control circuit 120B and monitor control circuit 130B are the switching operation monitoring signals UVWP and UVWN the switching element operation detection circuit 190 generates. The positive side switching operation detection element 194 detects a close-circuit state by any one of the positive side switching elements UP, VP and WP being turned on, and detects an open-circuit state by all of the positive side switching elements UP, VP and WP being turned off; the negative side switching operation detection element 198 detects the close-circuit state by any one of the negative side switching elements UN, VN and WN being turned on, and detects the open-circuit state by all of the negative side switching elements UN, VN and WN being turned off. The switching element operation detection circuit 190 generates the positive side command state monitoring signal UVWP by the positive side switching element operation detection circuit 194, and the negative side switching operation monitoring signal UVWN by the negative side switching operation detection element 198. The drive control circuit 120B, after generating the check-start command signal STRT, brings at once the negative side drive command signals UN1, VN1 and WN1 into the logical state of no drive command being present as well as sequentially brings the positive side drive command signals UP1, VP1 and WP1 into the logical state of drive command being present, which is the third mode, or sequentially brings the negative side drive command signals UN1, VN1 and WN1 into the logical state of drive command being present as well as brings at once the positive side drive command signals UP1, VP1 and WP1 into the logical state of no drive command being present, which is a fourth mode, and executes the third mode and fourth mode in a predetermined sequence.

The drive control circuit 120B or monitor control circuit 130B changes both of the first trial inhibit command signal TST1 and second trial inhibit command signal TST2 into an inhibit command clearing state, or changes only either one of the signals into the logical state of drive command being present. The drive control circuit 120B or monitor control circuit 130B compares a logical state of the switching operation monitoring signal UVWP of the positive side switching elements input in the third mode and a logical state of the switching operation monitoring signal UVWN of the negative side switching elements input in the fourth mode with logical states of the positive side and negative side drive command signals UP1, VP1 and WP1, and UN1, VN1 and WN1, or determines whether or not the logical states of the monitoring signals agree with the correct logical states memorized in advance. If any abnormality is found in the determination result, the drive control circuit or monitor control circuit is enabled to continue to generate the first trial inhibit command signal TST1 or second trial inhibit command signal TST2.

As described above, the command state monitoring signals input to at least either one of the drive control circuit and monitor control circuit are the switching operation monitoring signals of the positive side switching elements and negative side switching elements. The drive control circuit sequentially generates the positive side drive command signals, and following that, sequentially generates the negative side drive command signals, and monitors the logical states of the switching operation monitoring signals of the switching elements, that respond to whether or not each of the first and second trial inhibit command signals is in the inhibit state, whereby the drive control circuit is enabled to determine whether or not the drive command signal interruption circuit and switching operation monitoring signals are operating normally.

Therefore, this has a feature in that whether or not the drive command signal interruption circuit and switching operation monitoring signals are operating normally can be determined, and in addition, whether or not the positive side and negative side switching elements are properly performing switching operation can be checked at the same time.

Moreover, this has another feature in that even if the switching operation monitoring signals monitor all of the positive side switching elements and all of the negative side switching elements, switching operation of each switching element can be independently checked by sequentially and independently generating the drive commands.

Furthermore, this has still another feature in that in order for the AC motor not to be unnecessarily driven to rotate, the drive control circuit can determine whether or not the drive command signal interruption circuit is operating normally, without bringing the positive side and negative side drive command signals into the state of the drive commands being present at the same time, but with combination of all the states of the drive command signals and the first and second trial inhibit command signals.

The command state monitoring signals UVWP and UVWN are input to the drive control circuit 120B, and the second trial inhibit command signal TST2 that is generated by the monitor control circuit 130B and input in the drive command signal interruption circuit 150B is also input in the drive control circuit 120B. The drive control circuit 120B is enabled to determine whether or not the drive command signal interruption circuit 150B is operating normally by combination of the logical states of the positive side and negative side drive command output signals UP1, VP1 and WP1, and UN1, VN1 and WN1, and the first trial inhibit command signal TST1 the drive control circuit 120B generates, and the logical states of the command state monitoring signals UVWP and UVWN and the second trial inhibit command signal TST2 that are input in the circuit.

As described above, the command state monitoring signals and the second trial inhibit command signal are input to the drive control circuit that generates the drive command signals and the first trial inhibit command signal. Therefore, this has a feature in that even if the drive control circuit and monitor control circuit do not memorize in advance the correct-answer information based on the predetermined time schedule, the drive control circuit can determine whether or not the drive command signal interruption circuit is operating normally, by directly comparing input and output signals in each time slot.

The drive command signal interruption circuit 150B includes the positive side gate elements 151B provided in the respective transmission paths for the positive side drive command signals UP1, VP1 and WP1, and the negative side gate elements 152B provided in the respective transmission paths for the negative side drive command signals UN1, VN1 and WN1. The composite inhibit command signal STP that is the logical sum of the first inhibit command signal STP1 and second inhibit command signal STP2 is input to the positive side gate elements 151B and negative side gate elements 152B as a gate signal. In addition, the positive side gate elements 151B and negative side gate elements 152B are provided with the short-circuit command prevention circuit 160B that prevents the close-circuit drive command signals from being supplied at the same time to the positive side switching elements UP, VP and WP and the respective negative side switching elements UN, VN and WN connected in series with each other in the same phase. Even if the drive control circuit 120B, after generating the check-start command signal STRT, generates the close-circuit drive command signals at the same time to the positive side switching elements UP, VP and WP and negative side switching elements UN, VN and WN connected in the same phase, the drive control circuit is enabled to sequentially check and confirm that command output signals UP3, VP3 and WP3, and UN3, VN3 and WN3 the drive command signal interruption circuit 150B generates do not generate the close-circuit drive command signal at the same time.

As described above, the drive command signal interruption circuit is provided with the short-circuit prevention circuit so that the drive command signals to the positive side and negative side switching elements of the same phase will not be brought into the state of the drive command being present at the same time, and this operation is checked when starting operation. Therefore, this has a feature in that the drive command signals can be prevented from being generated at the same time during operation startup, due to noise malfunction and the like, so that short-circuit and burn-out troubles of the switching elements can be prevented. Furthermore, this has another feature in that the operation of the short-circuit command prevention circuit is checked together with the check of the drive command signal interruption circuit when starting operation, so that logical operation such as never occurring normally can be confirmed in advance.

The semiconductor bridge circuit 140B is connected to the overcurrent occurrence memory circuit 180B, and includes memory elements that memorize operation record once the overcurrent detection elements 143 provided at the respective negative side switching elements UN, VN and WN or positive side switching elements UP, VP and WP are put into operation. The memory elements include the memory elements 184B for each phase whose output signals are summed together by the logical sum circuit 185, so as to make the third inhibit command signal STP3. The third inhibit command signal STP3 is directly logically summed with the first inhibit command signal STP1 and second inhibit command signal STP2, without passing through the drive control circuit 120B, so as to make the composite inhibit command signal STP to the drive command signal interruption circuit 150B. The drive control circuit 120B generates the overcurrent occurrence memory clear command signal CLR to the overcurrent occurrence memory circuit 180B and an overcurrent occurrence force memory command signal that becomes the third trial inhibit command signal TST3, and in addition, the overcurrent occurrence memory signals of each phase OCU, OCV and OCW by the memory elements 184B for each phase are input in the drive control circuit 120B. The drive control circuit 120B is also enabled to generate the third trial inhibit command signal TST3 in the predetermined time slot following the generation of the check-start command signal STRT, and confirm interruption operation of the drive command signals UP1, VP1 and WP1, and UN1, VN1 and WN1 by the drive command signal interruption circuit 150B. In addition, the drive control circuit is enabled to receive the overcurrent occurrence memory signals OCU, OCV and OCW for each phase during operation so as to sense an overcurrent occurrence, stop the generation of the drive command signals UP1, VP1, WP1, UN1, VN1 and WN1, and then clear the memory state of the memory elements 184B for each phase by the overcurrent occurrence memory clear command signal CLR.

As described above, the drive command signal interruption circuit directly interrupts the drive command signals by the third inhibit command signal the overcurrent occurrence memory circuit generates; this interruption function is checked and confirmed when starting operation.

Moreover, the drive control circuit is enabled to sense an overcurrent occurrence by the overcurrent occurrence memory signals of each phase, and then clear the memory state of the overcurrent occurrence memory circuit.

Therefore, this has a feature in that if any overcurrent occurs during operation, the switching elements are quickly turned off so as to be prevented the elements from burning out, and whether the overcurrent protection circuit operates normally can also be checked in a simulated manner when starting operation.

Furthermore, by sensing the overcurrent occurrence, the drive control circuit can stop the generation of the drive command signals, and then clear the memory state of the overcurrent occurrence memory circuit; therefore this has another feature in that if any new overcurrent abnormality occurs, the drive control circuit can immediately detect the abnormality.

Embodiment 3

Hereinafter, FIG. 13, which is an entire configuration diagram of Embodiment 3 of the present invention, will be explained, focusing on the difference with those in FIG. 1 and FIG. 7.

Additionally, the same reference numerals represent the same or corresponding parts in each drawing.

Figure 13:
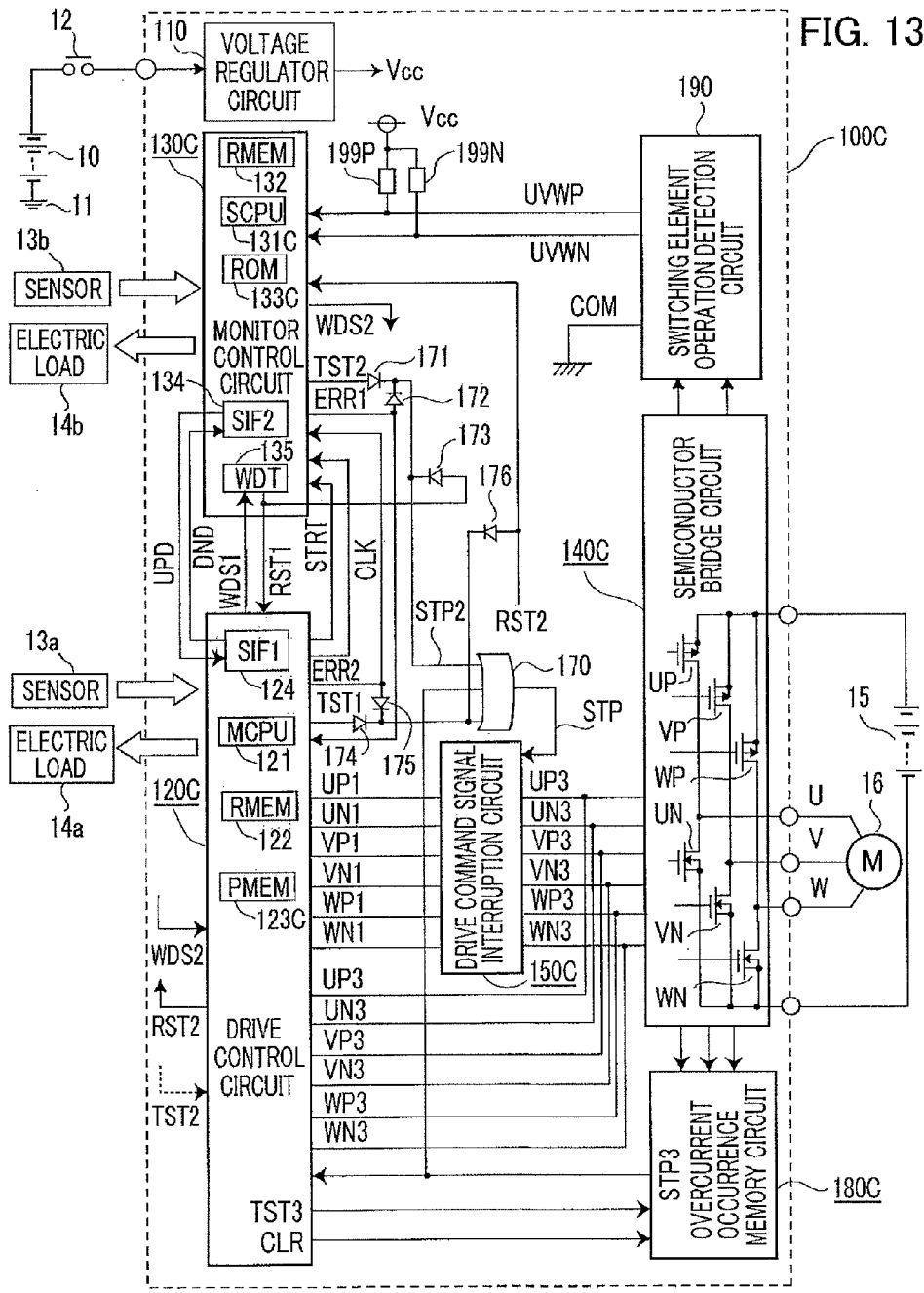
FIG. 13 is an entire configuration diagram showing Embodiment 3 of the invention.

In FIG. 13, a motor drive control device 100C essentially includes a drive control circuit 120C that takes rotational control of a not-shown vehicle engine and traction motor, the same as those in FIG. 1 and FIG. 7; a monitor control circuit 130C that cooperates with the drive control circuit and monitors each other; a semiconductor bridge circuit 140C that supplies power to the traction motor; a drive command signal interruption circuit 150C; and an overcurrent occurrence memory circuit 180C. Furthermore, the motor drive control device additionally includes the switching element operation detection circuit 190 described in FIG. 10, and the switching operation monitoring signal UVWP of the positive side switching elements and the switching operation monitoring signal UVWN of the negative side switching elements detected by the switching element operation detection circuit 190 are connected to the monitor control circuit 130C together with the pull-up resisters 199P and 199N.

Moreover, the positive side and negative side command output signals UP3, VP3 and WP3, and UN3, VN3 and WN3, which are output signals from the drive command signal interruption circuit 150C, are also input in the drive control circuit 120C as the command state monitoring signals.

The vehicle battery 10, the power supply relay 12, the first and second groups of sensors 13a and 13b, the first and second groups of electric loads 14a and 14b, the DC drive power source 15 and the three-phase AC motor 16 are connected to the motor drive control device 100C at the exterior thereof, the same as those in FIG. 1 and FIG. 7.

The voltage regulator circuit 110 that generates the control voltage Vcc is provided, the same as the cases in FIG. 1 and FIG. 7, inside the motor drive control device 100C.

The drive control circuit 120C includes the main CPU 121, which is a microprocessor, the RAM memory 122 for operational processing, a non-volatile program memory 123C, which is a flash memory, for example, and the key-station series-parallel converter 124 with those connected with each other through a bus.

The monitor control circuit 130C includes a sub CPU 131C, which is a microprocessor, the RAM memory 132 for operational processing, a non-volatile program memory 133C, which is a mask ROM memory, for example, and the slave-station series-parallel converter 134 with those connected with each other through a bus.

The watchdog timer 135 provided in the monitor control circuit 130C monitors the pulse width of the first watchdog signal WDS1 the main CPU 121 generates, and when a logically unchanging period of the pulse has passed exceeding a predetermined time, the timer is set to generate the first reset command signal RST1 to initialize and restart the main CPU 121.

The main CPU 121 monitors the pulse width of the second watchdog signal WDS2 the sub CPU 131C generates, and when a logically unchanging period of the pulse has passed exceeding a predetermined time, the timer is set to generate the second reset command signal RST2 to initialize and restart the sub CPU 131C.

The key-station series-parallel converter 124 and slave-station series-parallel converter 134 serially transmit the downlink communication data DND and uplink communication data UPD to each other using the communication synchronizing signal CLK, the same as the cases in FIG. 1 and FIG. 7.

Moreover, the check-start command signal STRT is transmitted from the drive control circuit 120C to the monitor control circuit 130C, as the timing signal to start startup check described later.

Additionally, the monitor control circuit 130C determines the presence/absence of a communication abnormality of the downlink communication data DND transmitted from the drive control circuit 120C, transmits on a regular basis question information to the drive control circuit 120C, and also determines the presence/absence of an abnormality of question and answer. If any abnormality occurs in the downlink communication or question and answer, the monitor control circuit is enabled to generate the first abnormality detection signal ERR1, to initialize and restart the main CPU 121.

Furthermore, the drive control circuit 120C determines the presence/absence of a communication abnormality of the uplink communication data UPD transmitted from the monitor control circuit 130C. If any abnormality of the uplink communication occurs, the drive control circuit is enabled to generate the second abnormality detection signal ERR2, to initialize and restart the monitor control circuit 130C.

In the semiconductor bridge circuit 140C, the positive side switching elements UP, VP and WP connected to the positive terminal of the DC drive power source 15 are connected in series with their respective negative side switching elements UN, VN and WN connected to the negative side terminal thereof, and series-connection points of a plurality of switching elements connected in series are connected to the respective drive terminals U, V and W of the AC motor 16.

Figure 14:
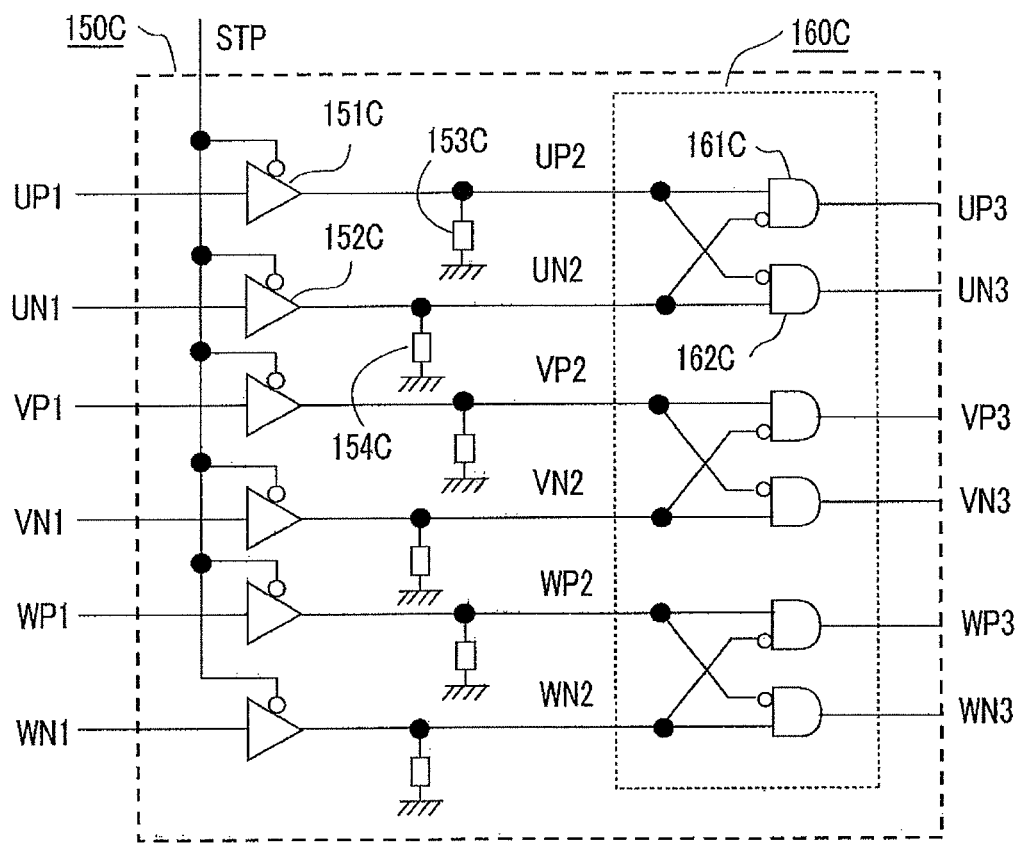
FIG. 14 is a detailed circuit diagram of the drive command signal interruption circuit in FIG. 13.

The drive command signal interruption circuit 150C described later in FIG. 14 is supplied with the positive side and negative side drive command signals UP1, VP1, WP1, UN1, VN1 and WN1 the drive control circuit 120C generates, and generates the positive side command output signals UP3, VP3 and WP3 and negative side command output signals UN3, VN3 and WN3, which are close-circuit command signals to the positive side switching elements UP, VP and WP and the negative side switching elements UN, VN and WN.

However, when the logical value of the composite inhibit command signal STP input to the drive command signal interruption circuit 150C is "1," the logical values of all of the command output signals UP3, VP3 and WP3, and UN3, VN3 and WN3 become "0," regardless of states of the drive command signals UP1, VP1 and WP1, and UN1, VN1 and WN1, so that the open-circuit command is given to all of the switching elements UP, VP and WP, and UN, VN and WN.

The first inhibit command signal STP1, second inhibit command signal STP2 and third inhibit command signal STP3 are input to the logical sum element 170 that produces the composite inhibit command signal STP; when any one of the inhibit command signals becomes logical "1," all of the output signals from the drive command signal interruption circuit 150C become logical "0," so that the open-circuit command is given to all of the switching elements UP, VP and WP, and UN, VN and WN.

The first inhibit command signal STP1 the drive control circuit 120C generates is the logical sum of the first trial inhibit command signal TST1 generated in connection with generation of the check-start command signal STRT, the second abnormality detection signal ERR2 and the second reset command signal RST2 to the sub CPU 131C; however, those signals are connected in logical OR configuration by diodes 174, 175 and 176 so that the monitor control circuit 130C is not initialized nor restarted, even if the first trial inhibit command signal TST1 is generated.

The second inhibit command signal STP2 the monitor control circuit 130C generates is the logical sum of the second trial inhibit command signal TST2 generated in connection with generation of the check-start command signal STRT, the first abnormality detection signal ERR1 and the first reset command signal RST1 to the main CPU 121; however, those signals are connected in logical OR configuration by diodes 171, 172 and 173 so that the drive control circuit 120C is not initialized nor restarted, even if the second trial inhibit command signal TST2 is generated.

The overcurrent occurrence memory circuit 180C described later in FIG. 15 includes a composite memory element that memorizes overcurrent once overcurrent detection elements provided for each phase are put into operation. If the composite memory element memorizes an overcurrent occurrence, the third inhibit command signal STP3 is generated, and the drive command signals UP1, VP1 and WP1, and UN1, VN1 and WN1 are interrupted at once by the drive command signal interruption circuit 150C.

The third inhibit command signal STP3 by the composite memory element is also input in the drive control circuit 120C; the main CPU 121 interrupts the drive command signals UP1, VP1 and WP1, and UN1, VN1 and WN1 if it senses an overcurrent occurrence, and also generates an overcurrent occurrence memory clear command signal CLR, so as to reset the memory held in the composite memory element inside the overcurrent occurrence memory circuit 180C.

The drive control circuit 120C is also enabled to generate the third trial inhibit command signal TST3 in a predetermined time slot following the generation of the check-start command signal STRT, forcibly memorize an overcurrent occurrence state in the composite memory element inside the overcurrent occurrence memory circuit 180C, and confirm interruption operation of the drive command signals UP1, VP1 and WP1, and UN1, VN1 and WN1 by the drive command signal interruption circuit 150C.

Additionally, if the second inhibit command signal TST2 the monitor control circuit 130C generates is allowed to be not only input to the logical sum element 170 but also input in the drive control circuit 120C, part of an operation state of the monitor control circuit 130C can be monitored by the drive control circuit 120C.

FIG. 14, which is a detailed circuit diagram of the drive command signal interruption circuit in FIG. 13, will be explained next.

In FIG. 14, the drive command signal interruption circuit 150C is provided with six three-state buffers, which are positive side gate elements 151C and negative side gate elements 152C for the U-, V- and W-phases, and the positive side and negative side drive command signals UP1, VP1 and WP1, and UN1, VN1 and WN1 the drive control circuit 120C generates are connected to the input terminals of the respective three-state buffers.

Pull-down resisters 153C and 154C are connected to the output terminal of the respective three-state buffers, and the intermediate drive command signals UP2, UN2 and VP2, and VN2, WP2 and WN2 are output.

The composite inhibit command signal STP is input to the enable-terminals of each three-state buffer; if the composite inhibit command signal STP is made logical "1," all of the positive side gate elements 151C and negative side gate elements 152C of the phases output logical "0," which are output as the intermediate drive command signals UP2, UN2 and VP2, and VN2, WP2 and WN2.

Incidentally, although the three-state buffers shown in FIG. 14 need pull-down resisters to determine output logical values, compared to the two-input logic elements used as the gate elements in FIG. 2, there is an advantage that multiple gates can be provided by one general-use IC.

A short-circuit command prevention circuit 160C includes the positive side logic elements 161C and negative side logic elements 162C provided for each phase, and is configured in such a way that one of the positive side logic elements 161C makes the command output signal UP3 out of the logical product of the positive side intermediate drive command signal UP2 and reversed negative side drive command signal UN2, one of the negative side logic elements 162C makes the drive command signal UN3 out of the logical product of the reversed positive side intermediate drive command signal UP2 and negative side intermediate drive command signal UN2, and even if the positive side intermediate drive command signal UP2 and negative side intermediate drive command signal UN2 become erroneously logical "1" at the same time, the positive side command output signal UP3 and the negative side drive command signal UN3 do not become logical "1" at the same time.

The same can be said for the intermediate drive command signals VP2 and VN2, and WP2 and WN2, and the drive command signals VP3 and VN3, and WP3 and WN3. Even if the intermediate drive command signals UP2 and UN2, VP2 and VN2, and WP2 and WN2 of the same phase erroneously become logical "1" at the same time, the command output signals UP3 and UN3, VP3 and VN3, and WP3 and WN3 of the same phase are made not to become logical "1" at the same time.

Moreover, the short-circuit command prevention circuit is preferably located as close to the semiconductor bridge circuit as possible; therefore, configuration of providing the short-circuit command prevention circuit at the rear stage of the gate circuit as shown in FIG. 14 is more preferable than the configurations of providing it at the front stage of the gate circuit as shown in FIG. 2 or inside the gate circuit as shown in FIG. 8.

Next, FIG. 15, which is a detailed circuit diagram of the overcurrent occurrence memory circuit in FIG. 13, will be explained, focusing on the difference with that in FIG. 3.

Figure 15:
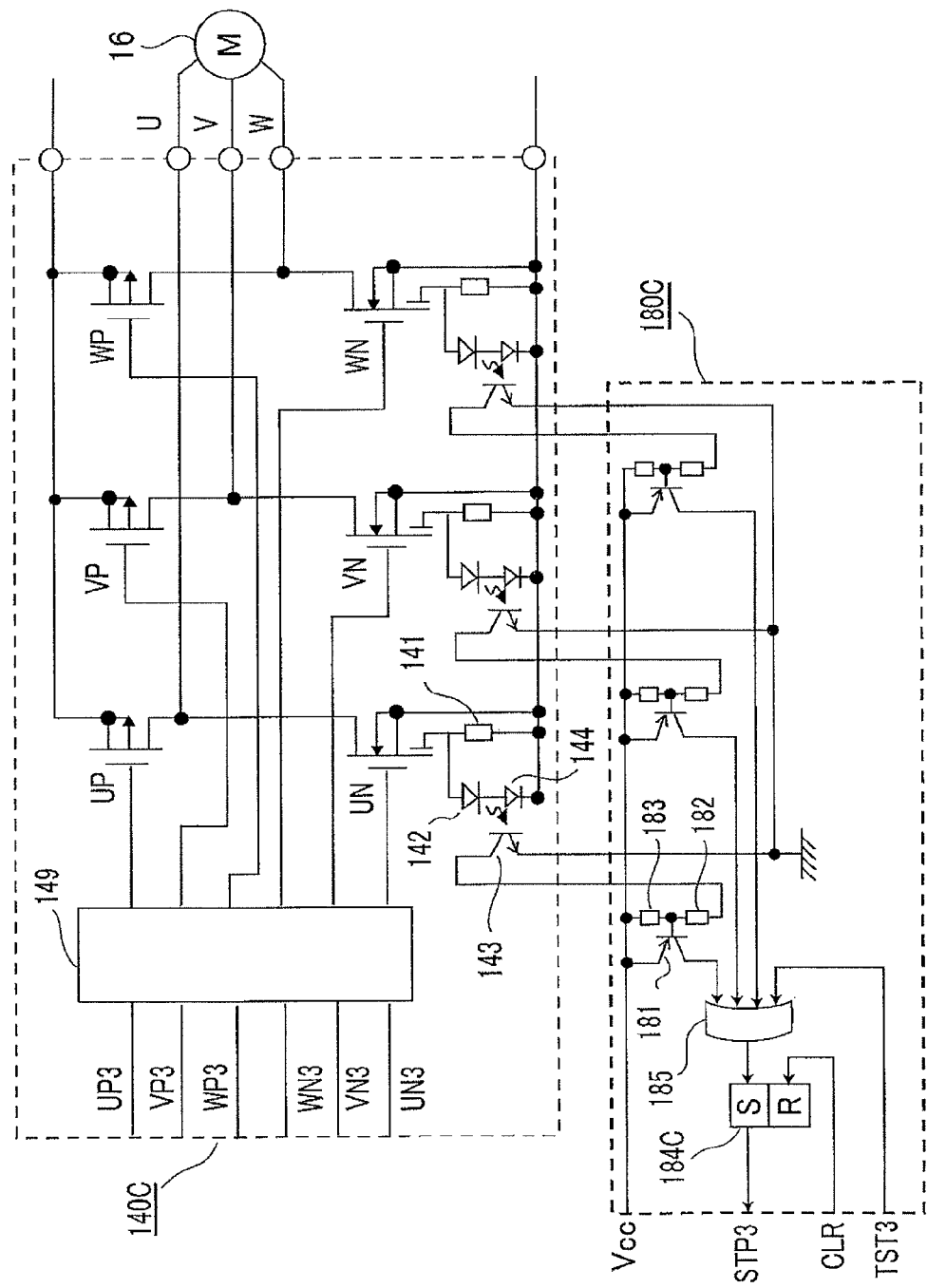
FIG. 15 is a detailed circuit diagram of the overcurrent occurrence memory circuit in FIG. 13.

In FIG. 15, output signals from the transistors 181 driven by the respective overcurrent detection elements 143 for each phase are input to the logical sum circuit 185; a composite memory element 184C is set by an output signal from the logical sum circuit 185, and reset by the overcurrent occurrence memory clear command signal CLR, which is an output signal from the drive control circuit 120C.

Additionally, the third trial inhibit command signal TST3, which is an output signal from the drive control circuit 120C, is also connected to the logical sum circuit 185 as an input signal, and the logical sum element is enabled to set and drive the composite memory element 184C in a simulated manner even in a state of the overcurrent detection elements 143 being nonconductive. An output signal from the composite memory element 184C becomes the third inhibit command signal STP3, which is input to the drive control circuit 120C as well as to the logical sum element 170 shown in FIG. 13.

Hereinafter, the operation of Embodiment 3 of the present invention configured as shown in FIG. 13 will be explained in detail using the time chart shown in FIG. 16.

First of all, when a not-shown manual switch is closed in FIG. 13, the output contact of the power supply relay 12 is closed, power is supplied to the motor drive control device 100C, then the voltage regulator circuit 110 generates the predetermined control voltage Vcc, and the main CPU 121 and sub CPU 131C thereby begin their operation.

When the main CPU 121 begins its operation, initial operation check of the drive command signal interruption circuit 150C is conducted following the procedure described in FIG. 5 and FIG. 6 and described later in FIG. 16. When the check result is normal, the first and second groups of electric loads 14a and 14b and the AC motor 16 are driven and controlled in response to the operation status of the first and second groups of sensors 13a and 13b and the program contents written in advance in the program memory 123C.

Additionally, input signals obtained from the second group of sensors 13b are transmitted as the uplink communication data UPD to the key-station series-parallel converter 124 from the slave-station series-parallel converter 134, drive control signals to the second group of electric loads 14b are transmitted as the downlink communication data DND to the slave-station series-parallel converter 134 from the key-station series-parallel converter 124. Signal transmission between the key-station series-parallel converter 124 and slave-station series-parallel converter 134 is synchronized with each other by the communication synchronizing signal CLK.

During operation of the motor drive control device 100C, the monitor control circuit 130C monitors an operation state of the drive control circuit 120C. If any abnormality occurs in the drive control circuit 120C, the monitor control circuit generates the first abnormality detection signal ERR1 or the first reset command signal RST1, to initialize and restart the drive control circuit 120C, and when the first abnormality detection signal ERR1 or the first reset command signal RST1 is being generated, the drive command signals to the AC motor 16 are interrupted at once by the second inhibit command signal STP2 to the drive command signal interruption circuit 150C.

During the operation of the motor drive control device 100C, the drive control circuit 120C monitors in a reverse way an operation state of the monitor control circuit 130C. If any abnormality occurs in the monitor control circuit 130C, the drive control circuit generates the second abnormality detection signal ERR2 or the second reset command signal RST2, to initialize and restart the monitor control circuit 130C, and when the second abnormality detection signal ERR2 or the second reset command signal RST2 is being generated, the drive command signals to the AC motor 16 are interrupted at once by the first inhibit command signal STP1 to the drive command signal interruption circuit 150C.

Incidentally, the drive command signal interruption circuit 150C shown in FIG. 14 is also enabled to operate the same as that in FIG. 2.

Although the short-circuit command prevention circuit 160A is connected to the front stage of the positive side gate elements 151A and negative side gate elements 152A in FIG. 2, the gate elements 151C and 152C using three-state buffers are employed in the FIG. 14 case, and the short-circuit command prevention circuit 160C is connected to the rear stage of the gate elements 151C and 152C.

Moreover, even if the short-circuit command prevention circuit 160C is connected to either side of the positive side gate elements 151C or the negative side gate elements 152C, the command output signals of the same phase UP3 and UN3, VP3 and VN3, and WP3 and WN3 can be prevented from becoming logically "H" at the same time.

In the overcurrent occurrence memory circuit 180C shown in FIG. 15, if the overcurrent occurrence memory circuit 180C memorizes any overcurrent occurrence during operation of the motor drive control device 100C, the drive command signals to the AC motor 16 are interrupted at once by the third inhibit command signal STP3 to the drive command signal interruption circuit 150C.

Additionally, the drive control circuit 120C senses an overcurrent occurrence by the third inhibit command signal STP3, and thereby stops generation of the drive command signals UP1, VP1 and WP1, and UN1, VN1 and WN1, and also generates the overcurrent occurrence memory clear command signal CLR, so as to reset the memorized signal in the overcurrent occurrence memory circuit 180C, enabling a new overcurrent occurrence to be memorized.

Next, FIG. 16, which is the second half of a time chart for explaining the operation of the circuit in FIG. 13, will be explained.

Figure 16:
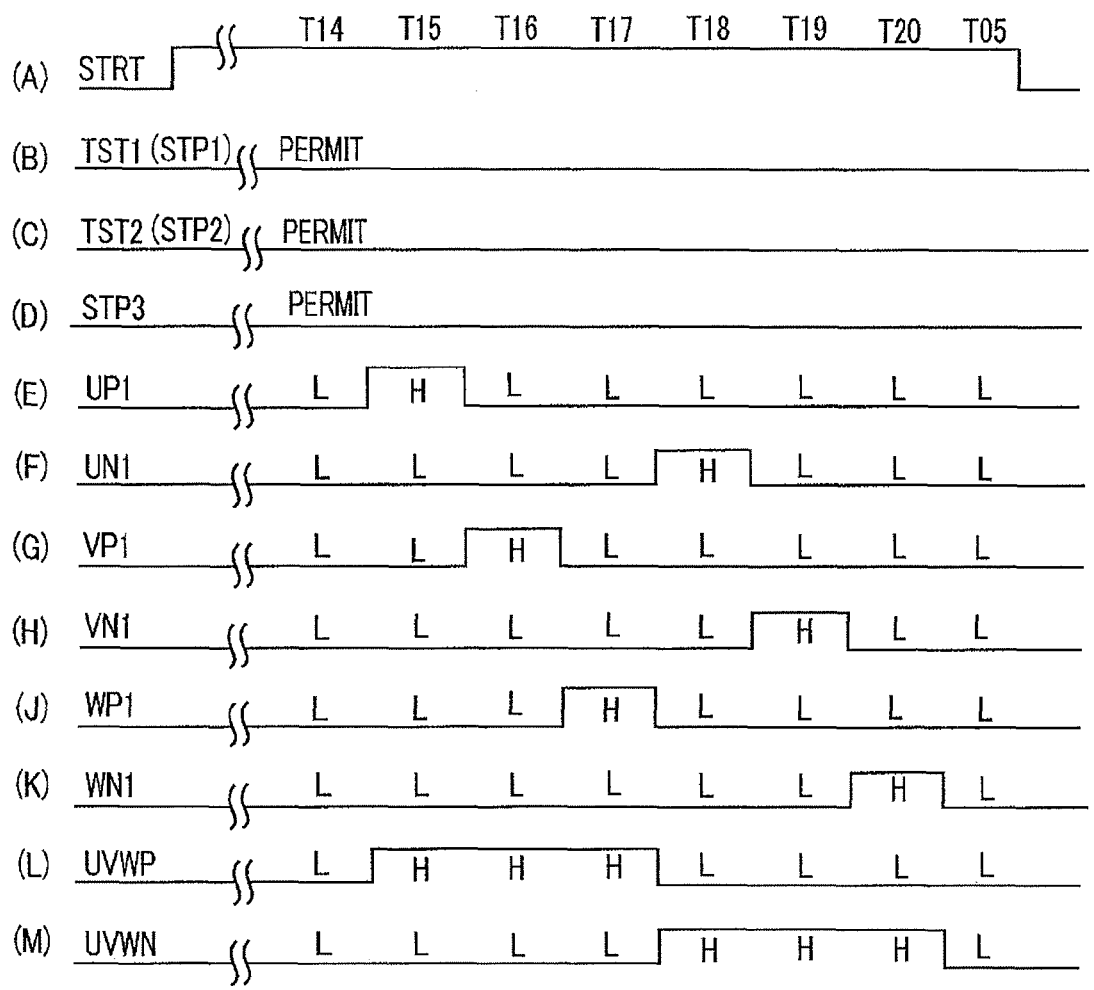
FIG. 16 is the second half of a time chart for explaining the operation of the circuit in FIG. 13.

Output signals from the drive command signal interruption circuit 150C and those from the switching element operation detection circuit 190 are used in combination as the command state monitoring signals in FIG. 13; therefore, the entire operation is explained, taking the time chart explained in FIG. 5 as the front stage, the time chart explained in FIG. 6 as the intermediate stage, and the time chart to be explained in FIG. 16 as the rear stage.

According to the time chart in FIG. 5, whether or not the drive command signal interruption circuit 150C is normal is determined by determining validity of relationships between the positive side and negative side drive command signals UP1, VP1 and WP1, and UN1, VN1 and WN1, and the positive side and negative side command output signals UP3, VP3 and WN3, and UN3, VN3 and WN3.

Furthermore, according to the time chart in FIG. 6, whether or not the overcurrent occurrence memory circuit 180C and short-circuit command prevention circuit 160C are normal is determined there.

FIG. 16 shows a time chart for determining whether or not the switching element operation detection circuit 190 is normal. The time chart shown in FIG. 11 can also be used as it is.

In the case of FIG. 11, whether or not the drive command signal interruption circuit 150C and switching element operation detection circuit 190 are normal is determined in a complex manner; in contrast, however, in the case of FIG. 16, the drive command signal interruption circuit 150 C is determined by the time chart in FIG. 5; therefore, the time chart becomes a simplified one for making determination specialized for the switching element operation detection circuit 190.

FIG. 16(A) shows a waveform of the check-start command signal STRT following FIG. 6(A); its logical level becomes "H" in the period including time slots T14 to T20 and a dummy slot T05 just before ending, and it becomes "L" after the dummy slot T05, which is a standby end period, so that the check-start command signal STRT can be cleared.

FIG. 16 (B) and FIG. 16 (C) show waveforms of the first trial inhibit command signal TST1 the drive control circuit 120C generates and second trial inhibit command signal TST2 the monitor control circuit 130C generates, respectively; each command output signal is "permit" (logical level "L") all over the time slots T14 to T20.

FIG. 16(D) shows a waveform of the third inhibit command signal STP3 the overcurrent occurrence memory circuit 180C generates; this command output is "permit" (logical level "L") over the whole period in FIG. 16.

FIG. 16(E), FIG. 16(G) and FIG. 16(J) show waveforms of the positive side drive command signals UP1, VP1 and WP1, respectively; the waveforms sequentially become logically "H" in the time slots T15 to T17 of the close-circuit drive command, and all of the waveforms become logically "L" in time slots of the open-circuit drive command.

FIG. 16(F), FIG. 16(H) and FIG. 16(K) show waveforms of the negative side drive command signals UN1, VN1 and WN1, respectively; the waveforms become sequentially logically "H" in the time slots T18 to T20 of the close-circuit drive command, and all of the waveforms become logically "L" in time slots of the open-circuit drive command.

Moreover, the open-circuit drive command is given to all of the positive side and negative side switching elements UP, VP and WP, and UN, VN and WN in the time slot 14; in the time slots T15 to T17, the close-circuit drive command is given to any one of the positive side switching elements UP, VP and WP, and the open-circuit drive command is given to all of the negative side switching elements UN, VN and WN; and in the time slots T18 to T20, the open-circuit drive command is given to all of the positive side switching elements UP, VP and WP, and the close-circuit drive command is given to any one of the negative side switching elements UN, VN and WN.

Therefore in the time slots T14 to T20, the close-circuit drive command is not given to both positive side switching elements UP, VP and WP and negative side switching elements UN, VN and WN; therefore, neither the AC motor 16 is driven to rotate, nor does short-circuit of the power source occur.

FIG. 16(L) is a waveform of the switching operation monitoring signal UVWP of the positive side switching elements, and this waveform is in the close-circuit detection state (logical level "H") in the time slots T15 to T17 in which any one of the positive side drive command signals UP1, VP1 and WP1 is the close-circuit drive command (logical level "H"), and in addition, the first and second trial inhibit command signals TST1 and TST2 are both "permit."

FIG. 11(M) is a waveform of the switching operation monitoring signal UVWN of the negative side switching elements, and this waveform is in the close-circuit detection state (logical level "H") in the time slots T18 to T20 in which any one of the negative side drive command signals UN1, VN1 and WN1 is the close-circuit drive command (logical level "H"), and in addition, the first and second trial inhibit command signals TST1 and TST2 are both "permit."

The monitor control circuit 130C to which the positive side switching operation monitoring signal UVWP and negative side switching operation signal UVWN are input can determine that the switching elements UP, VP and WP, and UN, VN and WN are operating normally, if the switching operation monitoring signals UVWP and UVWN change as shown in FIG. 16 (L) and FIG. 16 (M) in the time slots T14 to T20.

Additionally, the correct-answer logical states in each time slot shown in FIG. 11(L) and FIG. 11(M) are written and stored in advance in the memory inside the monitor control circuit 130C.

As described above, the monitor control circuit 130C and drive control circuit 120C to which the positive side and negative side switching operation monitoring signals UVWP and UVWN and the positive side and negative side command output signal UP3, VP3 and WN3, and UN3, VN3 and WN3, which are output signals from the drive command signal interruption circuit 150C, are input as the command state monitoring signals can determine that the drive command signal interruption circuit 150C, overcurrent occurrence memory circuit 180C and short-circuit command prevention circuit 160C are operating normally, if the positive side and negative side command output signals UP3, VP3 and WN3, and UN3, VN3 and WN3 change as shown in FIG. 5(L) to FIG. 5(R) and FIG. 6(L) to FIG. 6(R), and the positive side and negative side switching operation monitoring signals UVWP and UVWN change as shown in FIG. 16 (L) and FIG. 16(M), in the time slots T1 to T20 in FIG. 5, FIG. 6, and FIG. 16.

Additionally, the correct-answer logical states in each time slot in FIG. 5(L) to FIG. 5(R), FIG. 6(L) to FIG. 6(R), FIG. 16(L) and FIG. 16(M) are written and stored in advance in the memories inside the monitor control circuit 130C and drive control circuit 120C.

Moreover, in a sequence of the initial check from a time when the check-start command signal STRT is generated to a time when the check is conducted based on the predetermined time schedule, if the drive control circuit 120C or monitor control circuit 130C detects an abnormality in the initial check, the first trial inhibit command signal TST1 or the second trial inhibit command signal TST2 continues to be generated, to report the abnormality until the output contact of the power supply relay 12 is opened, so that power supply to the drive control circuit 120C is interrupted. When the monitor control circuit 130C continues to generate the second trial inhibit command signal TST2, the first abnormality detection signal ERR1 is generated, or the abnormality occurrence is reported to the drive control circuit 120C, and the drive control circuit is enabled to memorize the reported result as abnormality occurrence information.

If the second trial inhibit command signal TST2 is also allowed to be input in the drive control circuit 120C, the drive control circuit 120C can sense an abnormal state of the second trial inhibit command signal TST2 continuously being generated.

As is clear from the foregoing explanation, the motor drive control device 100C according to Embodiment 3 of the present invention includes the semiconductor bridge circuit 140C in which the positive side switching elements UP, VP and WP connected to the positive terminal of the DC drive power source 15 are connected in series with their respective negative side switching elements UN, VN and WN connected to the negative side terminal thereof, and series-connection points of a plurality of switching elements connected in series are connected with the respective drive terminals U, V and W of the AC motor; and the drive control circuit 120C that sequentially generates the positive side and negative side drive command signals UP1, VP1 and WP1, and UN1, VN1 and WN1 to the positive side switching elements UP, VP and WP and negative side switching elements UN, VN and WN, and takes variable-speed control of the AC motor 16. The motor drive control device 100C further includes the monitor control circuit 130C that transmits the mutually-monitoring signals UPD and DND to and from the drive control circuit 120C so as to monitor an operation state of the drive control circuit at all times, and if any abnormality is detected, generates the abnormality detection signal ERR1 to initialize and restart the drive control circuit; and the drive command signal interruption circuit 150C that is placed in the transmission paths for the positive side and negative side drive command signals UP1, VP1 and WP1, and UN1, VN1 and WN1, and interrupts all of the positive side and negative side drive command signals at once by the first inhibit command signal STP1 the drive control circuit 120C generates or by the second inhibit command signal STP2 the monitor control circuit 130C generates.

The command state monitoring signals are input to at least either one of the drive control circuit 120C and monitor control circuit 130C. The command state monitoring signals are the positive side and negative side command output signals UP3, VP3 and WN3, and UN3, VN3 and WN3 the drive command signal interruption circuit 150C generates, or the switching operation monitoring signals UVWP and UVWN that respond to the operation status of the positive side switching elements UP, VP and WP and negative side switching elements UN, VN and WN.

The drive control circuit 120C also transmits to the monitor control circuit 130C the check-start command signal STRT immediately after powered on or at least during an operation pause period of the AC motor 16 stopping, and following that, sequentially generates the positive side and negative side drive command signals UP1, VP1 and WP1, and UN1, VN1 and WN1, and the first inhibit command signal STP1 based on the predetermined time schedule. In addition, the monitor control circuit 130C, after receiving the check-start command signal STRT, generates the second inhibit command signal STP2 in the predetermined time slot based on the predetermined time schedule.

The drive control circuit 120C or monitor control circuit 130C to which the command state monitoring signals UP3, VP3, WP3, UN3, VN3 and WN3, and UVWP and UVWN are input determines whether or not logical change of the command state monitoring signals UP3, VP3 and WP3, UN3, VN3 and WN3, and UVWP and UVWN is taking place. If the drive control circuit 120C determines that logical change is not properly taking place, the drive control circuit stops generation of the drive command signals UP1, VP1, WP1, UN1, VN1 and WN1, and also continues to generate the first inhibit command signal STP1. If the monitor control circuit 130C determines that logical change is not properly taking place, the monitor control circuit continues to generate the second inhibit command signal STP2. The drive control circuit 120C and monitor control circuit 130C cooperate with each other to conduct operation check of the drive command signal interruption circuit 150C. When the interruption function is normal, the drive control circuit starts driving the AC motor 16 to rotate, whereas if any abnormality occurs in the drive control circuit 120C during operation, rotational drive of the AC motor 16 is set to be stopped by the first inhibit command signal STP1 or second inhibit command signal STP2.

The drive control circuit 120C essentially includes the main CPU that is a microprocessor and cooperates with the RAM memory 122 and program memory 123C, and to which is connected the key-station series-parallel converter 124 that transmits the mutually-monitoring signals UPD and DND to and from the monitor control circuit 130C. The monitor control circuit 130C essentially includes the sub CPU 131C that is a microprocessor and cooperates with the auxiliary RAM memory 132 and auxiliary program memory 133C, and to which are connected the slave-station series-parallel converter 134 connected in series to the key-station series-parallel converter 124, and the watchdog timer 135 that monitors the pulse width of the first watchdog signal WDS1 the main CPU 121 generates, and generates the first reset command signal RST1 to initialize and restart the main CPU 121, when a logically unchanging period of the pulse has passed exceeding the predetermined time.

The monitor control circuit 130C also detects the presence/absence of code error in the communication data and abnormal delay of the data with respect to the downlink communication signal DND transmitted from the drive control circuit 120C, thereby determines the presence/absence of an abnormality in the downlink communication, and also transmits on a regular basis question information to the drive control circuit 120C, so as to determines the presence/absence of an abnormality in question and answer as to whether or not the answer information corresponding to the question information agrees with the predetermined correct-answer information. If any abnormality occurs in the downlink communication or in the question and answer, the monitor control circuit generates the first abnormality detection signal ERR 1. The drive control circuit 120C also detects the presence/absence of code error in the communication data and abnormal delay of the data with respect to the uplink communication signal UPD transmitted at least from the monitor control circuit 130C, and determines the presence/absence of an abnormality of the uplink communication. If any abnormality occurs in the uplink communication, the drive control circuit generates the second abnormality detection signal ERR2, to initialize and restart the monitor control circuit 130C, and also monitors the pulse width of the second watchdog signal WDS2 the sub CPU 131C generates. When a logically unchanging period of the pulse has passed exceeding the predetermined time, the drive control circuit generates the second reset command signal RST2 to initialize and restart the sub CPU 131C.

The first inhibit command signal STP1 is the logical sum of the first trial inhibit command signal TST1 generated in connection with generation of the check-start command signal STRT, the second abnormality detection signal ERR2 and the second reset command signal RST2 to the sub CPU 131B; however, even if the first trial inhibit command signal TST1 is generated, the monitor control circuit 130C is not initialized nor restarted. The second inhibit command signal STP2 is the logical sum of the second trial inhibit command signal TST2 generated in connection with generation of the check-start command signal STRT, the first abnormality detection signal ERR1 and the first reset command signal RST1 to the main CPU 121; however, even if the second trial inhibit command signal TST2 is generated, the drive control circuit 120C is not initialized nor restarted.

As described above, the monitor control circuit essentially includes the sub CPU that cooperates with the program memory. The first inhibit command signal is the logical sum of the first trial inhibit command signal the drive control circuit generates following the check-start command signal, the second abnormality detection signal that initializes and restarts the monitor control circuit and the second reset signal to the sub CPU; however, even if the first trial inhibit command signal is generated, the monitor control circuit is not initialized nor restarted. The second inhibit command signal is the logical sum of the second trial inhibit command signal the monitor control circuit generates following the check-start command signal, the first abnormality detection signal and the first reset signal to the main CPU 121; however even if the second trial inhibit command signal is generated, the drive control circuit is not initialized nor restarted.

Therefore, this has a feature in that the drive control circuit and monitor control circuit are not unnecessarily initialized nor restarted, and operation check of the drive command signal interruption circuit can be conducted by the first and second trial inhibit command signals, in a state in which the drive control circuit can generate the drive command signals.

Moreover, when monitor control specification is required to alter, the control details of the monitor control circuit can be easily altered by the auxiliary program memory.

Furthermore, in a sequence of the initial check conducted after the check-start command signal STRT is generated, based on the predetermined time schedule, if the drive control circuit 120C or the monitor control circuit 130C detects an abnormality in the initial check, the first trial inhibit command signal TST1 or the second trial inhibit command signal TST2 continues to be generated, to report the abnormality until power supply to at least the drive control circuit 120C is interrupted. When the monitor control circuit 130C continues to generate the second trial inhibit command signal TST2, the first abnormality detection signal ERR1 is generated, or the abnormality occurrence is reported to the drive control circuit 120C, so that the drive control circuit is enabled to memorize the reported result as abnormality occurrence information.

As described above, if any abnormality is detected in the initial check, the first or second trial inhibit command signal continues to be generated until power supply to the drive control circuit is interrupted, whereby the AC motor operation is inhibited and the abnormality is reported, and the continuous generation of the second trial inhibit command signal is reported to the drive control circuit and memorized there.

Therefore, this has a feature in that if the abnormality is a single abnormality due to noise malfunction and the like, the operation can be restarted by restoring power, and in addition, the abnormality occurrence in the initial check can be memorized as abnormality occurrence information by the drive control circuit.

The command state monitoring signals input to at least either one of the drive control circuit 120C and the monitor control circuit 130C are the positive side and negative side command output signals UP3, VP3 and WP3, and UN3, VN3 and WN3 the drive command signal interruption circuit 150C generates. The drive control circuit 120C, after generating check-start command signal STRT, brings at once the negative side drive command signals UN1, VN1 and WN1 into the logical state of no drive command being present as well as brings at once the positive side drive command signals UP1, VP1 and WP1 into the logical state of drive command being present, which is the first mode, or brings at once the negative side drive command signals UN1, VN1 and WN1 into the logical state of drive command being present as well as brings at once the positive side drive command signals UP1, VP1 and WP1 into the logical state of no drive command signals being present, which is the second mode, and executes the first mode and second mode in the predetermined sequence. The drive control circuit 120C or the monitor control circuit 130C changes both of the first trial inhibit command signal TST1 and second trial inhibit command signal TST2 into a state of the inhibit command signal clearing, or changes only either of the signals into a state of the inhibit command being present, monitors logical states of the positive side command output signals UP3, VP3 and WP3 input in the first mode and logical states of the negative side command output signals UN3, VN3 and WN3 input in the second mode, and compares those logical states with the logical states of the positive side and negative side drive command signals UP1, VP1 and WP1, and UN1, VN1 and WN1, or determines whether or not the logical states of those command output signals agree with the correct logical states memorized in advance. If any abnormality is found in the determination result, the drive control circuit or the monitor control circuit is enabled to continue to generate the first trial inhibit command signal TST1 or second trial inhibit command signal TST2, respectively.

As described above, the command state monitoring signals input to at least either one of the drive control circuit and monitor control circuit are the positive side and negative side command output signals the drive command signal interruption circuit generates. The drive control circuit brings at once either the positive side drive command signals or the negative side drive command signals into the state of drive command being present, and monitors logical states of the command state monitoring signals that correspond to whether or not each of the first and second trial inhibit command signals is in an inhibit state, whereby the drive control circuit is enabled to determine whether or not the drive command signal interruption circuit is operating normally.

Therefore, this has a feature in that in order for the AC motor not to be unnecessarily driven to rotate, the drive control circuit can determine whether or not the drive command signal interruption circuit is operating normally, by combining all of the states of the drive command signals and the first and second trial inhibit command signals, without bringing the positive side and negative side drive command signals into the state of the drive command being present at the same time.

The command state monitoring signals input to at least either one of the drive control circuit 120C and monitor control circuit 130C are the switching operation monitoring signals UVWP and UVWN the switching element operation detection circuit 190 generates. The positive side switching operation detection element 194 detects a close-circuit state by any one of the positive side switching elements UP, VP and WP being turned on, and detects an open-circuit state by all of the positive side switching elements UP, VP and WP being turned off; the negative side switching operation detection element 198 detects the close-circuit state by any one of the negative side switching elements UN, VN and WN being turned on, and detects the open-circuit state by all of the negative side switching elements UN, VN and WN being turned off. The switching element operation detection circuit 190 generates the positive side command state monitoring signal UVWP by the positive side switching element operation detection circuit 194, and the negative side switching operation monitoring signal UVWN by the negative side switching operation detection element 198. The drive control circuit 120C, after generating the check-start command signal STRT, brings at once the negative side drive command signals UN1, VN1 and WN1 into the logical state of no drive command being present as well as sequentially brings the positive side drive command signals UP1, VP1 and WP1 into the logical state of drive command being present, which is the third mode, or sequentially brings the negative side drive command signals UN1, VN1 and WN1 into the logical state of drive command being present as well as brings at once the positive side drive command signals UP1, VP1 and WP1 into the logical state of no drive command being present, which is the fourth mode, and executes the third mode and fourth mode in the predetermined sequence.

The drive control circuit 120C or monitor control circuit 130C changes both of the first trial inhibit command signal TST1 and second trial inhibit command signal TST2 into an inhibit command clearing state, or only either of the commands into the logical state of the inhibit command being present. The drive control circuit 120C or monitor control circuit 130C compares logical states of the switching operation monitoring signal UVWP of the positive side switching elements input in the third mode and switching operation monitoring signal UVWN of the negative side switching elements input in the fourth mode with the logical states of the positive side and negative side drive command signals UP1, VP1 and WP1, and UN1, VN1 and WN1, or determines whether or not the logical states of those monitoring signals agree with the correct logical states memorized in advance. If the determination result is abnormal, the first trial inhibit command signal TST1 or second trial inhibit command signal TST2 is set to continue to be generated.

As described above, the command state monitoring signals input to at least either one of the drive control circuit and monitor control circuit are the switching operation monitoring signals of the positive side switching elements and negative side switching elements. The drive control circuit sequentially generates the drive command signals to the positive side switching elements, and following that, sequentially generates the drive command signals to the negative side switching elements, and monitors the logical states of the switching operation monitoring signals of the switching elements, that respond to whether or not the first and second trial inhibit command signals each are in the inhibit state, whereby the drive control circuit is enabled to determine whether or not the drive command signal interruption circuit and switching operation monitoring signals are operating normally.

Therefore, this has a feature in that whether or not the drive command signal interruption circuit and switching operation monitoring signals are operating normally can be determined, and in addition, whether or not the positive side and negative side switching elements are normally performing switching operation can be checked at the same time.

Moreover, this has another feature in that even if the switching operation monitoring signals monitor all of the positive side switching elements and all of the negative side switching elements, switching operation of each switching element can be checked by sequentially and independently generating the drive command.

Furthermore, this has still another feature in that in order for the AC motor not to be unnecessarily driven to rotate, whether or not the drive command signal interruption circuit is operating normally can be determined, without bringing at the same time the positive side and negative side drive command signals into the state of the drive commands being present, but with combination of all the states of the drive command signals and the first and second trial inhibit command signals.

The positive side and negative side command output signals UP3, VP3 and WP3, and UN3, VN3 and WN3 the drive command signal interruption circuit 150C generates are input to either one of the drive control circuit 120C and the monitor control circuit 130C as the command state monitoring signals, and the switching operation monitoring signals UVWP and UVWN of the switching elements, that respond to the operation status of the positive side switching elements UP, VP and WP and negative side switching elements UN, VN and WN are input to the other. The drive control circuit 120C and monitor control circuit 130C are enabled to share checking of operation states of the drive command signal interruption circuit 150C and the switching operation monitoring signals UVWP and UVWN.

As described above, the switching operation monitoring signals of the switching elements and the command output signals from the drive command signal interruption circuit are distributed and input to the drive control circuit or monitor control circuit, and the drive control circuit and monitor control circuit are enabled to share checking of the operation states of the drive command signal interruption circuit and the switching operation monitoring signals.

Therefore, since the operation states of the drive command signal interruption circuit and the switching operation monitoring signals are independently checked, this has a feature in that any abnormality can be detected in a dual detection system, without increasing control burden on the drive control circuit and monitor control circuit, so that reliability can be enhanced in the system as a whole.

The drive command signal interruption circuit 150C includes the positive side gate elements 151C provided in the respective transmission paths for the positive side drive command signals UP1, VP1 and WP1, and the negative side gate elements 152C provided in the respective transmission paths for the negative side drive command signals UN1, VN1 and WN1. The composite inhibit command signal STP that is the logical sum of the first inhibit command signal STP1 and second inhibit command signal STP2 is input to the positive side gate elements 151C and negative side gate elements 152C as a gate signal. In addition, in the rear stage of the positive side gate elements 151C and negative side gate elements 152C is provided the short-circuit command prevention circuit 160C that prevents close-circuit drive command signals from being supplied at the same time to the positive side switching elements UP, VP and WP and negative side switching elements UN, VN and WN connected in series with each other in the same phase. Even if the drive control circuit 120C, after generating the check-start command signal STRT, generates the close-circuit drive command signal at the same time to the positive side switching elements UP, VP and WP and negative side switching elements UN, VN and WN connected in the same phase, the drive control circuit 120C is enabled to sequentially check and confirm that the command output signals UP3, VP3 and WP3, and UN3, VN3 and WN3 the drive command signal interruption circuit 150C generates are not the close-circuit drive command signal at the same time.

As described above, the drive command signal interruption circuit is provided with the short-circuit prevention circuit so that the drive command signals to the positive side and negative side switching elements of the same phase are not brought into the state of the drive command being present at the same time, and operation check can be conducted when starting operation.

Therefore, this has a feature in that short-circuit and burn-out troubles of the switching elements can be prevented that are caused by the drive command signals being generated at the same time during operation startup, due to noise malfunction and the like.

Moreover, this has another feature in that operation check of the short-circuit command prevention circuit is conducted together with the check of the drive command signal interruption circuit when starting operation, so that logical operation such as never occurring normally can be confirmed in advance.

The overcurrent occurrence memory circuit 180C is connected to the semiconductor bridge circuit 140C, and includes the memory element that memorizes operation record, once the overcurrent detection elements 143 for each phase provided at the respective positive side switching elements UP, VP and WP or the respective negative side switching elements UN, VN and WN are put into operation. The memory element is the composite memory element 184C that collectively memorizes the logical sum signal of signals from the overcurrent detection elements 143 for each phase, and outputs the third inhibit command signal STP3. The third inhibit command signal STP3 is directly logically summed with the first and second inhibit command signals STP1 and STP2, without passing through the drive control circuit 120C, to become the composite inhibit command signal STP to the drive command signal interruption circuit 150C.

The drive control circuit 120C generates the overcurrent occurrence memory clear command signal CLR to the overcurrent occurrence memory circuit 180C, and the overcurrent generation force memory command signal that becomes the third trial inhibit command signal TST3. The third inhibit command signal STP3 the composite memory element 184C generates is input in the drive control circuit 120C, and the drive control circuit 120C also generates the third trial inhibit command signal TST3 in the predetermined time slot following the generation of the check-start command signal STRT, confirms interruption operation of the drive command signals UP1, VP1 and WP1, and UN1, VN1 and WN1 by the drive command signal interruption circuit 150C. In addition, the drive control circuit is enabled to receive the third inhibit command signal STP3 during operation, to sense an overcurrent occurrence, stop generation of the drive command signals UP1, VP1 and WP1, and UN1, VN1 and WN1, and then clear the memory state of the composite memory element 184C by the overcurrent occurrence memory clear command signal CLR.

As described above, the drive command signal interruption circuit directly interrupts the drive command signals by the third inhibit command signal the overcurrent occurrence memory circuit generates; this interruption function is checked and confirmed when starting operation.

Moreover, the drive control circuit is enabled to sense an overcurrent occurrence by the third inhibit command signal, and then clear the memory state of the overcurrent occurrence memory circuit.

Therefore, this has a feature in that when an overcurrent occurs during operation, the switching elements can be quickly turned off so as to prevent the elements from burning out, and in addition, whether or not the overcurrent protection circuit operates normally can be checked in a simulated manner when starting operation.

Furthermore, by sensing the overcurrent occurrence, the drive control circuit is enabled to stop the generation of the drive command signals, and then clear the memory state of the overcurrent occurrence memory circuit; therefore this has another feature in that if any overcurrent abnormality occurs anew, the drive control circuit can detect the abnormality immediately.

Various modifications and alterations of this invention will be apparent to those skilled in the art without departing from the scope and spirit of this invention, and it should be understood that this is not limited to the illustrative embodiments set forth herein.

What is claimed is:
1. A motor drive control device, comprising:
a semiconductor bridge circuit in which positive side switching elements connected to a positive side terminal of a DC drive power source are connected in series with their respective negative side switching elements connected to a negative side terminal thereof, and series-connection points of a plurality of switching elements connected in series are connected with their respective drive terminals of an AC motor;
a drive control circuit that sequentially generates positive side and negative side drive command signals to the positive side switching elements and the negative side switching elements, and takes variable-speed control of the AC motor;

a monitor control circuit that transmits mutually-monitoring signals to and from the drive control circuit, monitors an operation state of the drive control circuit at all times, and if any abnormality is detected, generates a first abnormality detection signal to initialize and restart the drive control circuit; and a drive command signal interruption circuit that is placed in transmission paths for the positive side and negative side drive command signals, and interrupts at once all of the positive side and negative side drive command signals by a first inhibit command signal the drive control circuit generates or by a second inhibit command signal the monitor control circuit generates; wherein command state monitoring signals are input in at least either one of the drive control circuit and the monitor control circuit;

the command state monitoring signals are either positive side and negative side command output signals the drive command signal interruption circuit generates, or switching operation monitoring signals of the switching elements, that respond to operation status of the positive side switching elements and the negative side switching elements;

the drive control circuit, immediately after powered on or during an operation pause period of at least the AC motor stopping, also transmits to the monitor control circuit a check-start command signal, and following that, sequentially generates the positive side and the negative side drive command signals and the first inhibit command signal based on a predetermined time schedule;

the monitor control circuit, after receiving the check-start command signal, generates the second inhibit command signal in a predetermined time slot based on the predetermined time schedule, and the drive control circuit or the monitor control circuit in which the command state monitoring signals are input determines whether or not logical change of the command state monitoring signals is taking place in the predetermined time slot based on the predetermined time schedule;

if the drive control circuit determines that logical change is not properly taking place, the drive control circuit stops generation of the drive command signals, and also continues to generate the first inhibit command signal; if the monitor control circuit determines that logical change is not properly taking place, the monitor control circuit continues to generate the second inhibit command signal; and the drive control circuit and the monitor control circuit cooperate with each other to conduct operation check of the drive command signal interruption circuit, when the interruption function is normal, start rotational drive of the AC motor; meanwhile if any abnormality occurs in the drive control circuit during operation, the drive control circuit and monitor control circuit stop the rotational drive of the AC motor by the first inhibit command signal or the second inhibit command signal.

2. The motor drive control device according to claim 1, wherein the drive control circuit essentially includes a main CPU that is a microprocessor and cooperates with a RAM memory and a program memory, and to which is connected a key-station series-parallel converter that transmits an uplink communication signal and a downlink communication signal, which are the mutually-monitoring signals, to and from the monitor control circuit;

the monitor control circuit essentially includes a control logic circuit that cooperates with an auxiliary RAM memory, and to which are connected a slave-station series-parallel converter connected in series to the key-station series-parallel converter, and a watchdog timer that monitors the pulse width of a first watchdog signal the main CPU generates and generates a first reset command signal to initialize and restart the main CPU, when a logically unchanging period of the pulse has passed exceeding a predetermined time;

the monitor control circuit also detects the presence/absence of code error in communication data and abnormal delay of the data with respect to the downlink communication signal that the drive control circuit transmits to the monitor control circuit, thereby determining the presence/absence of an abnormality of downlink communication, and also transmits on a regular basis question information to the drive control circuit, and determines the presence/absence of an abnormality of question and answer as to whether or not answer information corresponding to the question information agrees with predetermined correct-answer information; if any abnormality occurs in the downlink communication or in the question and answer, the monitor control circuit generates the first abnormality detection signal;

the drive control circuit also detects the presence/absence of code error in communication data and abnormal delay of the data with respect to the uplink communication signal transmitted at least from the monitor control circuit, and determines whether or not an abnormality occurs in uplink communication; if any abnormality occurs in the uplink communication, the drive control circuit generates a second abnormality detection signal, to initialize and restart the monitor control circuit;

the first inhibit command signal is a logical sum of a first trial inhibit command signal generated in connection with generation of the check-start command signal and the second abnormality detection signal; however even if the first trial inhibit command signal is generated, the monitor control circuit is not initialized nor restarted; and the second inhibit command signal is a logical sum of a second trial inhibit command signal generated in connection with generation of the check-start command signal, the first abnormality detection signal and the first reset command signal to the main CPU; however even if the second trial inhibit command signal is generated, the drive control circuit is not initialized nor restarted.

3. The motor drive control device according to claim 1, wherein the drive control circuit essentially includes a main CPU that is a microprocessor and cooperates with a RAM memory and a program memory, and to which is connected a key-station series-parallel converter that transmits mutually-monitoring signals, which are an uplink communication signal and a downlink communication signal, to and from the monitor control circuit;

the monitor control circuit essentially includes a sub CPU that is a microprocessor and cooperates with an auxiliary RAM memory and an auxiliary program memory, and to which are connected a slave-station series-parallel converter connected in series to the key-station series-parallel converter, and a watchdog timer that monitors the pulse width of a first watchdog signal the main CPU generates and generates a first reset command signal to initialize and restart the main CPU, when a logically unchanging period of the pulse has passed exceeding a predetermined time;

the monitor control circuit also detects the presence/absence of code error in communication data and abnormal delay of the data with respect to the downlink communication signal that the drive control circuit transmits to the monitor control circuit, thereby determining the presence/absence of an abnormality in the downlink communication, transmits on a regular basis question information to the drive control circuit, and determines the presence/absence of an abnormality of question and answer as to whether or not answer information corresponding to the question information agrees with predetermined correct-answer information; if any abnormality occurs in the downlink communication or in the question and answer, the monitor control circuit generates the first abnormality detection signal;

the drive control circuit also detects the presence/absence of code error in communication data and abnormal delay of the data with respect to the uplink communication signal transmitted at least from the monitor control circuit, and determines whether or not an abnormality occurs in the uplink communication; if any abnormality occurs in the uplink communication, the drive control circuit generates a second abnormality detection signal, to initialize and restart the monitor control circuit, and also monitors the pulse width of a second watchdog signal the sub CPU generates, so as to generate a second reset command signal to initialize and restart the sub CPU, when a logically unchanging period of the pulse has passed exceeding a predetermined time;

the first inhibit command signal is a logical sum of a first trial inhibit command signal generated in connection with generation of the check-start command signal, the second abnormality detection signal and the second reset command signal to the sub CPU; however even if the first trial inhibit command signal is generated, the monitor control circuit is not initialized nor restarted; and the second inhibit command signal is a logical sum of a second trial inhibit command signal generated in connection with generation of the check-start command signal, the first abnormality detection signal and the first reset command signal to the main CPU; however even if the second trial inhibit command signal is generated, the drive control circuit is not initialized nor restarted.

4. The motor drive control device according to claim 1, wherein in
the first inhibit command signal include a first trial inhibit command signal generated in connection with generation of the check-start command signal, and
the second inhibit command signal include a second trial inhibit command signal generated in connection with generation of the check-start command signal,
a sequence of initial check conducted after the check-start command signal is generated, based on the predetermined time schedule, if the drive control circuit or the monitor control circuit detects any abnormality in the initial check, the first trial inhibit command signal or the second trial inhibit command signal continues to be generated, to report the abnormality until power supply to at least the drive control circuit is interrupted; and
when the monitor control circuit continues to generate the second trial inhibit command signal, the first abnormality detection signal is generated, or the abnormality occurrence is reported to the drive control circuit, and the drive control circuit memorizes the reported result as abnormality occurrence information.

5. The motor drive control device according to claim 1, wherein the drive command signal interruption circuit includes positive side gate elements provided in their respective transmission paths for the positive side drive command signals, and the negative side gate elements provided in their respective transmission paths for the negative side drive command signals; a composite inhibit command signal that is a logical sum of the first inhibit command signal and the second inhibit command signal is input to the positive side gate elements and the negative side gate elements as a gate signal;
a short-circuit command prevention circuit that prevents a close-circuit drive command signal from being supplied at the same time to the positive side switching elements and the negative side switching elements connected in series with each other in the same phase is provided in the positive side gate elements and negative side gate elements, or the short-circuit command prevention circuit is provided in a front stage or a rear stage of the positive side gate elements and the negative side gate elements; and
even if the drive control circuit, after generating the check-start command signal, generates at the same time the close-circuit drive command signal to the positive side switching elements and the negative side switching elements of the same phase, the drive control circuit sequentially checks and confirms that the positive side and the negative side command output signals the drive command signal interruption circuit generates do not become the close-circuit drive command signal at the same time.

6. The motor drive control device according to claim 1, wherein an overcurrent occurrence memory circuit is connected to the semiconductor bridge circuit, and the overcurrent occurrence memory circuit includes memory elements that memorize operation record, once overcurrent detection elements for each phase provided at the respective positive side and negative side switching elements are put into operation;
the memory elements are memory elements for each phase whose output signals are summed by a logical sum circuit, to become a third inhibit command signal, or a composite memory element that collectively memorizes a logical sum of signals from the overcurrent detection elements for each phase, and whose output signal becomes the third inhibit command signal;
the third inhibit command signal is directly summed with the first inhibit command signal and the second inhibit command signal, without passing through the drive control circuit, to become a composite inhibit command signal to the drive command signal interruption circuit;
the drive control circuit generates an overcurrent occurrence memory clear command signal to the overcurrent occurrence memory circuit, and an overcurrent generation force memory command signal that becomes a third trial inhibit command signal, and the third inhibit command signal or overcurrent occurrence memory signals of each phase by the memory elements for each phase are input in the drive control circuit; and
the drive control circuit also generates the third trial inhibit command signal in the predetermined time slot following the generation of the check-start command signal, confirms interruption operation of the drive command signals by the drive command signal interruption circuit, and during operation, the drive control circuit also receives the third inhibit command signal or the overcurrent occurrence memory signals of each phase, to sense an overcurrent occurrence, stops generation of the drive command signals, and following that, clears memory states of the memory elements by the overcurrent occurrence memory clear command.

7. The motor drive control device according to claim 4, wherein the command state monitoring signals input to at least either one of the drive control circuit and the monitor control circuit are the positive side and negative side command output signals the drive command signal interruption circuit generates;

the drive control circuit, after generating the check-start command signal, brings at once the negative side drive command signals into a logical state of no drive command being present as well as brings at once the positive side drive command signals into a logical state of drive command being present, which is a first mode, or brings at once the negative side drive command signals into the logical state of the drive command being present as well as brings at once the positive side drive command signals into the logical state of no drive command being present, which is a second mode, and executes the first mode and the second mode in a predetermined sequence; and the drive control circuit or the monitor control circuit changes both of the first trial inhibit command signal and the second trial inhibit command signal into a state of inhibit command clearing, or only either of the trial command signals into a state of inhibit command being present, monitors logical states of the positive side command output signals input in the first mode and logical states of the negative side command output signals input in the second mode, and compares the logical states of the positive side and negative side command output signals with logical states of the positive side and negative side drive command signals, or determines whether or not the logical states of the positive side and negative side command output signals agree with correct logical states memorized in advance; if any abnormality is found in the determination result, the drive control circuit or the monitor control circuit continues to generate the first trial inhibit command signal or the second trial inhibit command signal, respectively.

8. The motor drive control device according to claim 4, wherein the command state monitoring signals input to at least either one of the drive control circuit and the monitor control circuit are switching operation monitoring signals a switching element operation detection circuit generates;

the switching element operation detection circuit generates a positive side switching operation monitoring signal by a positive side switching operation detection element that detects a close-circuit state by any one of the positive side switching elements being turned on, and detects an open-circuit state by all of the positive side switching elements being turned off, and the detection circuit generates a negative side switching operation monitoring signal by a negative side switching operation detection element that detects the close-circuit state by any one of the negative side switching elements being turned on, and detects the open-circuit state by all of the negative side switching elements being turned off;

the drive control circuit, after generating the check-start command signal, brings at once the negative side drive command signals into a logical state of no drive command being present as well as sequentially brings the positive side drive command signals into a logical state of drive command being present, which is a third mode, or sequentially brings the negative side drive command signals into the logical state of drive command being present as well as brings at once the positive side drive command signals into the logical state of no drive command being present, which is a fourth mode, and executes the third mode and the fourth mode in a predetermined sequence; and the drive control circuit or the monitor control circuit changes both of the first trial inhibit command signal and the second trial inhibit command signal into a state of the inhibit command clearing, or only either of the command signals into a state of the inhibit command being present, compares logical states of the positive side switching operation monitoring signal of the positive side switching elements input in the third mode and logical states of the negative side switching operation monitoring signal of the negative side switching elements input in the fourth mode with logical states of the positive side and negative side drive command signals, or determines whether or not the logical states of those monitoring signals agree with correct logical states memorized in advance; if any abnormality is found in the determination result, the drive control circuit or the monitor control circuit continues to generate the first trial inhibit command signal or the second trial inhibit command signal, respectively.

9. The motor drive control device according to claim 4, wherein the command state monitoring signals that is the positive side and negative side command output signals or the switching operation monitoring signals are input to the drive control circuit, and the second trial inhibit command signal that is generated by the monitor control circuit and input in the drive command signal interruption circuit is also input in the drive control circuit; and the drive control circuit determines whether or not the drive command signal interruption circuit is operating normally, by combination of logical states of the positive side and negative side drive command signals and the first trial inhibit command signal that the drive control circuit generates, and logical states of the command state monitoring signals and the second trial inhibit command input signal that are input to the drive control circuit.

10. The motor drive control device according to claim 4, wherein the positive side and negative side command output signals the drive command signal interruption circuit generates are input as the command state monitoring signals to either one of the drive control circuit and the monitor control circuit, and the switching operation monitoring signals of the switching elements, that respond to the operation status of the positive side switching elements and negative side switching elements are input in the other; and the drive control circuit and the monitor control circuit share checking of an operation state of the drive command signal interruption circuit and operation states of the switching operation monitoring signals.

* * * * *